United States Patent
Katayama

(10) Patent No.: US 6,788,628 B2
(45) Date of Patent: Sep. 7, 2004

(54) OPTICAL HEAD AND OPTICAL DATA RECORDING/REPRODUCING APPARATUS USING THE SAME

(75) Inventor: Ryuichi Katayama, Tokyo (JP)

(73) Assignee: NEC Corporation (JP)

( * ) Notice: Subject to any disclaimer, the term of this patent is extended or adjusted under 35 U.S.C. 154(b) by 397 days.

(21) Appl. No.: 10/022,485

(22) Filed: Dec. 17, 2001

(65) Prior Publication Data

US 2002/0075775 A1 Jun. 20, 2002

(30) Foreign Application Priority Data

Dec. 18, 2000 (JP) ........................................ 2000-384307

(51) Int. Cl.$^7$ ................................................. G11B 7/00
(52) U.S. Cl. ............................... 369/44.37; 369/44.32; 369/112.05; 369/44.23
(58) Field of Search .......................... 369/44.37, 44.41, 369/44.23, 44.26, 44.28, 44.32, 112.03, 112.04, 112.05, 112.07, 112.08, 112.1, 112.15, 94, 53.2, 53.22, 53.23

(56) References Cited

FOREIGN PATENT DOCUMENTS

| JP | 9-147369 | 6/1997 |
|---|---|---|
| JP | 11-195229 | 7/1999 |
| JP | 2000-20993 | 1/2000 |
| JP | 2000-30290 | 1/2000 |
| JP | 2000-40237 | 2/2000 |
| JP | 2000-57616 | 2/2000 |

*Primary Examiner*—Thang V. Tran
(74) *Attorney, Agent, or Firm*—Hayes Soloway P.C.

(57) ABSTRACT

In an optical head for use in an optical data recording/reproducing apparatus of the present invention, light emitted from a semiconductor laser is split into a main beam that is zeroth order light and sub-beams that are plus and minus first-order diffracted light. A focus error signal is detected from each of the main beam and sub-beams. A diffractive optical lens causes the main beam and sub-beams to differ in light intensity distribution from each other when incident to an objective lens. As a result, when a disk or optical recording medium has a thickness error, the focus error signal derived from the main beam and focus error signals derived from the sub-beams differ in zero-crossing point from each other. The thickness error is detected on the basis of the difference between the zero-crossing points.

92 Claims, 25 Drawing Sheets

OPTICAL HEAD AND OPTICAL DATA RECORDING/REPRODUCING APPARATUS USING THE SAME

BACKGROUND OF THE INVENTION

1. Field of the Invention

The present invention relates to an optical head for recording and reproducing data from an optical recording medium and an optical data recording/reproducing apparatus using the same. More particularly, the present invention relates to an optical head capable of detecting an error in the thickness of the substrate of an optical recording medium and an optical data recording/reproducing apparatus using the same.

2. Description of the Background Art

Recording density available with an optical data recording/reproducing apparatus is inversely proportional to the square of the diameter of a beam spot formed by an optical head on a disk or optical recording medium; the smaller the beam spot diameter, the higher the recording density. The beam spot diameter is, in turn, inversely proportional to the numerical aperture of an objective lens included in the optical head; the greater the numerical aperture, the smaller the beam spot diameter.

On the other hand, if the substrate of the disk has thickness different from a designed value, the resulting spherical aberration disturbs the shape of the beam spot and thereby deteriorates data recording and reproducing characteristics. Spherical aberration is proportional to the fourth power of the numerical aperture of the objective lens, so that a margin as to the thickness error of the disk with respect to the data recording and reproducing characteristics decreases with an increase in the numerical aperture of the objective lens. Therefore, the prerequisite with an optical head and an optical data recording/reproducing apparatus including an objective lens whose numerical aperture is increased to increase recording density is that the thickness error of the substrate be detected and compensated for.

Japanese Patent Laid-Open Publication No. 2000-40237, for example, discloses an optical head constructed to detect the thickness error of a substrate included in a disk. The optical head disclosed includes an objective lens pair made up of a first and a second objective lens facing a disk. A first actuator drives the first objective lens in the direction of optical axis. A second actuator is loaded with the first actuator and second objective lens and drives them in the direction of optical axis. The first actuator varies a pitch between the first and second objective lenses while the second actuator varies a pitch between the objective lens pair and the disk. To detect the thickness error of a disk, the amplitude of an RF (Radio Frequency) signal recorded in the disk is observed. To compensate for the thickness error, the optical head adjusts the pitch between the objective lenses and in such a manner as to produce spherical aberration that cancels spherical aberration ascribable to the thickness error.

The problem with the conventional optical head described above is that an RF signal cannot be observed unless it is recorded in the disk beforehand. A read-only disk stores an RF signal beforehand and therefore allows the thickness error of its substrate to be detected. However, a thickness error cannot be detected when it comes to a write-once disk or a rewritable disk that does not store an RF signal beforehand. The above optical head may be constructed to record an RF signal in a disk and then detect the thickness error of the disk. However, such an optical head does not compensate for a thickness error and therefore disturbs the shape of a beam spot due to spherical aberration ascribable to the thickness error, failing to accurately record an RF signal.

Japanese Patent Laid-Open Publication No. 2000-57616, for example, teaches an optical head configured to detect a thickness error even with a disk not storing an RF signal. This optical head receives light reflected from a disk by dividing it into a center portion and a peripheral portion. This brings about a problem that a particular current-to-voltage converting circuit must be assigned to each of a photosensitive portion responsive to the center portion and a photosensitive portion responsive to the peripheral portion. As a result, the optical head needs two times more current-to-voltage converting circuits than a conventional optical head. Moreover, such a number of current-to-voltage converting circuits aggravate noise ascribable thereto and thereby reduce the S/N (Signal-to-Noise) ratio of the RF signal.

Technologies relating to the present invention are also disclosed in, e.g., Japanese Patent Laid-Open Publication Nos. 9-147369, 11-195229, 2000-20993 and 2000-30290.

SUMMARY OF THE INVENTION

It is therefore an object of the present invention to provide an optical head capable of detecting a thickness error even with an optical disk not storing an RF signal, and providing an RF signal with a desirable S/N ratio.

In accordance with the present invention, an optical head includes a light source, an objective lens for condensing light output from the light source on an optical recording medium, and a photodetector to which light reflected from the optical recording medium is incident. The light output from the light source is split into a main beam and a sub-beam different from each other in light intensity distribution when input to the objective lens. A focus error signal representative of the shift of a focus on the optical recording medium is detected from each of reflected light derived from the main beam and reflected light derived from the sub-beam. An error in the thickness of the optical recording medium is detected on the basis of a difference between the zero-crossing point of the reflected light derived from the main beam and the zero-crossing point of the reflected light derived from the sub-beam.

Also, in accordance with the present invention, in an optical data recording/reproducing apparatus including a light source, an objective lens for condensing light output from the light source on an optical recording medium, and a photodetector to which light reflected from the optical recording medium is incident, the light output from the light source is split into a main beam and a sub-beam different from each other in light intensity distribution when input to the objective lens. A focus error signal representative of the shift of a focus on the optical recording medium is detected from each of reflected light derived from the main beam and reflected light derived from the sub-beam. An error in the thickness of the optical recording medium is detected and compensated for on the basis of a difference between the zero-crossing point of the reflected light derived from the main beam and the zero-crossing point of the reflected light derived from the sub-beam.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

Figure 1:
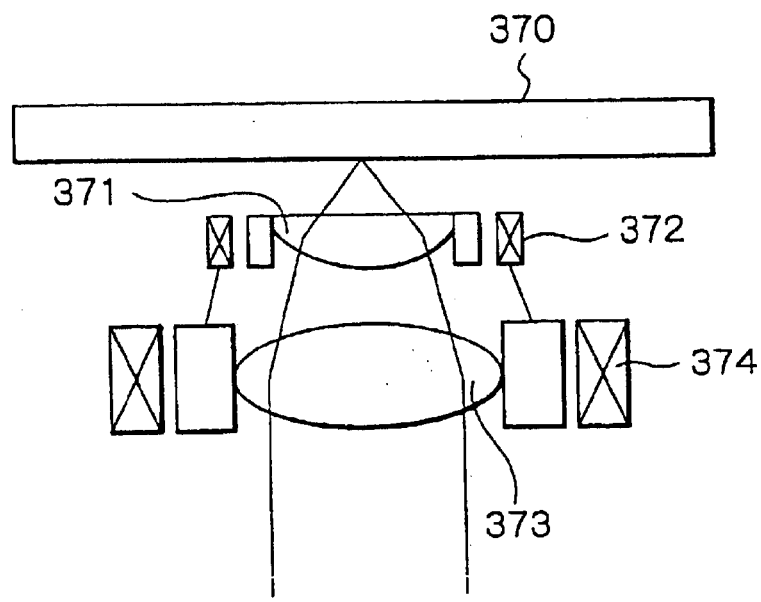
FIG. 1 is a view showing a conventional optical head.

To better understand the present invention, brief reference will be made to a conventional optical head of the type disclosed in Laid-Open Publication No. 2000-40237 mentioned earlier. As shown in FIG. 1, the conventional optical head includes an objective lens pair made up of a first and a second objective lens 371 and 373. A laser beam emitted from a semiconductor laser, not shown, is incident to a disk or optical recording medium 370 via the second objective lens 373 and first objective lens 371.

The first objective lens 371 is mounted on a first actuator 372 and driven thereby in the direction of optical axis. The first actuator 372 loaded with the first objective lens 371 and the second objective lens 373 both are mounted on a second actuator 374 and driven thereby in the direction of optical axis. More specifically, the first actuator 372 varies the pitch between the first objective lens 371 and the second objective lens 373 when driven. The second actuator 374 varies the pitch between the objective lens pair (371 and 373) and the disk 370. Spherical aberration and focus offset respectively vary with the pitch between the two lenses 371 and 373 and the pitch between the objective lens pair and the disk 370.

If the substrate of the disk 370 has any thickness error, then the resulting spherical aberration lowers the amplitude of an RF signal recorded in the disk 370. Focus offset also lowers the amplitude of the RF signal. In light of this, the first actuator 372 is driven to vary, while observing the amplitude of the RF signal recorded in the disk 370, the pitch between the objective lenses 371 and 373 such that the RF signal has the maximum amplitude. Further, the second actuator 374 is driven to vary, while observing the above amplitude, the pitch between the objective lens pair and the disk 370 such that the RF signal has the maximum amplitude.

More specifically, to detect the thickness error of the disk 370, the amplitude of the RF signal recorded in the disk 370 is observed. To compensate for the error, the optical head adjusts the pitch between the objective lenses 371 and 373 in such a manner as to produce spherical aberration that cancels the spherical aberration ascribable to the error. This conventional optical head, however, has the problems discussed earlier.

Preferred embodiments of the present invention will be described hereinafter.

First Embodiment

Figure 2:
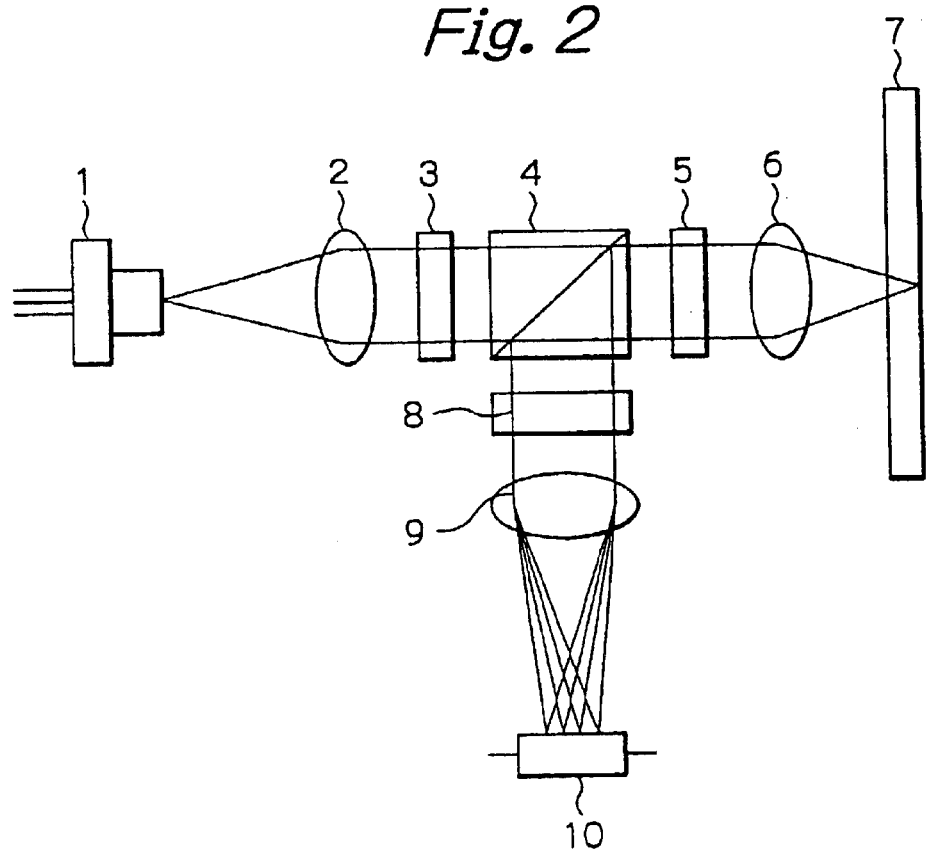
FIG. 2 is a view showing a first embodiment of the optical head in accordance with the present invention.

Referring to FIG. 2, an optical head embodying the present invention is shown and includes a semiconductor laser or light source 1. A collimator lens 2 collimates light emitted from the semiconductor laser 1. A diffractive optical element 3 splits the collimated light output from the collimator lens 2 into three beams, i.e., a zeroth order beam, a plus first-order beam, and a minus first-order beam. The illustrative embodiment uses the zeroth order beam as a main beam and uses one or both of the two first-order beams as a sub-beam. In the following description, the two first-order beams are assumed to be sub-beams.

The split main beam and sub-beams are incident to a polarizing beam splitter 4 as p-polarized light. The polarizing beam splitter 4 transmits substantially the entire main beam and sub-beams therethrough. A quarter-wave plate 5 transmits the main beam and sub-beams output from the beam splitter 4 for thereby transforming the linearly polarized light to circularly polarized light. The circularly polarized light is incident to a disk or optical recording medium 7 via an objective lens 6 (forward path).

The main beam and sub-beams of the light reflected by the disk 7 are transmitted through the objective lens 6 toward the quarter-wave plate 5 (backward path). The quarter-wave plate 5 transforms the incident circularly polarized light to linearly polarized light perpendicular in direction to the forward path. The linearly polarized light is then incident to the polarizing beam splitter 4 as s-polarized light. The beam splitter 4 reflects substantially the entire s-polarized light toward a holographic optical element 8. The holographic optical element 8 diffracts substantially the entire s-polarized light and thereby outputs the plus first-order diffracted light. The plus first-order diffracted light is incident to a photodetector 10 via a lens 9.

Figure 3:
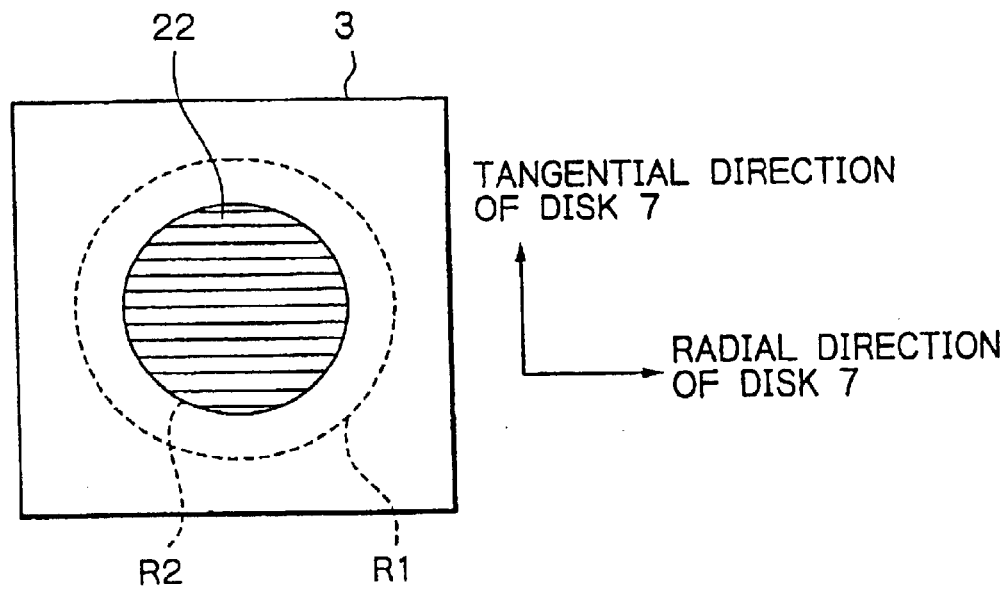
FIG. 3 is a plan view showing a diffractive optical element included in the first embodiment.

FIG. 3 shows the diffractive optical element 3 intervening between the semiconductor laser 1 and the objective lens 6 specifically. As shown, the optical element 3 has a diffraction grating only in a region 22 whose diameter R2 is smaller than the effective diameter R1 of the objective lens 6, which is indicated by a dotted circle. The diffraction grating extends in a direction substantially parallel to the radial direction of the disk 7 and has lines arranged in an equally spaced pattern. Assume that a phase difference between the lines and the spaces of the diffraction grating is $\pi/2$. Then, the optical element 3 transmits about 50% of the light incident to the region 22 as the zeroth order light while diffracting about 20.3% of the incident light as each of the plus and minus first-order diffracted light. Further, the optical element 3 transmits substantially the entire light incident to the outside of the region 22. More specifically, the main beam includes both of the light transmitted through the region 22 and the light transmitted through the outside of the region 22 while the sub-beams each include only the light diffracted within the region 22. Therefore, the main beam and each sub-beam are different from each other as to an intensity distribution on the objective lens 6; the sub-beams are lower than the main beam in light intensity in a peripheral portion.

Figure 4:
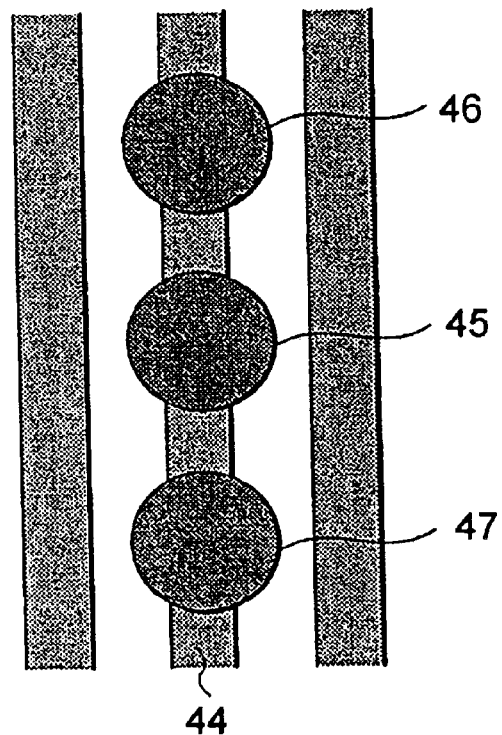
FIG. 4 shows beam spots formed on a disk by the first embodiment.

FIG. 4 shows beam spots 45, 46 and 47 formed on the disk 7. Projections and recesses formed on the disk 7 will hereinafter be referred to as grooves and lands, as seen from the light incidence side. As shown, the beam spots 45, 46 and 47 respectively correspond to the zeroth order light, plus first-order diffracted light and minus first-order diffracted light output from the diffractive optical element 3. The three beam spots 45 through 47 are positioned on the same track (land or groove) 44. The beam spots 46 and 47 derived from the sub-beams are greater in diameter than the beam spot 45 derived from the main beam because of the relation in light intensity in the peripheral portion mentioned above.

Figure 5:
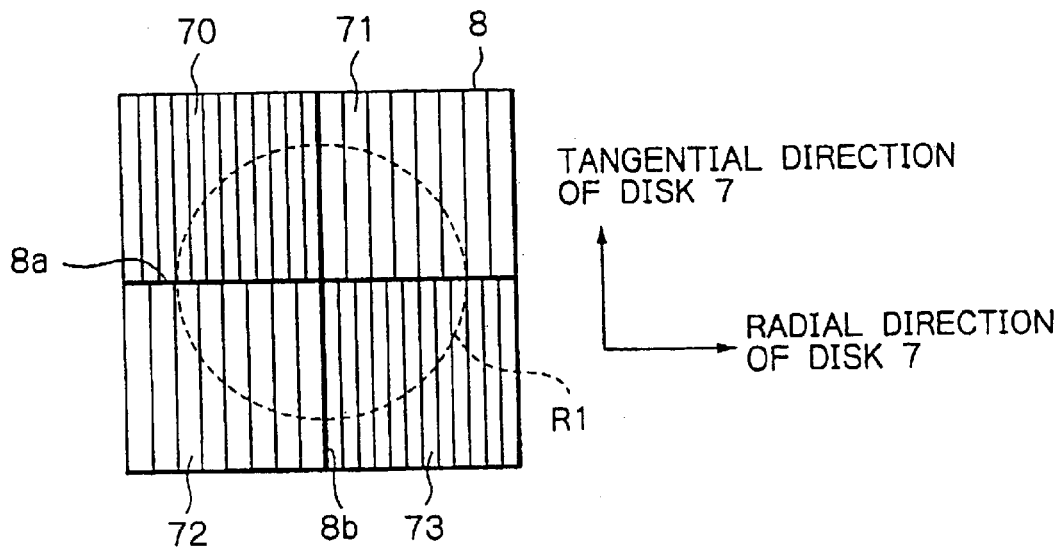
FIG. 5 is a plan view showing a holographic optical element included in the first embodiment.

FIG. 5 shows the holographic optical element 8 in detail. As shown, the holographic optical element 8 has a diffracting grating in a region containing the effective diameter R1 of the objective lens 6, which is indicated by a dotted circle in FIG. 5. The diffracting grating is divided into four regions 70, 71, 72 and 73 by a line 8a parallel to the radial direction of the disk 7 and a line 8b parallel to the tangential direction of the same. The diffracting grating extends in a direction substantially parallel to the tangential direction of the disk 7 in all of the regions 70 through 73 and has a linear, equally spaced pattern in each of the regions 70 through 73. However, the pitch between the lines of the diffraction grating is greater in the regions 71 and 72 than in the regions 70 and 73.

Further, the diffraction grating of the holographic optical element 8 has a saw-toothed cross-section in all of the regions 70 through 73. Assume that a phase difference between the peaks and the valleys of the saw-toothed cross-section is $2\pi$. Then, the light incident to each of the regions 70 through 73 is substantially entirely diffracted as the plus first-order diffracted light. The saw-teeth of the grating in the regions 70 and 71 are oriented such that the plus first-order diffracted light is deflected to the left, as viewed in FIG. 5. On the other hand, the saw-teeth of the grating in the regions 72 and 73 are oriented such that the plus first-order diffracted light is deflected to the right, as viewed in FIG. 5.

Figure 6:
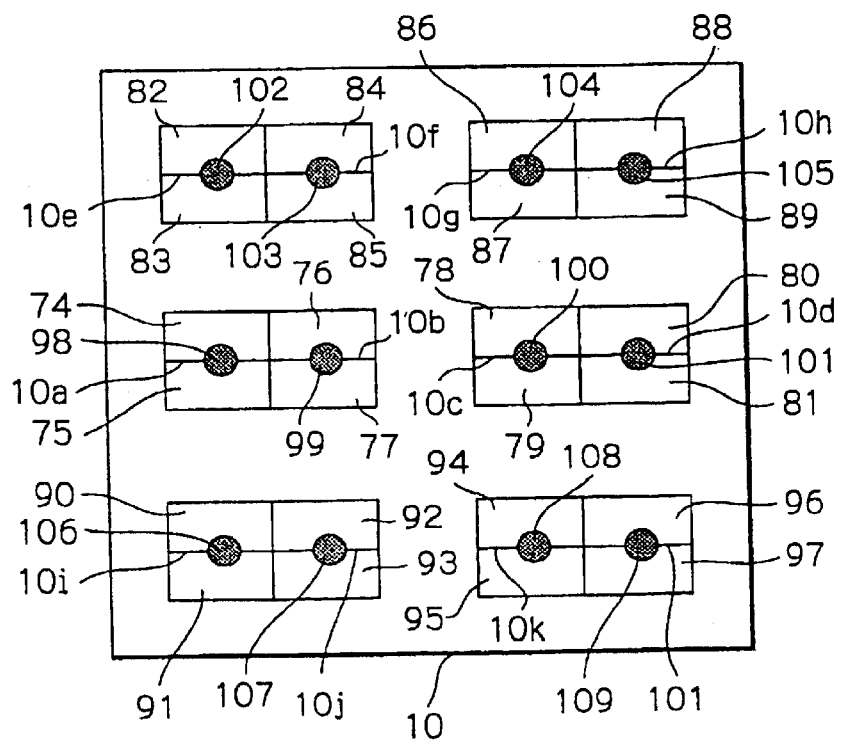
FIG. 6 shows the arrangement of photosensitive portions constituting a photodetector, which is included in the first embodiment, together with beam spots formed thereon.

FIG. 6 shows the arrangement of photosensitive portions included in the photodetector 10 together with beam spots incident to the photodetector 10. As shown, a beam spot or main beam 98 corresponds to, among the zeroth order light output from the diffractive optical element 3, the positive first-order diffracted light output from the region 70 of the holographic optical element 8. The beam spot 98 is incident to a boundary 10a between photosensitive portions 74 and 75, which are divided from each other by a line parallel to the radial direction of the disk 7.

A beam spot or main beam 99 corresponds to, among the zeroth order light output from the diffractive optical element 3, the plus first-order diffracted light output from the region 71 of the holographic optical element 8. The beam spot 99 is incident to a boundary 10b between photosensitive portions 76 and 77, which are divided from each other by a line parallel to the radial direction of the disk 7. A beam spot or main beam 100 corresponds to, among the zeroth order light output from the diffractive optical element 3, the plus first-order diffracted light output from the region 72 of the optical element 8. The beam spot 100 is incident to a boundary 10c between photosensitive portions 78 and 79, which are divided from each other by a line parallel to the radial direction of the disk 7. Further, a beam spot or main beam 101 corresponds to, among the zeroth order light output from the diffractive optical element 3, the plus first-order diffracted light output from the region 73 of the optical element 8. The beam spot 101 is incident to a boundary 10d between photosensitive portions 80 and 81, which are divided from each other by a line parallel to the radial direction of the disk 7.

A beam spot or sub-beam 102 corresponds to, among the plus first-order light output from the diffractive optical element 3, the plus first-order diffracted light output from the region 70 of the holographic optical element 8. The beam spot 102 is incident to a boundary 10e between photosensitive portions 82 and 83, which are divided from each other by a line parallel to the radial direction of the disk 7. A beam spot or sub-beam 103 corresponds to, among the plus first-order light output from the diffractive optical element 3, the plus first-order diffracted light output from the region 71 of the holographic optical element 8. The beam spot 103 is incident to a boundary 10f between photosensitive portions 84 and 85, which are divided from each other by a line parallel to the radial direction of the disk 7. A beam spot or sub-beam 104 corresponds to, among the plus first-order light output from the diffractive optical element 3, the plus first-order diffracted light output from the region 72 of the optical element 8. The beam spot 104 is incident to a boundary 10g between photosensitive portions 86 and 87, which are divided from each other by a line parallel to the radial direction of the disk 7. Further, a beam spot or sub-beam 105 corresponds to, among the plus first-order light output from the diffractive optical element 3, the plus first-order diffracted light output from the region 73 of the optical element 8. The beam spot 105 is incident to a boundary 10h between photosensitive portions 88 and 89, which are divided from each other by a line parallel to the radial direction of the disk 7.

A beam spot or sub-beam 106 corresponds to, among the minus first-order light output from the diffractive optical element 3, the plus first-order diffracted light output from the region 70 of the holographic optical element 8. The beam spot 106 is incident to a boundary 10i between photosensitive portions 90 and 91, which are divided from each other by a line parallel to the radial direction of the disk 7. A beam spot or sub-beam 107 corresponds to, among the minus first-order light output from the diffractive optical element 3, the plus first-order diffracted light output from the region 71 of the optical element 8. The beam spot 107 is incident to a boundary 10j between photosensitive portions 92 and 93, which are divided from each other by a line parallel to the radial direction of the disk 7. A beam spot or sub-beam 108 corresponds to, among the minus first-order light output from the diffractive optical element 3, the plus first-order diffracted light output from the region 72 of the optical element 8. The beam spot 108 is incident to a boundary 10k between photosensitive portions 94 and 95, which are divided from each other by a line parallel to the radial direction of the disk 7. Further, a beam spot or sub-beam 109 corresponds to, among the minus first-order light output from the diffractive optical element 3, the plus first-order diffracted light output from the region 73 of the optical element 8. The beam spot 109 is incident to a boundary 10l between photosensitive portions 96 and 97, which are divided from each other by a line parallel to the radial direction of the disk 7.

Assume that the photosensitive portions 74 through 97 produce outputs V74 through V97, respectively. Then, a focus error signal FEM derived from the beam spot or main beam 45 is expressed by the Foucault method as:

$$FEM=(V75+V77+V78+V80)-(V74+V76+V79+V81)$$

A focus error signal FES1 derived from the beam spot or sub-beam 46 is expressed by the Foucault method as:

$$FES1=(V83+V85+V86+V88)-(V82+V84+V87+V89)$$

A focus error signal FES2 derived from the beam spot or sub-beam 47 is expressed by the Foucalt method as:

$$FES2=(V91+V93+V94+V96)-(V90+V92+V95+V97)$$

The focus error signal FEM is used for focus servo.

On the other hand, a track error signal TEM derived from the beam spot or main beam 45 is expressed by the push-pull method as:

$$TEM=(V74+V75+V78+V79)-(V76+V77+V80+V81)$$

A track error signal TES1 derived from the beam spot or sub-beam 46 is expressed by the push-pull method as:

$$TES1=(V82+V83+V86+V87)-(V84+V85+V88+V89)$$

A track error signal TES2 derived from the beam spot or sub-beam 47 is expressed by the push-pull method as:

$$TES2=(V90+V91+V94+V95)-(V92+V93+V96+V97)$$

The track error signal TEM is used for track servo.

An RF signal derived from the beam spot or main beam 45 is produced by:

$$RF=(V74+V75+V76+V77+V78+V79+V80+V81)$$

Figure 7:
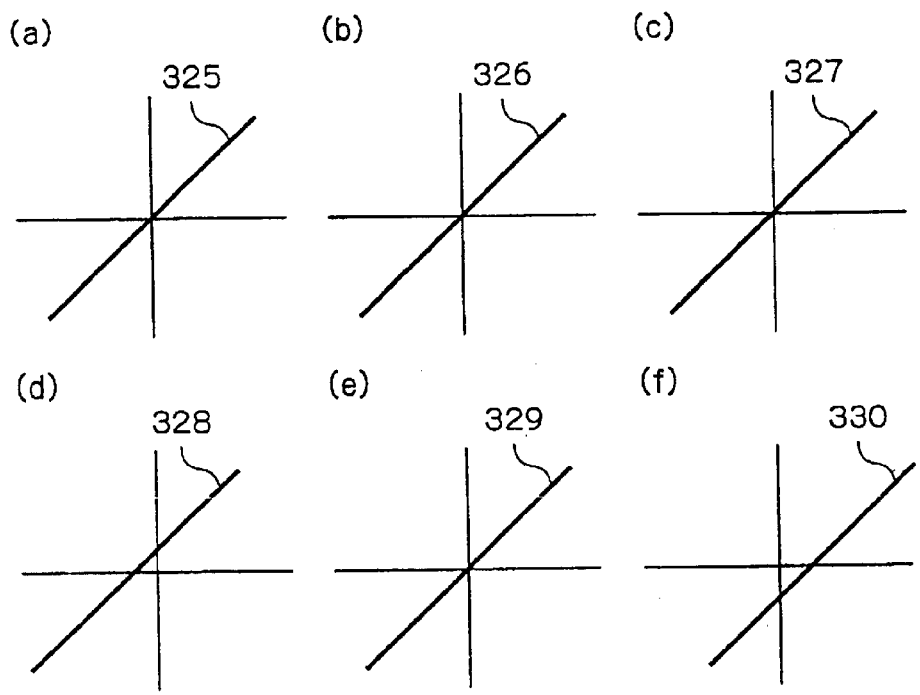
FIG. 7 shows various focus error signals particular to the first embodiment.

FIG. 7 shows various focus error signals; the abscissa and ordinate indicate the amount of defocus of the disk 7 and focus error signal, respectively. In FIG. 7, (a), (b) and (c) show focus error signals 325, 326 and 327 representative of the focus error signals FEM derived from the beam spot or main beam 45 to appear when the thickness error of the disk 7 is positive, zero and negative, respectively. In FIG. 7, (d), (e) and (f) show focus error signals 328, 329 and 330 representative of the focus error signals FES1 and FES2 derived from the beam spots or sub-beams 46 and 47 when the thickness error is positive, zero and negative, respectively.

When the thickness error of the disk 7 is zero, the main beam and sub-beams are coincident in the focus position of the beam spot in the direction of optical axis. Therefore, as (b) and (e) of FIG. 7 indicate, the main beam and sub-beams are coincident in the zero-crossing point of the focus error signal.

By contrast, when the thickness error of the disk 7 is positive (thickness greater than designed one), the focus position of light in the peripheral portion is shifted from the focus position of light in the center portion to the positive side (away from the lens 6) in the direction of optical axis due to positive spherical aberration. The sub-beams are lower in light intensity than the main beam in the peripheral portion, so that the former has smaller positive spherical aberration than the latter. As a result, the sub-beams each have a focus position shifted from the focus position of the main beam to the negative side in the direction of optical axis. It follows that, as (a) and (d) of FIG. 7 indicate, the sub-beams cause the zero-crossing points of the focus error signals to be shifted to the negative side with respect to the main beam in the direction of optical axis.

Further, when the thickness error of the disk 7 is negative (thickness smaller than designed one), the focus position of light in the peripheral portion is shifted from the focus position of light in the center portion to the negative side (toward the lens 6) in the direction of optical axis due to negative spherical aberration. The sub-beams are lower in light intensity than the main beam in the peripheral portion, so that the former has smaller negative spherical aberration than the latter. As a result, the sub-beams each have a focus position shifted from the focus position of the main beam to the positive side in the direction of optical axis. It follows that, as (c) and (f) of FIG. 7 indicate, the sub-beams cause the zero-crossing points of the focus error signals to be shifted to the positive side with respect to the main beam in the direction of optical axis.

The shift of the zero-crossing point of the focus error signal of the sub-beams with respect to the main beam increases with an increase in the thickness error of the disk 7.

When the thickness error of the disk 7 is positive, zero or negative, the focus error signals FES1 and FES2 at the position where the focus error signal FEM of the main beam is zero are positive, zero or negative, respectively.

The thickness error of the disk 7 can therefore be detected by using the focus error signals FES1 and FES2 derived from the sub-beams or the sum of the signals FES1 and FES2 when focus servo is effected with the focus error signal FEM derived from the main beam or the sum of the signals FE1 and FES2. Further, the thickness error can be detected by using a difference between either one of the focus error signals derived from the sub-beams and the focus error signal derived from the main beam (FES1−K·FEM) or (FES2−K·FEM) where K denotes a constant. In addition, the thickness error can be detected by using a difference between the sum of the focus error signals derived from the sub-beams and the focus error signal FEM derived from the main beam ((FES1+FES2)−K·FEM).

Second Embodiment

Figure 8:
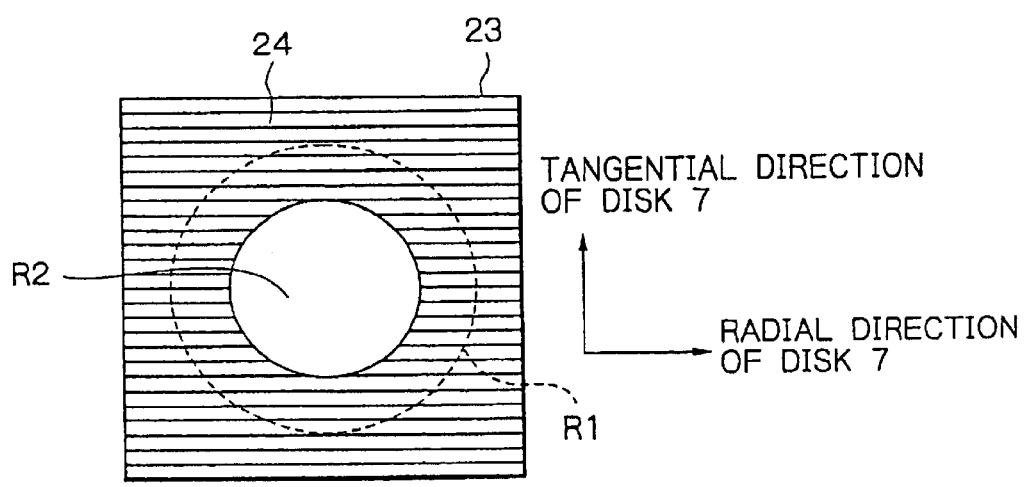
FIG. 8 is a plan view showing a diffractive optical element included in a second embodiment of the present invention.

FIG. 8 shows a diffractive optical element 23 included in a second embodiment of the present invention in place of the diffractive optical element 3, FIG. 3, of the first embodiment. As for the rest of the configuration, the second embodiment is identical with the first embodiment described with reference to FIG. 2. As shown, the diffractive optical element 23 has a diffraction grating only in a region 24 outside of a circle having a diameter R2 smaller than the effective diameter R1 of the objective lens 6, which is indicated by a dotted circle.

The diffraction grating of the diffractive optical element 23 extends in a direction substantially parallel to the radial direction of the disk 7 and has lines arranged in an equally spaced pattern. Assume that a phase difference between the lines and the spaces of the diffraction grating is $\pi/2$. Then, the optical element 23 transmits about 50% of the light incident to the region 24 as the zeroth order light while diffracting about 20.3% of the incident light as each the plus and minus first-order diffracted light. Further, the optical element 23 transmits substantially the entire light incident to the outside of the region 24. More specifically, the main beam includes both of the light transmitted through the region 24 and the light transmitted through the outside of the region 24 while the sub-beams each include only the light diffracted within the region 24. Therefore, the main beam and each sub-beam are different from each other as to an intensity distribution on the objective lens 6; the sub-beams are higher than the main beam in light intensity in the peripheral portion.

Figure 9:
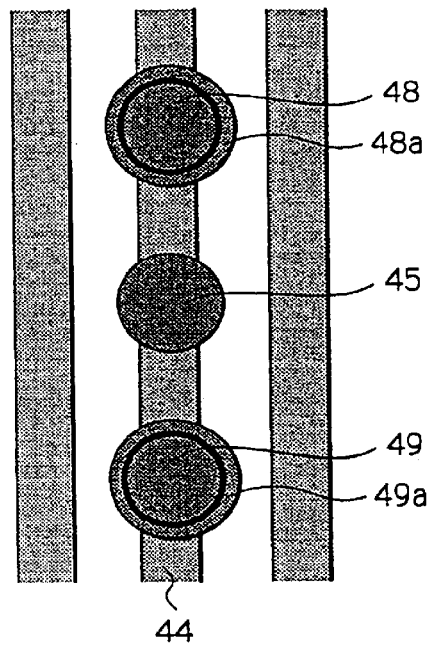
FIG. 9 shows beam spots formed on disk by the second embodiment.

FIG. 9 shows beam spots 45, 48 and 49 formed on the disk 7. Again, projections and recesses formed on the disk 7 will be referred to as grooves and lands, as seen from the light incidence side. As shown, the beam spots 45, 48 and 49 respectively correspond to the zeroth order light, plus first-order diffracted light and minus first-order diffracted light output from the diffractive optical element 23. The three beam spots 45, 48 and 49 are positioned on the same track (land or groove) 44. The beam spots 48 and 49 derived from the sub-beams are smaller in diameter than the beam spot 45 derived from the main beam because of the relation in light intensity in the peripheral portion mentioned above.

The illustrative embodiment generates focus error signals, track error signals and an RF signal in the same manner as the first embodiment.

Figure 10:
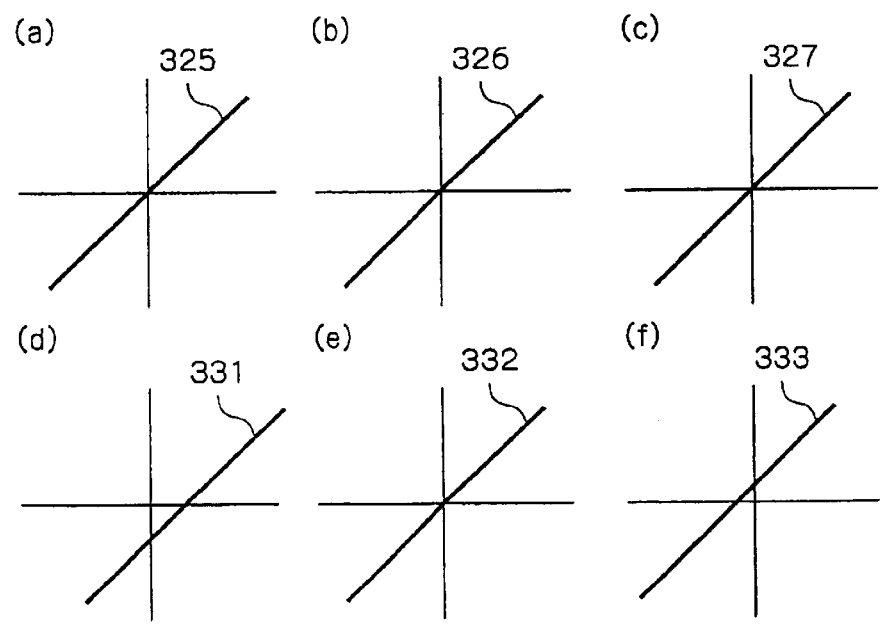
FIG. 10 shows various focus error signals particular to the second embodiment.

FIG. 10 shows various focus error signals; the abscissa and ordinate indicate the amount of defocus of the disk 7 and focus error signal, respectively. In FIG. 10, (a), (b) and (c) show focus error signals 325, 326 and 327 representative of the focus error signals FEM derived from the beam spot or main beam 45 to appear when the thickness error of the disk 7 is positive, zero and negative, respectively. In FIG. 10, (d), (e) and (f) show focus error signals 331, 332 and 333 representative of the focus error signals FES1 and FES2 derived from the beam spots or sub-beams 48 and 49 when the thickness error is positive, zero and negative, respectively.

When the thickness error of the disk 7 is zero, the main beam and sub-beams are coincident in the focus position of the beam spot in the direction of optical axis. Therefore, as (b) and (e) of FIG. 10 indicate, the main beam and sub-beams are coincident in the zero-crossing point of the focus error signal.

By contrast, when the thickness error of the disk 7 is positive (thickness greater than designed one), the focus position of light in the peripheral portion is shifted from the focus position of light in the center portion to the positive side (away from the lens 6) in the direction of optical axis due to positive spherical aberration. The sub-beams are higher in light intensity than the main beam in the peripheral portion, so that the former has greater positive spherical aberration than the latter. As a result, the sub-beams each have a focus position shifted from the focus position of the main beam to the positive side in the direction of optical axis. It follows that, as (a) and (d) of FIG. 10 indicate, the sub-beams cause the zero-crossing points of the focus error signals to be shifted to the positive side with respect to the main beam in the direction of optical axis.

Further, when the thickness error of the disk 7 is negative (thickness smaller than designed one), the focus position of light in the peripheral portion is shifted from the focus position of light in the center portion to the negative side (toward the lens 6) in the direction of optical axis due to negative spherical aberration. The sub-beams are higher in light intensity than the main beam in the peripheral portion, so that the former has greater negative spherical aberration than the latter. As a result, the sub-beams each have a focus position shifted from the focus position of the main beam to the negative side in the direction of optical axis. It follows that, as (c) and (f) of FIG. 10 indicate, the sub-beams cause the zero-crossing points of the focus error signals to be shifted to the negative side with respect to the main beam in the direction of optical axis.

The shift of the zero-crossing point of the focus error signal of the sub-beams with respect to the main beam increases with an increase in the thickness error of the disk 7.

When the thickness error of the disk 7 is positive, zero or negative, the focus error signals FES1 and FES2 at the position where the focus error signal FEM of the main beam is zero are negative, zero or positive, respectively.

The thickness error of the disk 7 can therefore be detected by using the focus error signals FES1 and FES2 derived from the sub-beams or the sum of the signals FES1 and FES2 when focus servo is effected with the focus error signal FEM derived from the main beam or the sum of the signals FE1 and FES2. Further, the thickness error can be detected by using a difference between the focus error signal derived from either one of the sub-beams and the focus error signal derived from the main beam (FES1−K·FEM) or (FES2−K·FEM). In addition, the thickness error can be detected by using a difference between the sum of the focus error signals derived from the sub-beams and the focus error signal FEM derived from the main beam ((FES1+FES2)−K·FEM).

Third Embodiment

Figure 11:
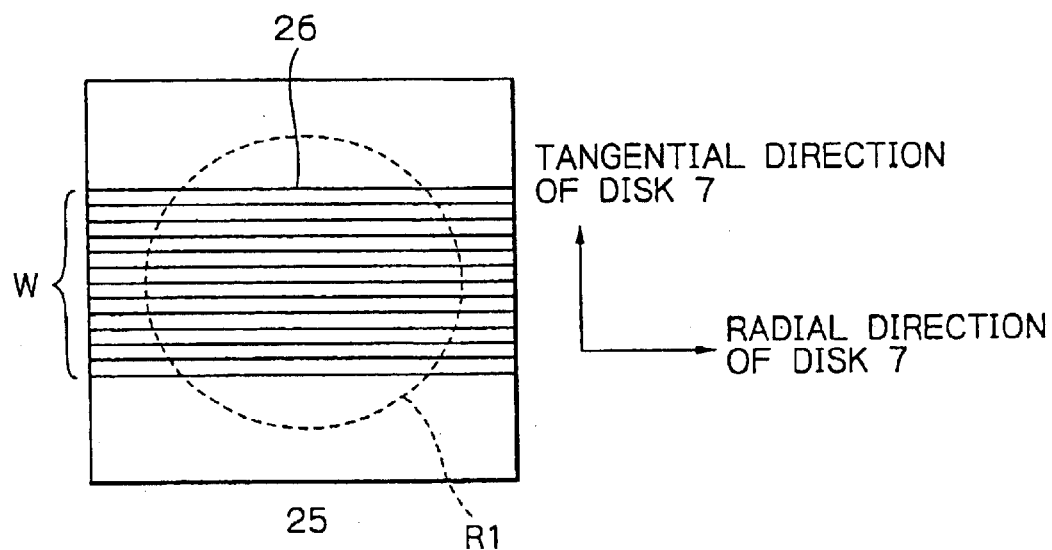
FIG. 11 is a plan view showing a diffractive optical element included in a third embodiment of the present invention.

FIG. 11 shows a diffractive optical element 25 included in a third embodiment of the present invention in place of the diffractive optical element 3, FIG. 3, of the first embodiment. As for the rest of the configuration, the third embodiment is identical with the first embodiment described with reference to FIG. 2. As shown, the diffractive optical element 25 has a diffraction grating only in a region 26 inside of a zone having a width W smaller than the effective diameter R1 of the lens 6, which is indicated by a dotted circle.

The diffraction grating of the diffractive optical element 25 extends in a direction substantially parallel to the radial direction of the disk 7 and has lines arranged in an equally spaced pattern. Assume that a phase difference between the lines and the spaces of the diffraction grating is $\pi/2$. Then, the optical element 25 transmits about 50% of the light incident to the region 26 as the zeroth order light while diffracting about 20.3% of the incident light as each of the plus and minus first-order diffracted light. Further, the optical element 25 transmits substantially the entire light incident to the outside of the region 26. More specifically, the main beam includes both of the light transmitted through the region 26 and the light transmitted through the outside of the region 26 while the sub-beams each include only the light diffracted within the region 26. Therefore, the main beam and sub-beams are different from each other as to an intensity distribution on the objective lens 6; the sub-beams are lower than the main beam in light intensity in the peripheral portion in the tangential direction of the disk 7 (vertical direction in FIG. 11).

Figure 12:
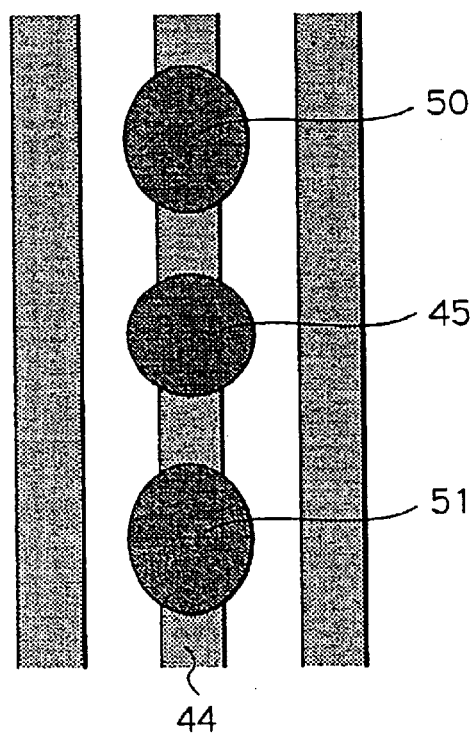
FIG. 12 shows beam spots formed on a disk by the third embodiment.

FIG. 12 shows beam spots 45, 50 and 51 formed on the disk 7. Again, projections and recesses formed on the disk 7 will be referred to as grooves and lands, as seen from the light incidence side. As shown, the beam spots 45, 50 and 51 respectively correspond to the zeroth order light, plus first-order diffracted light and minus first-order diffracted light output from the diffractive optical element 25. The three beam spots 45, 50 and 51 are positioned on the same track (land or groove) 44. The beam spots 50 and 51 derived from the sub-beams are greater in diameter than the beam spot 45 derived from the main beam in the tangential direction of the disk 7 because of the relation in light intensity in the peripheral portion mentioned above. More specifically, the beam spots 50 and 51 are oval.

The illustrative embodiment generates focus error signals, track error signals and an RF signal in the same manner as the first embodiment. The illustrative embodiment generates the various focus error signals described with reference to FIG. 7 and can detect the thickness error of the disk 7 in the same manner as the first embodiment.

Fourth Embodiment

Figure 13:
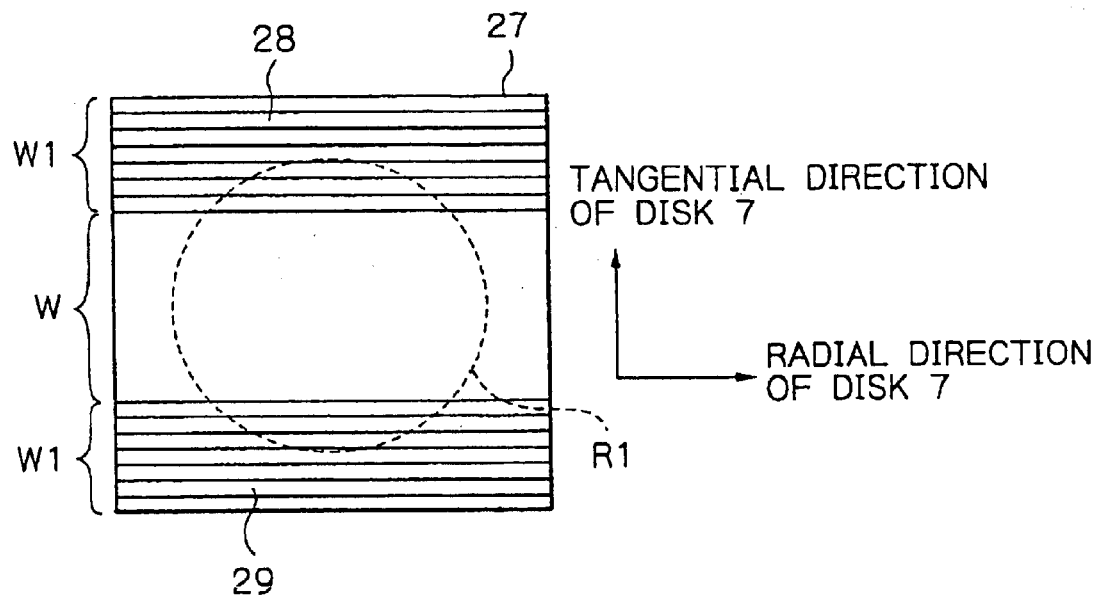
FIG. 13 is a plan view showing a diffractive optical element included in a fourth embodiment of the present invention.

FIG. 13 shows a diffractive optical element 27 included in a fourth embodiment of the present invention in place of the diffractive optical element 3, FIG. 3, of the first embodiment. As for the rest of the configuration, the fourth embodiment is identical with the first embodiment described with reference to FIG. 2. As shown, the diffractive optical element 27 has a diffraction grating only in regions 28 and 29 outside of a zone having a width W smaller than the effective diameter R1 of the lens 6, which is indicated by a dotted circle. The regions 28 and 29 have a width W1 each.

The diffraction grating of the diffractive optical element 27 extends in a direction substantially parallel to the radial direction of the disk 7 and has lines arranged in an equally spaced pattern. Assume that a phase difference between the lines and the spaces of the diffraction grating is $\pi/2$. Then, the optical element 25 transmits about 50% of the light incident to the regions 28 and 29 as the zeroth order light while diffracting about 20.3% of the incident light as each of the plus and minus first-order diffracted light. Further, the optical element 25 transmits substantially the entire light incident to the outside of the regions 28 and 29, i.e., to the zone having the width W. More specifically, the main beam includes both of the light transmitted through the regions 28 and 29 and the light transmitted through the outside of the regions 28 and 29 while the sub-beams include only the light diffracted within the regions 28 and 29. Therefore, the main beam and sub-beams are different from each other as to an intensity distribution on the objective lens 6; the sub-beams are higher than the main beam in light intensity in the peripheral portion in the tangential direction of the disk 7.

Figure 14:
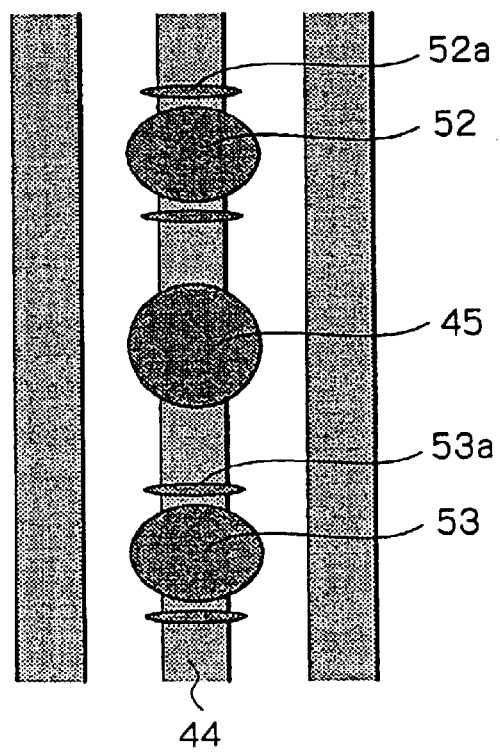
FIG. 14 shows beam spots formed on a disk by the fourth embodiment.

FIG. 14 shows beam spots 45, 52 and 53 formed on the disk 7. Again, projections and recesses formed on the disk 7 will be referred to as grooves and lands, as seen from the light incidence side. As shown, the beam spots 45, 52 and 53 respectively correspond to the zeroth order light, plus first-order diffracted light and minus first-order diffracted light output from the diffractive optical element 27. The three beam spots 45, 52 and 53 are positioned on the same track (land or groove) 44. The beam spots 52 and 53 derived from the sub-beams are smaller in diameter than the beam spot 45 derived from the main beam in the tangential direction of the disk 7 because of the relation in light intensity in the peripheral portion mentioned above.

The illustrative embodiment generates focus error signals, track error signals and an RF signal in the same manner as the first embodiment and generate the various focus error signals described with reference to FIG. 10 (second embodiment). Further, the illustrative embodiment can detect the thickness error of the disk 7 in the same manner as the second embodiment.

Fifth Embodiment

Figure 15:
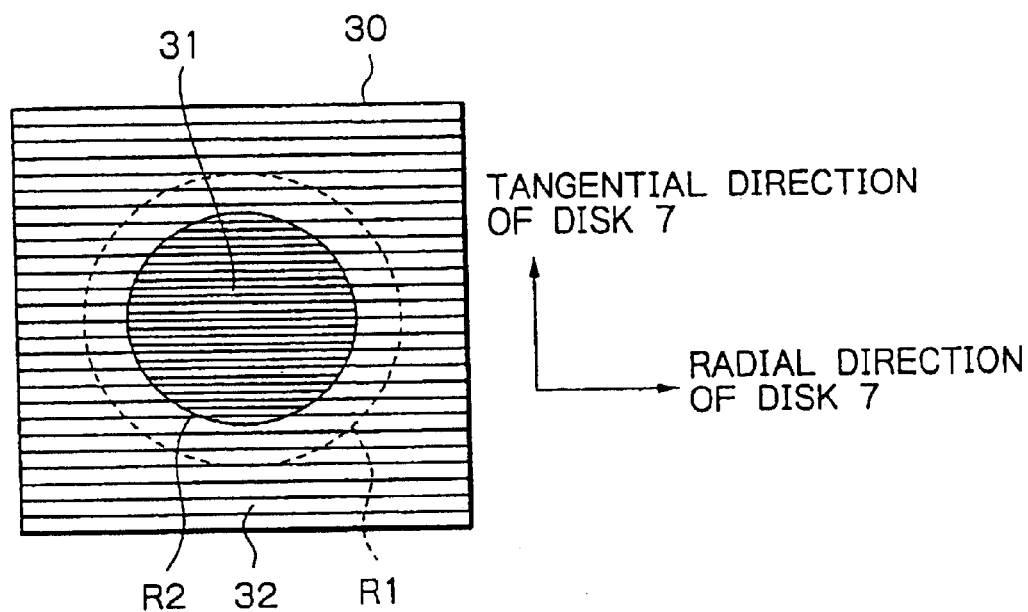
FIG. 15 is a plan view showing a diffractive optical element included in a fifth embodiment of the present invention.

FIG. 15 shows a diffractive optical element 30 included in a fifth embodiment of the present invention in place of the diffractive optical element 3, FIG. 3, of the first embodiment. As for the rest of the configuration, the fifth embodiment is identical with the first embodiment described with reference to FIG. 2. As shown, the diffractive optical element 30 has a diffraction grating in regions 31 and 32 inside and outside, respectively, of a circle having a diameter R2 smaller than the effective diameter R1 of the objective lens 6, which is indicated by a dotted circle.

The diffraction grating of the diffractive optical element 30 extends in a direction substantially parallel to the radial direction of the disk 7 in both of the regions 31 and 32 and has lines arranged in an equally spaced pattern. The pitch between the lines in the region 31 and the pitch between the lines in the region 32 are the same as each other although shown as being different for simple distinction.

The diffraction grating of the optical element 30 has a saw-toothed cross-section in both of the regions 31 and 32. Assume that a phase difference between the peaks and the valleys of the cross-section is 7 by way of example. Then, the optical element 30 transmits about 40.5% of the light incident to the region 31 as the zeroth order light, diffracts about 40.5% of the light as the plus first-order light, and diffracts only about 4.5% of the light as the minus first-order diffracted light. At the same time, the optical element 30 transmits about 40.5% of the light incident to the region 32 as the zeroth order light, diffracts about 40.5% of the light as the minus first-order diffracted light, and diffracts only about 4.5% of the light as the plus first-order diffracted light. In the region 31, the saw-toothed cross-section of the grating is so configured as to deflect the plus first-order diffracted light upward, as viewed in FIG. 15. In the region 32, the saw-toothed cross-section of the grating is so configured as to deflect the minus first-order diffracted light downward, as viewed in FIG. 15.

In the configuration described above, a main beam includes both of the light transmitted through the region 31 and the light transmitted through the region 32. A sub-beam #1, which corresponds to the plus first-order diffracted light output from the optical element 30, mainly includes only the light diffracted within the region 31. A sub-beam #2, which corresponds to the minus first-order diffracted light output from the optical element 30, mainly includes only the light diffracted within the region 32. Therefore, the main beam and sub-beams #1 and #2 are different from each other as to the distribution of light incident to the objective lens 6; the sub-beams #1 and #2 are respectively lower and higher than the main beam in light intensity in the peripheral portion.

Figure 16:
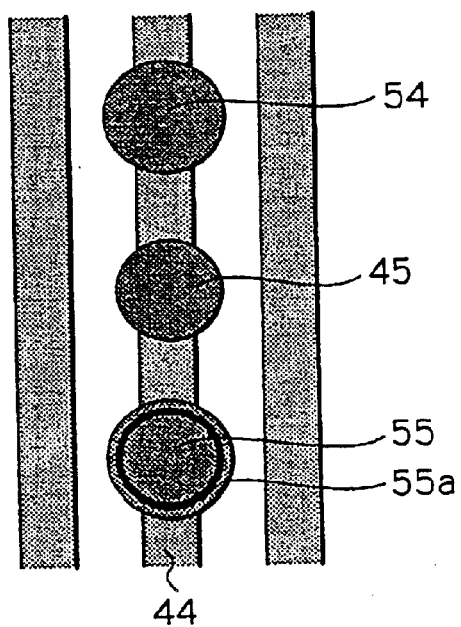
FIG. 16 shows beam spots formed on a disk by the fifth embodiment.

FIG. 16 shows beam spots 45, 54 and 55 formed on the disk 7. Again, projections and recesses formed on the disk 7 will be referred to as grooves and lands, as seen from the light incidence side. As shown, the beam spots 45, 54 and 55 respectively correspond to the zeroth order light, plus first-order diffracted light and minus first-order diffracted light output from the diffractive optical element 30. The three beam spots 45, 54 and 55 are positioned on the same track (land or groove) 44.

The beam spot 54, or sub-beam #1, has a greater diameter than the beam spot or main beam 45 because the sub-beam #1 has lower intensity than the main beam in the peripheral portion. The beam spot 55, or sub-beam #2, has a smaller diameter and a greater sidelobe 55a than the beam spot or main beam 45 because the sub-beam #2 has higher intensity than the main beam in the peripheral portion.

The illustrative embodiment generates focus error signals, track error signals and an RF signal in the same manner as the first embodiment.

Figure 17:
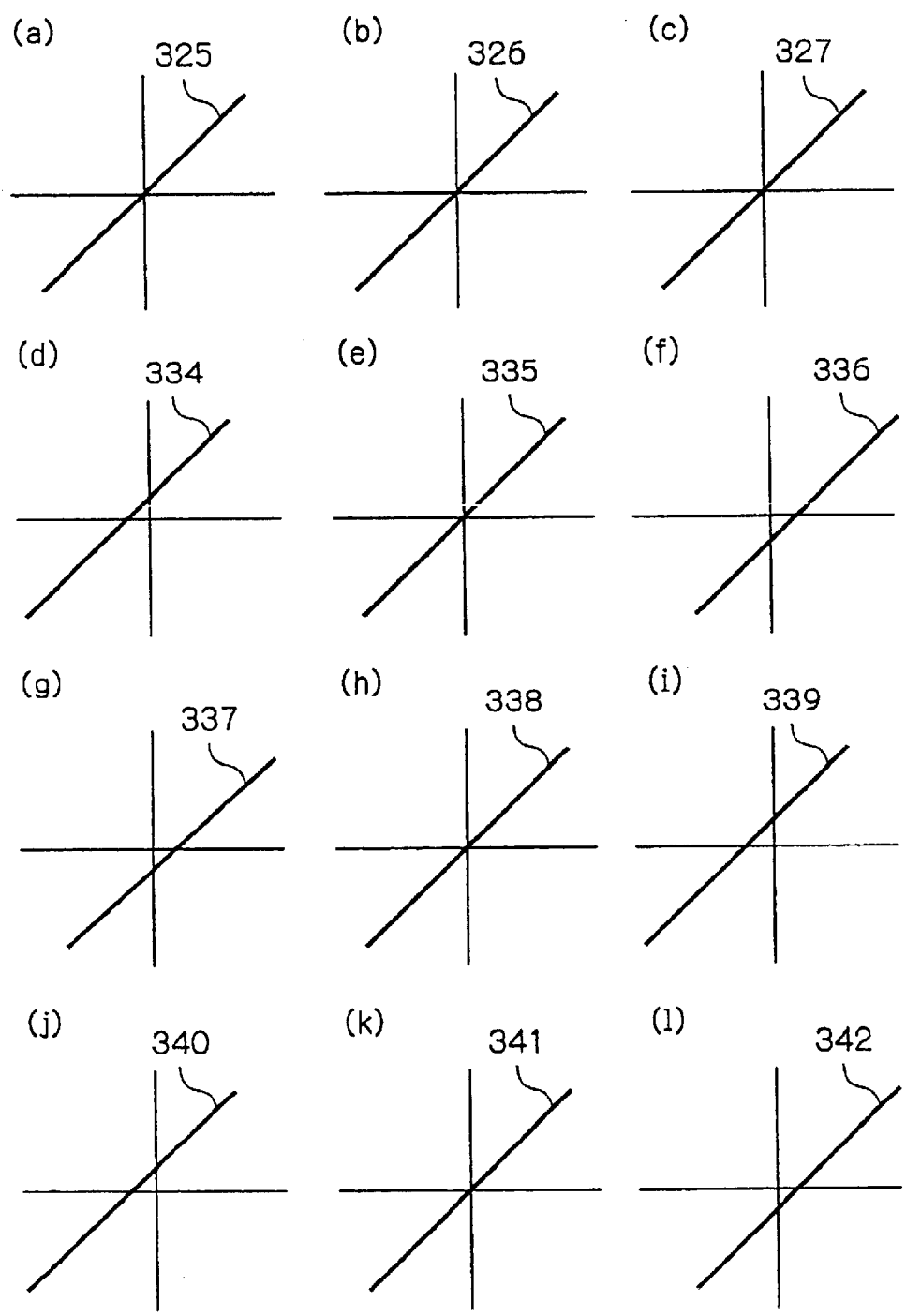
FIG. 17 shows various focus error signals particular to the fifth embodiment.

FIG. 17 shows various focus error signals particular to the fifth embodiment; the abscissa and ordinate indicate the amount of defocus of the disk 7 and focus error signal, respectively. In FIG. 17, (a), (b) and (c) show focus error signals 325, 326 and 327 representative of the focus error signal FEM derived from the beam spot or main beam 45 when the thickness error of the disk 7 is positive, zero and negative, respectively. In FIG. 17, (d), (e) and (f) show focus error signals 334, 335 and 336 representative of the focus error signal FES1 derived from the beam spot 54, or sub-beam #1, when the thickness error is positive, zero and negative, respectively, Likewise, in FIG. 17, (g), (h) and (i) show focus error signals 337, 338 and 339 representative of the focus error signal FES2 derived from the beam spot 55, or sub-beam #2, when the thickness error is positive, negative and zero, respectively. Further, in FIG. 17, (j), (k) and (l) show focus error signals 340, 341 and 342 representative of a difference (FES1–FES2) between the focus error signals to occur when the thickness error is positive, zero and negative, respectively.

When the thickness error of the disk 7 is zero, the main beam and sub-beams #1 and #2 are coincident in the focus position of the beam spot in the direction of optical axis. Therefore, as (b), (e) and (h) of FIG. 17 indicate, the main beam and sub-beams #1 and #2 are coincident in the zero-crossing point of the focus error signal.

By contrast, when the thickness error of the disk 7 is positive (thickness greater than designed one), the focus position of light in the peripheral portion is shifted from the focus position of light in the center portion to the positive side (away from the lens 6) in the direction of optical axis due to positive spherical aberration. The sub-beam #1 is lower in light intensity than the main beam in the peripheral portion, so that the former has smaller positive spherical aberration than the latter. The sub-beam #2 is higher in light intensity than the main beam, so that the former has greater spherical aberration than the latter. As a result, the sub-beam #1 has a focus position shifted from the focus position of the main beam to the negative side in the direction of optical axis. On the other hand, the sub-beam #2 has a focus position shifted from the focus position of the main beam to the positive side. It follows that, as (a), (d) and (g) of FIG. 17 indicate, the sub-beams #1 and #2 respectively cause the zero-crossing points of the focus error signals to be shifted to the negative side and positive side with respect to the main beam in the direction of optical axis.

Further, when the thickness error of the disk 7 is negative (thickness smaller than designed one), the focus position of light in the peripheral portion is shifted from the focus position of light in the center portion to the negative side (toward the lens 6) in the direction of optical axis due to negative spherical aberration. The sub-beam #1 is lower in light intensity than the main beam in the peripheral portion, so that the former has smaller negative spherical aberration than the latter. The sub-beam #2 is higher in light intensity than the main beam in the peripheral portion, so that the former has greater negative spherical aberration than the latter. As a result, the sub-beams #1 and #2 respectively have focus positions shifted from the focus position of the main beam to the positive side and negative side in the direction of optical axis. It follows that, as (c), (f) and (i) of FIG. 17 indicate, the sub-beams #1 and #2 respectively cause the zero-crossing points of the focus error signals to be shifted to the positive side and negative side with respect to the main beam in the direction of optical axis. The shift of the zero-crossing points of the focus error signals of the sub-beams #1 and #2 with respect to the main beam increases with an increase in the thickness error of the disk 7.

When the thickness error of the disk 7 is positive, zero or negative, the focus error signal FES1 of the sub-beam #1 at the position where the focus error signal FEM of the main beam is zero is positive, zero or negative, respectively, while the focus error signal FES2 of the sub-beam #2 is negative, zero or positive, respectively.

The thickness error of the disk 7 can therefore be detected by using the focus error signals FES1 and FES2 derived from the sub-beams #1 and #2 or a difference between the focus error signals (FES1 and FES2) when focus servo is effected with the focus error signal FEM derived from the main beam or a difference between the focus error signals (FES1–FES2). Further, the thickness error can be detected by using a difference between either one of the focus error signal derived from the sub-beam and the focus error signal derived from the main beam (FES1–K·FEM) or (FES2–K·FEM) where K denotes a constant. In addition, the thickness error can be detected by using a difference between the difference between the focus error signals derived from the sub-beams and the focus error signal FEM derived from the main beam ((FES1–FES2)–K·FEM).

Sixth Embodiment

Figure 18:
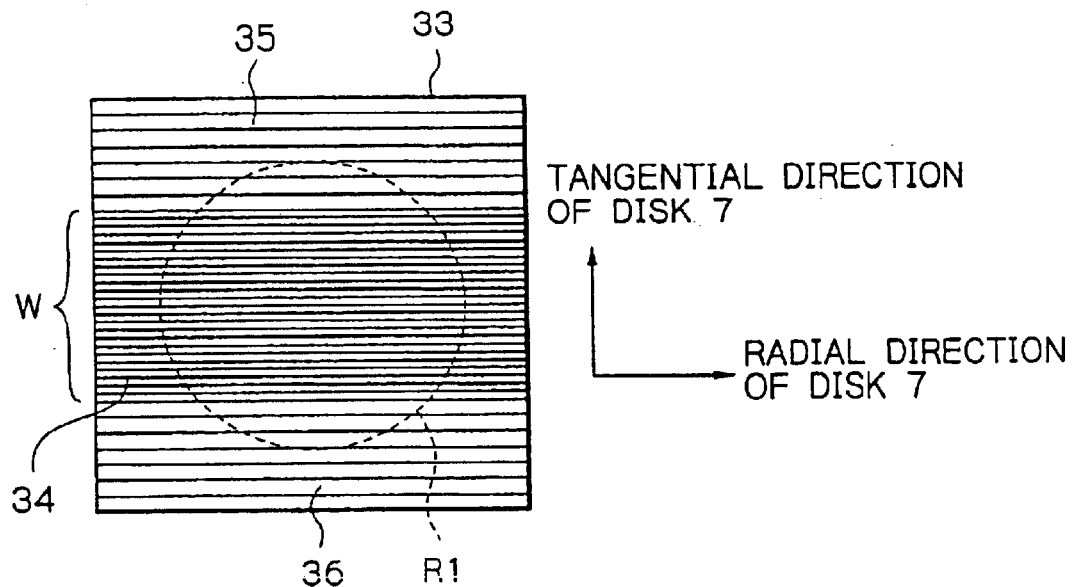
FIG. 18 is a plan view showing a diffractive optical element included in a sixth embodiment of the present invention.

FIG. 18 shows a diffractive optical element 33 included in a sixth embodiment of the present invention in place of the diffractive optical element 3, FIG. 3, of the first embodiment. As for the rest of the configuration, the sixth embodiment is identical with the first embodiment described with reference to FIG. 2. As shown, the diffractive optical element 33 has a diffraction grating in a region 34 and regions 35 and 36 inside and outside, respectively, of a zone having a width W smaller than the effective diameter R1 of the objective lens, which is indicated by a dotted circle.

The diffraction grating of the diffractive optical element 33 extends in a direction substantially parallel to the radial direction of the disk 7 in both of the regions 34, 35 and 36 and has lines arranged in an equally spaced pattern. The pitch between the lines in the region 34 and the pitch between the lines in the regions 35 and 36 are the same as each other although shown as being different for distinction.

The diffraction grating of the optical element 33 has a saw-toothed cross-section in all of the regions 34 through 36. Assume that a phase difference between the peaks and the valleys of the cross-section is π by way of example. Then, the optical element 33 transmits about 40.5% of the light incident to the region 34 as the zeroth order light, diffracts about 40.5% of the light as the plus first-order light, and diffracts only about 4.5% of the light as the minus first-order diffracted light. At the same time, the optical element 33 transmits about 40.5% of the light incident to the regions 35 and 36 as the zeroth order light, diffracts about 40.5% of the light as the minus first-order diffracted light, and diffracts only about 4.5% of the light as the plus first-order diffracted light. In the region 34, the saw-toothed cross-section of the grating is so configured as to deflect the plus first-order diffracted light upward, as viewed in FIG. 18. In the regions 35 and 36, the saw-toothed cross-section of the grating is so configured as to deflect the minus first-order diffracted light downward, as viewed in FIG. 18.

In the configuration described above, a main beam includes both of the light transmitted through the region 34 and the light transmitted through the regions 35 and 36. A sub-beam #1, which corresponds to the plus first-order diffracted light output from the optical element 33, mainly includes only the light diffracted within the region 34. A sub-beam #2, which corresponds to the minus first-order diffracted light output from the optical element 33, mainly includes only the light diffracted within the regions 35 and 36. Therefore, the main beam and sub-beams #1 and #2 are different from each other as to the distribution of light incident to the objective lens 6; the sub-beams #1 and #2 are respectively lower and higher than the main beam in light intensity in the peripheral portion in the tangential direction of the disk 7.

Figure 19:
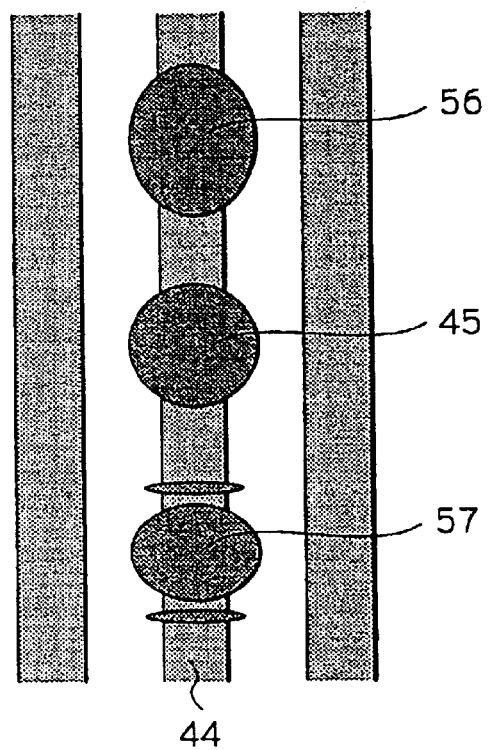
FIG. 19 shows beam spots formed on a disk by the sixth embodiment.

FIG. 19 shows beam spots 45, 56 and 57 formed on the disk 7. Again, projections and recesses formed on the disk 7 will be referred to as grooves and lands, as seen from the light incidence side. As shown, the beam spots 45, 56 and 57 respectively correspond to the zeroth order light, plus first-order diffracted light and minus first-order diffracted light output from the diffractive optical element 33. The three beam spots 45, 56 and 57 are positioned on the same track (land or groove) 44.

The beam spot 56, or sub-beam #1, has a greater diameter than the beam spot or main beam 45 in the tangential direction of the disk 7 because the sub-beam #1 has lower intensity than the main beam in the peripheral portion in the tangential direction of the disk 7. The beam spot 57, or sub-beam #2, has a smaller diameter and a greater sidelobe than the beam spot or main beam 45 in the tangential direction of the disk 7 because the sub-beam #2 has higher intensity than the main beam in the peripheral portion in the tangential direction of the disk 7.

The illustrative embodiment generates focus error signals, track error signals and an RF signal in the same manner as the first embodiment. The illustrative embodiment generates the focus error signals shown in FIG. 17 in the same manner as the fifth embodiment and can detect the thickness error of the disk 7 in the same manner as the fifth embodiment.

Seventh Embodiment

Figure 21:
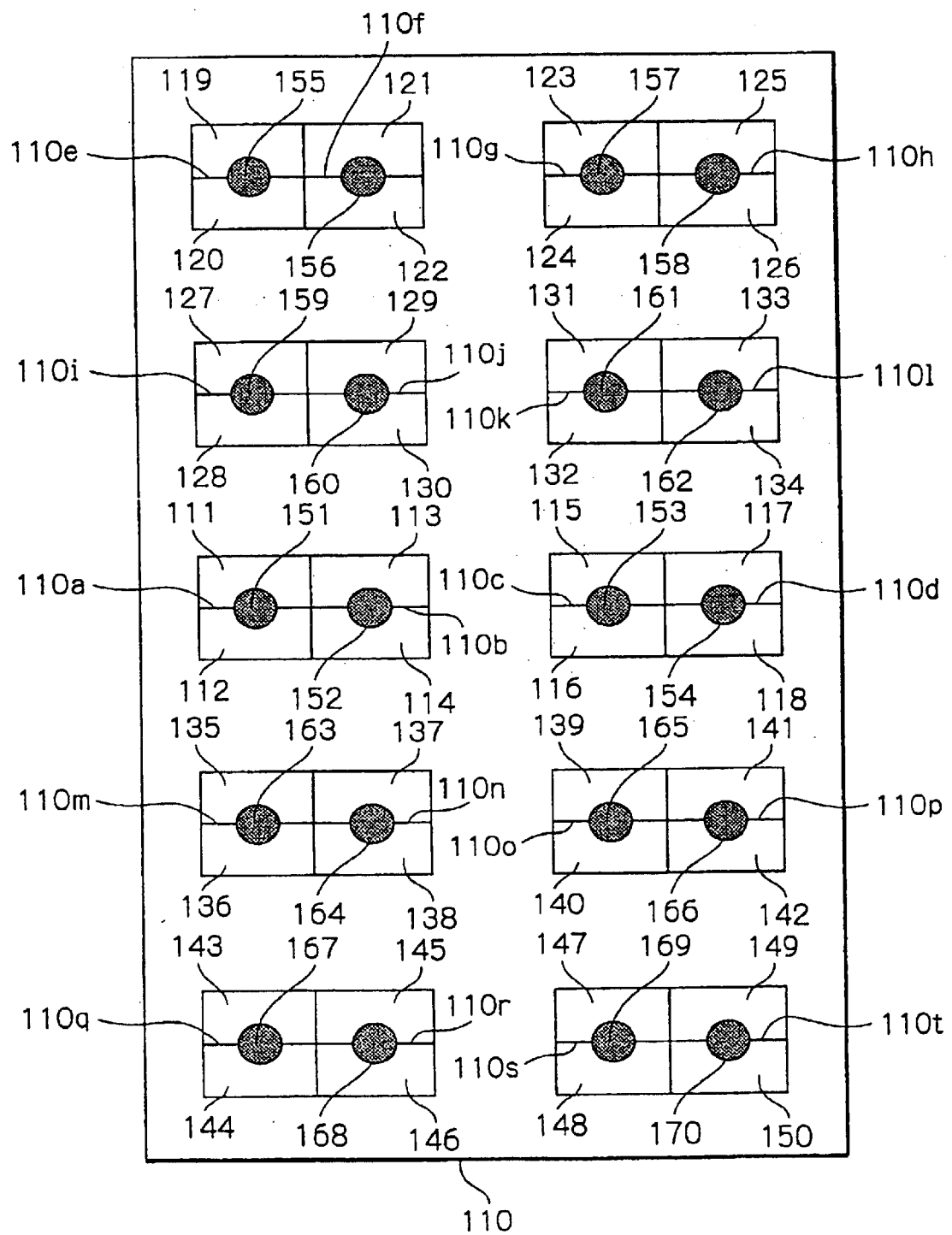
FIG. 21 shows the arrangement of photosensitive portions constituting a photodetector, which is included in the seventh embodiment, together with beam spots formed thereon.

FIG. 21 shows a photodetector 110 included in a seventh embodiment of the present invention in place of the photodetector 10 shown in FIG. 6. The illustrative embodiment uses the diffractive optical element 30 shown in FIG. 15 in combination with the photodetector 110. As for the rest of the configuration, the illustrative embodiment is identical with the first embodiment shown in FIG. 2. The diffractive optical element 30, FIG. 15, has a diffraction grating in the regions 31 and 32 inside and outside, respectively, of the circle having a diameter R2 smaller than the effective diameter R1 of the objective lens 6, which is indicated by a dotted circle.

The diffraction grating of the diffractive optical element 30 extends in a direction substantially parallel to the radial direction of the disk 7 in both of the regions 31 and 32 and has lines arranged in an equally spaced pattern. The difference is that in the illustrative embodiment the pitch between lines in the region 32 is greater than the pitch between lines in the region 31.

Assume that a phase difference between the lines and the spaces of the diffraction grating of the optical element 30 is π/2. Then, the optical element 30 transmits about 50% of the light incident to the region 31 as the zeroth order light while diffracting about 20.3% of the light as each of the plus first-order light. At the same time, the optical element 30 transmits about 50% of the light incident to the region 32 as the zeroth order light while diffracting about 20.3% of the light as each of the plus and minus first-order diffracted light.

In the configuration described above, a main beam includes both of the light transmitted through the region 31 and the light transmitted through the region 32. A sub-beam #1, which corresponds to the plus first-order diffracted light output from the optical element 30, includes only the light diffracted within the region 31. A sub-beam #2, which corresponds to the plus firs-order diffracted light output from the optical element 30, includes only the light diffracted within the region 32. A sub-beam #3, which corresponds to the negative diffracted light output from the optical element 30, includes only the light diffracted within the region 32. Further, a sub-beam #4, which corresponds to the minus first-order diffracted light output from the optical element 30, includes only the light diffracted within the region 31. Therefore, the main beam and sub-beams #1 through #4 are different from each other as to the distribution of light incident to the objective lens 6; the sub-beams #1 and #4 are lower in light intensity in the peripheral portion than the main beam while the sub-beams #2 and #3 are higher in light intensity in the peripheral portion than the main beam.

Figure 20:
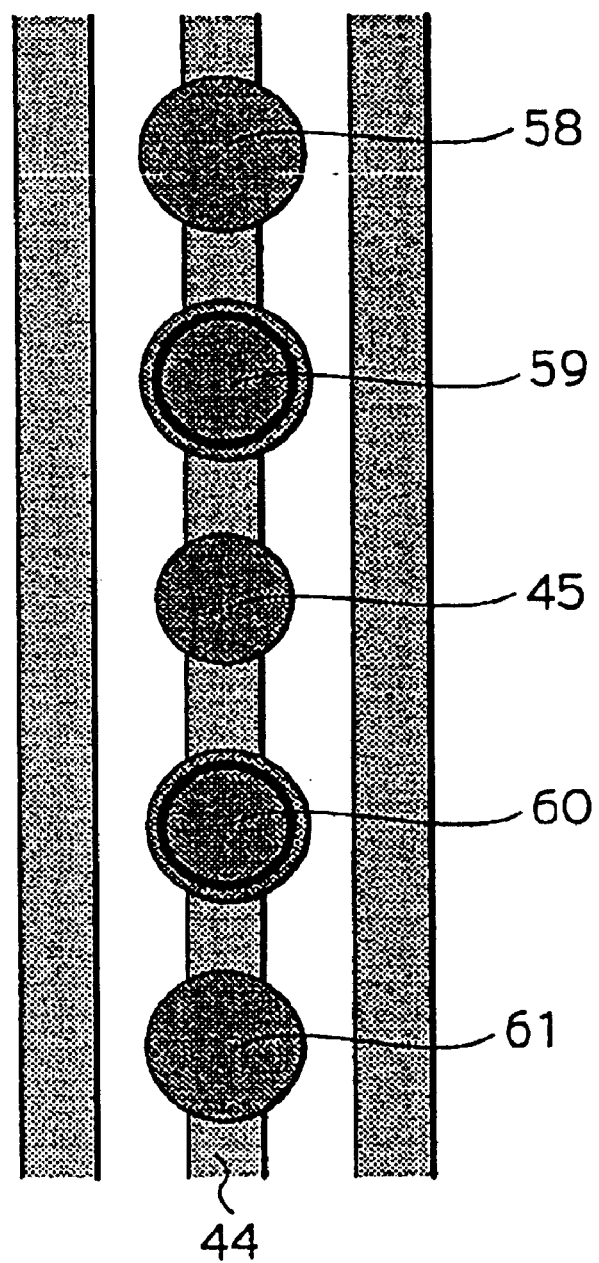
FIG. 20 shows beam spots formed on a disk by a seventh embodiment of the present invention.

FIG. 20 shows beam spots 45, 58, 59, 60 and 61 formed on the disk 7. Again, projections and recesses formed on the disk 7 will be referred to as grooves and lands, as seen from the light incidence side. As shown, the beam spots 45, 58, 59, 60 and 61 respectively correspond to the zeroth order light, plus first-order diffracted light, plus first-order diffracted light, minus first-order diffracted light, and minus first-order diffracted light output from the diffractive optical element 30. The five beam spots 45 and 58 through 61 are positioned on the same track (land or groove) 44.

The beam spots 58 and 61, or sub-beams #1 and #4, have a greater diameter than the beam spot or main beam 45 because the sub-beams #1 and #4 have lower intensity than the main beam in the peripheral portion. The beam spots 59 and 60, or sub-beams #2 and #3, have a smaller diameter and a greater sidelobe than the beam spot or main beam 45 because the sub-beams #2 and #3 have higher intensity than the main beam in the peripheral portion.

FIG. 21 shows the arrangement of photosensitive portions included in the photodetector 10 together with beam spots incident to the photodetector 10 particular to the illustrative embodiment. As shown, a beam spot or main beam 15 corresponds to, among the zeroth order light output from the diffractive optical element 30, the plus first-order diffracted light output from the region 70 of the holographic optical element 8. The beam spot 151 is incident to a boundary 110a between photosensitive portions 111 and 112, which are divided from each other by a line parallel to the radial direction of the disk 7.

A beam spot or main beam 152 corresponds to, among the zeroth order light output from the diffractive optical element 30, the plus first-order diffracted light output from the region 71 of the holographic optical element 8. The beam spot 152 is incident to a boundary 110b between photosensitive portions 113 and 114, which are divided from each other by a line parallel to the radial direction of the disk 7. A beam spot or main beam 153 corresponds to, among the zeroth order light output from the diffractive optical element 30, the plus first-order diffracted light output from the region 72 of the optical element 8. The beam spot 153 is incident to a boundary 110c between photosensitive portions 115 and 116, which are divided from each other by a line parallel to the radial direction of the disk 7. A beam spot or main beam 154 corresponds to, among the zeroth order light output from the diffractive optical element 30, the plus first-order diffracted light output from the region 73 of the optical element 8. The beam spot 154 is incident to a boundary 110d between photosensitive portions 117 and 118, which are divided from each other by a line parallel to the radial direction of the disk 7.

A beam spot 155, or sub-beam #1, corresponds to, among the plus first-order light output from the diffractive optical element 30, the plus first-order diffracted light output from the region 70 of the voptical element 8. The beam spot 155 is incident to a boundary 110e between photosensitive portions 119 and 120, which are divided from each other by a line parallel to the radial direction of the disk 7. A beam spot 156, or sub-beam #1, corresponds to, among the plus first-order light output from the diffractive optical element 30, the plus first-order diffracted light output from the region 71 of the optical element 8. The beam spot 156 is incident to a boundary 110f between photosensitive portions 121 and 122, which are divided from each other by a line parallel to the radial direction of the disk 7. A beam spot 157, or sub-beam #1, corresponds to, among the plus first-order light output from the diffractive optical element 30, the plus first-order diffracted light output from the region 72 of the optical element 8. The beam spot 157 is incident to a boundary 110g between photosensitive portions 123 and 124, which are divided from each other by a line parallel to the radial direction of the disk 7.

A beam spot 158, or sub-beam #1, corresponds to, among the plus first-order light output from the diffractive optical element 30, the plus first-order diffracted light output from the region 73 of the holographic optical element 8. The beam spot 158 is incident to a boundary 110h between photosensitive portions 125 and 126, which are divided from each other by a line parallel to the radial direction of the disk 7. A beam spot 159, or sub-beam #2, corresponds to, among the plus first-order light output from the diffractive optical element 30, the plus first-order diffracted light output from the region 70 of the optical element 8. The beam spot 159 is incident to a boundary 110i between photosensitive portions 127 and 128, which are divided from each other by a line parallel to the radial direction of the disk 7.

A beam spot 160, or sub-beam #2, corresponds to, among the plus first-order light output from the diffractive optical element 30, the plus first-order diffracted light output from the region 71 of the holographic optical element 8. The beam spot 160 is incident to a boundary 110j between photosensitive portions 129 and 130, which are divided from each other by a line parallel to the radial direction of the disk 7. A beam spot 161, or sub-beam #2, corresponds to, among the plus first-order light output from the diffractive optical element 30, the plus first-order diffracted light output from the region 72 of the optical element 8. The beam spot 161 is incident to a boundary 110k between photosensitive portions 131 and 132, which are divided from each other by a line parallel to the radial direction of the disk 7. A beam spot 162, or sub-beam #2, corresponds to, among the plus first-order light output from the diffractive optical element 30, the plus first-order diffracted light output from the region 73 of the optical element 8. The beam spot 162 is incident to a boundary 110l between photosensitive portions 133 and 134, which are divided from each other by a line parallel to the radial direction of the disk 7.

A beam spot 163, or sub-beam #3, corresponds to, among the minus first-order light output from the diffractive optical element 30, the plus first-order diffracted light output from the region 70 of the holographic optical element 8. The beam spot 163 is incident to a boundary 110m between photosensitive portions 135 and 136, which are divided from each other by a line parallel to the radial direction of the disk 7. A beam spot 164, or sub-beam #3, corresponds to, among the minus first-order light output from the diffractive optical element 30, the plus first-order diffracted light output from the region 71 of the optical element 8. The beam spot 164 is incident to a boundary 110n between photosensitive portions 137 and 138, which are divided from each other by a line parallel to the radial direction of the disk 7. A beam spot 165, or sub-beam #3, corresponds to, among the minus first-order light output from the diffractive optical element 30, the plus first-order diffracted light output from the region 72 of the optical element 8. The beam spot 165 is incident to a boundary 110o between photosensitive portions 139 and 140, which are divided from each other by a line parallel to the radial direction of the disk 7.

A beam spot 166, or sub-beam #3, corresponds to, among the minus first-order light output from the diffractive optical element 30, the plus first-order diffracted light output from the region 73 of the holographic optical element 8. The beam spot 166 is incident to a boundary 110p between photosensitive portions 141 and 142, which are divided from each other by a line parallel to the radial direction of the disk 7. A beam spot 167, or sub-beam #4, corresponds to, among the minus first-order light output from the diffractive optical element 30, the plus first-order diffracted light output from the region 70 of the holographic optical element 8. The beam spot 167 is incident to a boundary 110q between photosensitive portions 143 and 144, which are divided from each other by a line parallel to the radial direction of the disk 7. A beam spot 168, or sub-beam #4, corresponds to, among the minus first-order light output from the diffractive optical element 30, the plus first-order diffracted light output from the region 71 of the holographic optical element 8. The beam spot 168 is incident to a boundary 110r between photosensitive portions 145 and 146, which are divided from each other by a line parallel to the radial direction of the disk 7.

A beam spot, or sub-beam #4, 169 corresponds to, among the minus first-order light output from the diffractive optical element 30, the plus first-order diffracted light output from the region 72 of the holographic optical element 8. The beam spot 169 is incident to a boundary 110s between photosensitive portions 147 and 148, which are divided from each other by a line parallel to the radial direction of the disk 7. A beam spot 170, or sub-beam #4, corresponds to, among the minus first-order light output from the diffractive optical element 30, the plus first-order diffracted light output from the region 73 of the holographic optical element 8. The beam spot 170 is incident to a boundary 110t between photosensitive portions 149 and 150, which are divided from each other by a line parallel to the radial direction of the disk 7.

Assume that the photosensitive portions 111 through 150 produce outputs V111 through V150, respectively. Then, a focus error signal FEM derived from the beam spot or main beam 45 is expressed by the Foucault method as:

$$FEM=(V112+V114+V115+V117)-(V111+V113+V116+V118)$$

A focus error signal FES1 derived from the beam spot 58, or sub-beam #1, is expressed by the Foucault method as:

$$FES1=(V120+V122+V123+V125)-(V119+V121+V124+V126)$$

A focus error signal FES2 derived from the beam spot 59, or sub-beam #2, is expressed by the Foucault method as:

$$FES2=(V128+V130+V131+V133)-(V127+V129+V132+V134)$$

A focus error signal FES3 derived from the beam spot 60, or sub-beam #3, is expressed by the Foucault method as:

$$FES3=(V136+V138+V139+V141)-(V135+V137+V140+V142)$$

A focus error signal FES4 derived from the beam spot 61, or sub-beam #4, is expressed by the Foucault method as:

$$FES4=(V144+V146+V147+V149)-(V143+V145+V148+V150)$$

The focus error signal FEM is used for focus servo.

On the other hand, a track error signal TEM derived from the beam spot or main beam 45 is expressed by the push-pull method as:

$$TEM=(V111+V112+V115+V116)-(V113+V114+V117+V118)$$

A track error signal TES1 derived from the beam spot 58, or sub-beam #1, is expressed by the push-pull method as:

$$TES=(V119+V120+V123+V124)-(V121+V122+V125+V126)$$

A track error signal TES2 derived from the beam spot 59, or sub-beam #2, is expressed by the push-pull method as:

$$TES2=(V127+V128+V131+V132)-(V129+V130+V133+V134)$$

A track error signal TES3 derived from the beam spot 60, or sub-beam #3, is expressed by the push-pull method as:

$$TES3=(V135+V136+V139+V140)-(V137+V138+V141+V142)$$

A track error signal TES4 derived from the beam spot 61, or sub-beam #4, is expressed by the push-pull method as:

$$TES4=(V143+V144+V147+V148)-(V145+V146+V149+V150)$$

The track error signal TEM is used for track servo.

An RF signal derived from the beam spot or main beam 45 is produced by:

$$RF=(V111+V112+V113+V114+V115+V116+V117+V118)$$

The illustrative embodiment also generates the focus error signals described with reference to FIG. 17. In FIG. 17, (a), (b) and (c) show the focus error signals 325, 326 and 327 representative of the focus error signals FEM derived from the beam spot or main beam 45 to appear when the thickness error of the disk 7 is positive, zero and negative, respectively. In FIG. 17, (d), (e) and (f) show focus error signals 334, 335 and 336 representative of the focus error signals FES1 and FES4 derived from the beam spots 58 and 61, or sub-beams #1 and #4, when the thickness error is positive, zero and negative, respectively.

In FIG. 17, (g), (h) and (i) show focus error signals 337, 338 and 339 representative of the focus error signals FES2 and FES3 derived from the beam spots 59 and 60, or sub-beams #2 and #3, when the thickness error is positive, zero and negative, respectively. Further, (j), (k) and (l) show focus error signals 340, 341 and 342 representative of a difference (FES1−FES2) between the focus error signals, a difference (FES4−FES3) between the focus error signals and a difference ((FES1+FES4)−(FES2+FES3)) between the sums of the above focus error signals to occur when the thickness error is positive, zero and negative, respectively.

When the thickness error of the disk 7 is zero, the main beam and sub-beams #1 through #4 are coincident in the focus position of the beam spot in the direction of optical axis. Therefore, as (b), (e) and (h) of FIG. 17 indicate, the main beam and sub-beams #1 through #4 are coincident in the zero-crossing point of the focus error signal.

By contrast, when the thickness error of the disk 7 is positive (thickness greater than designed one), the focus position of light in the peripheral portion is shifted from the focus position of light in the center portion to the positive side (away from the objective lens 6) in the direction of optical axis due to positive spherical aberration. The sub-beams #1 and #4 are lower in light intensity than the main beam in the peripheral portion, so that the former has smaller positive spherical aberration than the latter. The sub-beams

2 and #3 are higher in light intensity than the main beam in the peripheral portion, so that the former has greater positive spherical aberration than the latter. As a result, the sub-beams #1 and #4 have focus positions shifted from the focus position of the main beam to the negative side in the direction of optical axis. Also, the sub-beams #2 and #3 have focus positions shifted from the focus position of the main beam to the positive side in the direction of optical axis. It follows that, as (a), (d) and (g) of FIG. 17 indicate, the sub-beams #1 and #4 cause the zero-crossing points of the focus error signals to be shifted to the negative side with respect to the main beam while the sub-beams #2 and #3 cause the zero-crossing points to be shifted to the positive side.

Further, when the thickness error of the disk 7 is negative (thickness smaller than designed one), the focus position of light in the peripheral portion is shifted from the focus position of light in the center portion to the negative side (toward the objective lens 6) in the direction of optical axis due to negative spherical aberration. The sub-beams #2 and #4 are lower in light intensity than the main beam in the peripheral portion, so that the former has smaller negative spherical aberration than the latter. The sub-beams #2 and #3 are higher in light intensity than the main beam in the peripheral portion, so that the former has greater negative spherical aberration than the latter. As a result, the sub-beams #1 and #4 have focus positions shifted from the focus position of the main beam to the positive side in the direction of optical axis. Also, the sub-beams #2 and #3 have focus positions shifted from the focus position of the main beam to the negative side in the direction of optical axis. It follows that, as (c), (f) and (i) of FIG. 17 indicate, the sub-beams #1 and #4 cause the zero-crossing points of the focus error signals to be shifted to the positive side with respect to the main beam. At the same time, the sub-beams #2 and #3 cause the zero-crossing points of the focus error signals to be shifted to the negative side with respect to the main beam. The shift of the zero-crossing points of the focus error signals of the sub-beam #1 through #4 with respect to the main beam increases with an increase in the thickness error of the disk 7.

When the thickness error of the disk 7 is positive, zero or negative, the focus error signals FES1 and FES4 of the sub-beams #1 and #4 at the position where the focus error signal FEM of the main beam is zero each are positive, zero or negative, respectively. By contrast, the focus error signals FES2 and FES3 of the sub-beams #2 and #3 each are negative, zero or positive.

The thickness error of the disk 7 can therefore be detected by using the focus error signals FES1 through FES4 derived from the sub-beams #1 through #4 or a difference between two focus error signals (FES1 and FES2) or (FES4 and FES3) or a difference between the sums (FES1+FES4) and FES2+FES3) when focus servo is effected with the focus error signal FEM derived from the main beam. Further, the thickness error can be detected by using a difference between the focus error signal derived from the sub-beam and the focus error signal derived from the main beam (FES1−K·FEM), (FES2−K·FEM), (FES3−K·FEM) or (FES4−K·FEM) or a difference ((FES1−FES2)−K·FEM) or ((FES4−FES3)−K·FEM). In addition, the thickness error can be detected by using a difference between the sums of the focus error signals derived from two sub-beams and the focus error signals derived from the other two sub-beams and the focus error signal of the main beam ((FES1+FES4)−(FES2+FES3)−K·FEM).

Eighth Embodiment

This embodiment uses the diffractive optical element 33, FIG. 18, in place of the diffractive optical element 3, FIG. 2 and uses the photodetector 110, FIG. 21, in place of the photodetector 10, FIG. 6. As shown, the diffractive optical element 33 has a diffraction grating in the region 34 and regions 35 and 36 inside and outside, respectively, of the zone having the width W smaller than the effective diameter R1 of the objective lens, which is indicated by a dotted circle.

The diffraction grating of the diffractive optical element 33 extends in a direction substantially parallel to the radial direction of the disk 7 in all of the regions 34, 35 and 36 and has lines arranged in an equally spaced pattern. In the illustrative embodiment, the pitch between the lines in the regions 35 and 36 is selected to be greater than the pitch between the lines in the region 34.

Assume that a phase difference between the lines and the spaces of the diffraction grating of the optical element 33 is $\pi/2$. Then, the optical element 33 transmits about 50% of the light incident to the region 34 as the zeroth order light while diffracting about 20.3% of the light as each of the plus and minus first-order light. At the same time, the optical element 33 transmits about 50% of the light incident to the regions 35 and 36 as the zeroth order light while diffracting about 20.3% of the light as each of the plus and minus first-order diffracted light.

In the configuration described above, a main beam includes both of the light transmitted through the region 34 and the light transmitted through the regions 35 and 36. A sub-beam #1, which corresponds to the plus first-order diffracted light output from the optical element 33, includes only the light diffracted within the region 34. A sub-beam #2, which corresponds to the plus first-order diffracted light output from the optical element 33, includes only the light diffracted within the regions 35 and 36. A sub-beam #3, which corresponds to the minus first-order diffracted light output from the optical element 33, includes only the light diffracted within the regions 35 and 36. Further, a sub-beam #4, which corresponds to the minus first-order diffracted light output from the optical element 33, includes only the light diffracted within the region 34. Therefore, the main beam and sub-beams #1 through #4 are different from each other as to the distribution of light incident to the objective lens 6; the sub-beams #1 and #4 are lower in light intensity in the peripheral portion than the main beam while the sub-beams #2 and #3 are higher in light intensity in the peripheral portion than the main beam.

Figure 22:
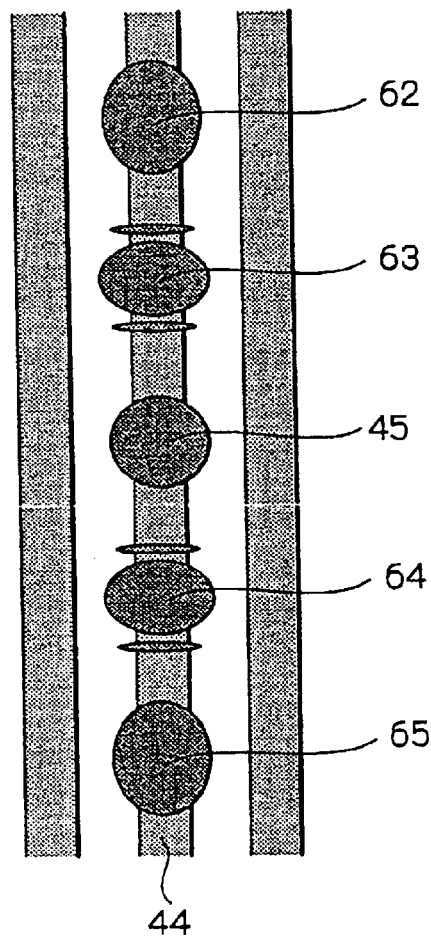
FIG. 22 shows beam spots formed on a disk by an eighth embodiment of the present invention.

FIG. 22 shows beam spots 45, 62, 63, 64 and 65 formed on the disk 7. Again, projections and recesses formed on the disk 7 will be referred to as grooves and lands, as seen from the light incidence side. As shown, the beam spots 45, 62, 63, 64 and 65 respectively correspond to the zeroth order light, plus first-order diffracted light, plus first-order diffracted light, minus first-order diffracted light and minus first-order diffracted light output from the diffractive optical element 33. The five beam spots 45 and 62 through 65 are positioned on the same track (land or groove) 44.

The beam spots 62 and 65, or sub-beams #1 and #4, have lower intensity in the peripheral portion than the main beam in the tangential direction of the disk 7. Therefore, the beam spot 62 of the sub-beam #1 and the beam spot 65 of the sub-beam #4 each have a greater diameter than the beam spot 45 in the tangential direction of the disk 7. The beam spots 63 and 64, or sub-beams #2 and #3, have higher intensity than the main beam in the peripheral portion in the tangential direction of the disk 7. Therefore, the beam spot 63 of the sub-beam #2 and the beam spot 64 of the sub-beam #3 each have a smaller diameter and a greater sidelobe than the beam spot 45 in the tangential direction of the disk 7.

The illustrative embodiment also generates the focus error signals described with reference to FIG. 17 and can detect the thickness error of the disk 7 in the same manner as the seventh embodiment.

Ninth Embodiment

Figure 23:
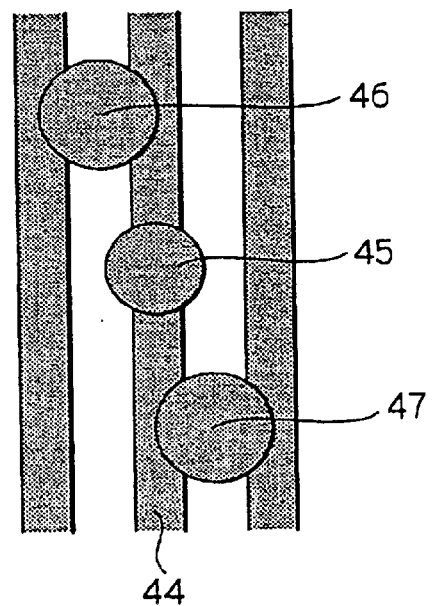
FIG. 23 shows beam spots formed on a disk by a ninth embodiment of the present invention.

This embodiment is identical with the first embodiment except that the arrangement of beam spots shown in FIG. 23 is substituted for the arrangement of beam spots shown in FIG. 4. As for the rest of the configuration, the illustrative embodiment is identical with the first embodiment. In the illustrative embodiment, to implement the arrangement shown in FIG. 23, the diffraction grating formed in the region 22 of the diffractive optical element 3 is rotated by a preselected angle from the direction substantially parallel to the radial direction of the disk 7. Again, the projections and recesses of the grooves formed in the disk 7 will be referred to as grooves and lands, as seen from the light incidence side of the disk 7.

As shown in FIG. 23, the beam spots 45, 46 and 47 respectively correspond to the zeroth order light, plus first-order diffracted light, and minus first-order diffracted light. The beam spot 45 is positioned on the track (land or groove) 44 while the beam spot 46 is positioned on a track (groove or land) located at the left of the track 44. Further, the beam spot 47 is positioned on a track (groove or land) located at the right of the track 44. The beam spots 46 and 47, or sub-beams, have a greater diameter than the beam spot or main beam 45 because the former is lower in light intensity in the peripheral portion than the latter.

The illustrative embodiment generates focus error signals, track error signals and an RF signal in the same manner as the first embodiment and can detect the thickness error of the disk 7 in the same manner as the first embodiment. The focus error signals are identical with the signals shown in FIG. 7.

In the illustrative embodiment, the track error signal TEM derived from the beam spot or main beam 45 and the track error signals TES1 and TES2 derived from the beam spots or sub-beams 46 and 47 are opposite in polarity to each other. On the other hand, when the objective lens 6 is shifted in the radial direction of the disk 7, offset occurs in the track error signals, but the track error signal TEM and the tack error signals TES1 and TES2 are identical with each other as to the sign of the offset. Therefore, if a difference between the track error signal TEM and a sum of the track error signals TES1 and TES2, i.e., (TEM−K·(TES1+TES2)) is used for track servo, there can be implemented track servo operation that cancels the above offset ascribable to the shift of the objective lens 6.

If desired, the beam spot arrangement shown in FIG. 23 may be replaced with any one of the beam spot arrangements of the second through sixth embodiments. In such a case, the beam spot corresponding to the zeroth order light is positioned on the track (land or groove) 44. The beam spot corresponding to the plus first-order diffracted light is positioned on the track (groove or land) located at the left of the track 44. The beam spot corresponding to the minus first-order diffracted light is positioned on the track (groove or land) located at the right of the track 44. This is also successful to implement track servo operation that cancels the offset ascribable to the shift of the objective lens 6.

Tenth Embodiment

Figure 24:
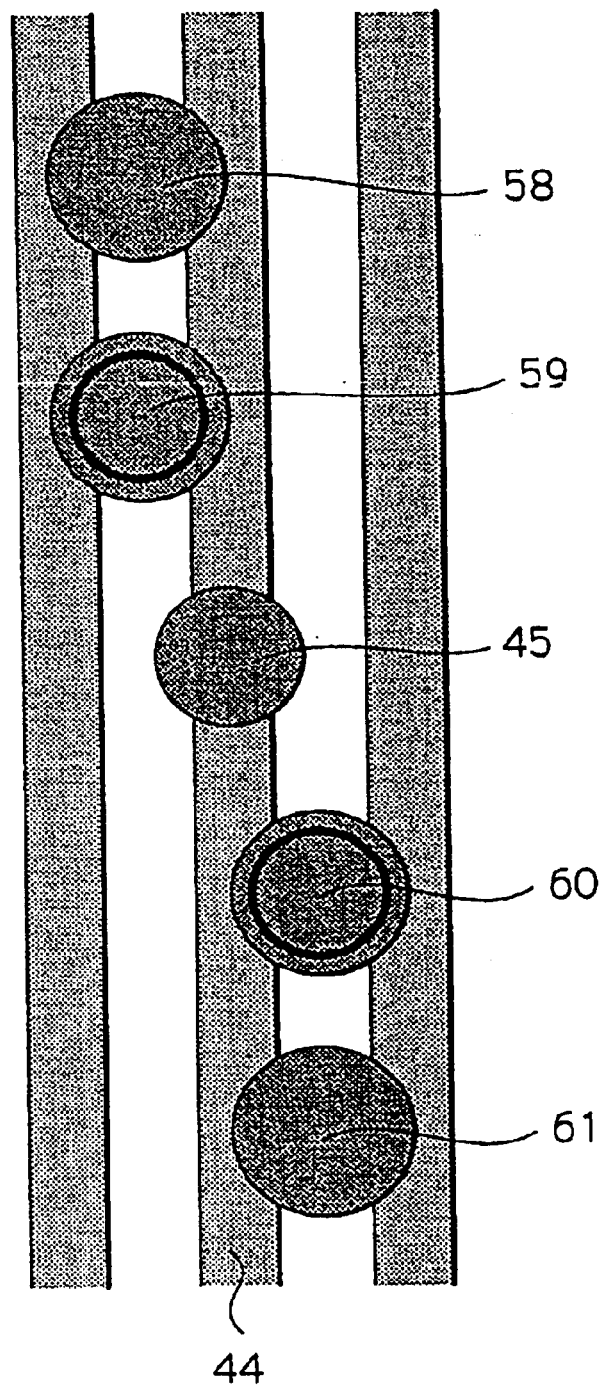
FIG. 24 shows beam spots formed on a disk by a tenth embodiment of the present invention.

FIG. 24 shows an arrangement of beam spots 45, 58, 59, 60 and 61 unique to a tenth embodiment and substituted for the arrangement shown in FIG. 20 (seventh embodiment).

To implement the arrangement of FIG. 24, the diffraction grating of the diffractive optical element 30 is rotated by a preselected angle from the direction substantially parallel to the radial direction of the disk 7. Again, the projections and recesses of the grooves formed in the disk 7 will be referred to as grooves and lands, as seen from the light incidence side of the disk 7.

As shown in FIG. 24, the beam spots 45, 58, 59, 60 and 61 respectively correspond to the zeroth order light, plus first-order diffracted light, plus first-order diffracted light, minus first-order diffracted light, and minus first-order diffracted light. The beam spot 45 is positioned on the track (land or groove) 44 while the beam spots 58 and 59 are positioned on a track (groove or land) located at the left of the track 44. Further, the beam spots 60 and 61 are positioned on a track (groove or land) located at the right of the track 44.

The beam spots 58 and 61, or sub-beams #1 and #4, have a greater diameter than the beam spot or main beam 45 because the sub-beams #1 and #4 have lower intensity than the main beam in the peripheral portion. The beam spots 59 and 60, or sub-beams #2 and #3, have a smaller diameter and a greater sidelobe than the beam spot or main beam 45 because the sub-beams #2 and #3 have higher intensity than the main beam in the peripheral portion.

The illustrative embodiment uses the photodetector 110 of the seventh embodiment having the configuration shown in FIG. 21 and generates focus error signals, track error signals and an RF signal in the same manner as the seventh embodiment.

Figure 25:
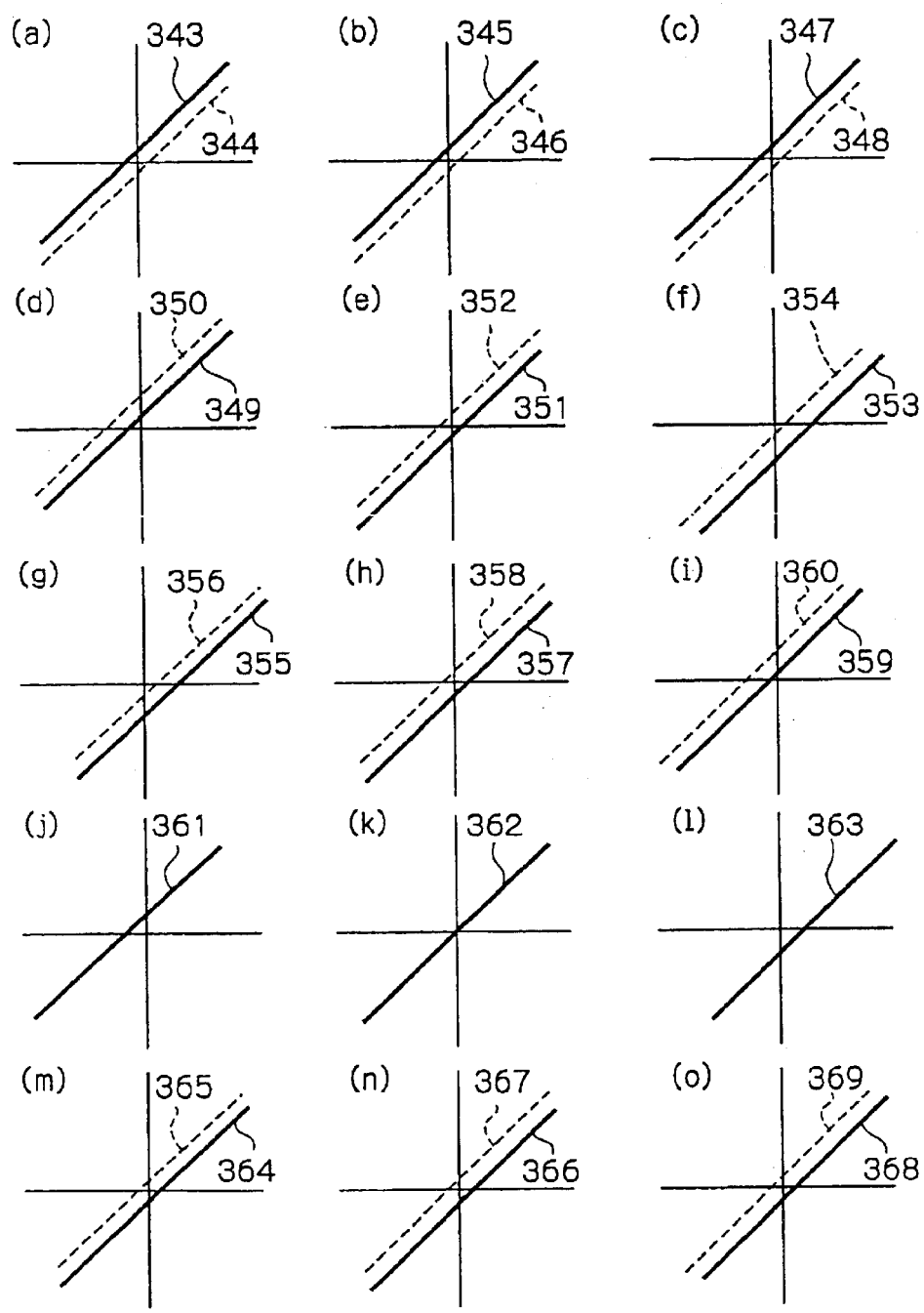
FIG. 25 shows various focus error signals particular to the tenth embodiment.

FIG. 25 shows various focus error signals particular to the illustrative embodiment; the abscissa and ordinate indicate the amount of defocus of the disk 7 and focus error signal, respectively. Also, in FIG. 25, solid lines and dotted lines respectively indicate land focus error signals to appear when the beam spot or main beam 45 is positioned on a land and groove focus error signals to appear when it is positioned on a groove.

Specifically, in FIG. 25, (a), (b) and (c) respectively show focus error signals 343, 345 and 347 that are land focus error signals $FEM_L$ derived from the beam spot or main beam 45 to appear when the thickness error of the disk 7 is positive, zero and negative, respectively. Focus error signals 344, 346 and 348 also shown in (a), (b) and (c) are groove focus error signals $FEM_G$ output in the above condition. In FIG. 25, (d), (e) and (f) show focus error signals 349, 351 and 353 that are land focus error signals $FES1_L$ derived from the beam spot 58, or sub-beam #1, and land focus error signals $FES4_L$ derived from the beam spot 61, or sub-beam #4, to appear when the thickness error of the disk 7 is positive, zero and negative, respectively. Focus error signals 350, 352 and 354 also shown in (d), (e) and (f) are groove focus error signals $FES1_G$ derived from the beam spot 58, or sub-beam #1, and groove focus error signals $FES1_G$ derived from the beam spot 61, or sub-beam #4, in the same condition. In FIG. 25, (g), (h) and (i) show focus error signals 355, 357 and 359 that are land focus error signals $FES2_L$ derived from the beam spot 59, or sub-beam #2, and land focus error signals $FES3_L$ derived from the beam spot 60, or sub-beam #3, to appear when the thickness error of the disk 7 is positive, zero and negative, respectively. Focus error signals 356, 358 and 360 also shown in (g), (h) and (i) are groove focus error signals $FES2_G$ derived from the beam spot 59, or sub-beam #2, and groove focus error signals $FES3_G$ derived from the beam spot 60, or sub-beam #3, in the same condition.

Even when the thickness error of the disk 7 is zero, the focus error signals at the position where defocus is zero are not precisely zero, although not described in relation to FIG. 7, 10 or 17. Specifically, in FIG. 25, the land focus error signals and groove focus error signals in (b) have positive offset and negative offset, respectively, while the land focus error signals and groove focus error signals in (e) and (h) have negative offset and positive offset, respectively. Such offset is, in principle, ascribable to the grooves formed in the disk 7. This is why the land focus error signals and groove focus error signals in (a), (b) and (c) are relatively shifted upward and downward, respectively, and the land focus error signals and groove focus error signals in (d) through (i) are shifted relatively downward and upward, respectively.

In FIG. 25, (j), (k) and (l) show focus error signals 361, 362 and 363 representative of differences between the land and focus error signals ($FES1_L$–$FES2_L$) and ($FES4_L$–$FES3_L$) to occur when the thickness error of the disk is positive, zero and negative, a difference between the sums of the focus error signals (($FES1_L$+$FES4_L$)–($FES2_L$+$FES3_L$)), differences between the sums of the groove focus error signals ($FES1_G$–$FES2_G$) and ($FES4_G$–$FES3_G$), and a difference between the sums of the focus error signals (($FES1_G$+$FES4_G$)–($FES2_G$+$FES3_G$)). In FIG. 25, (m), (n) and (o) show focus error signals 364, 366 and 368 representative of sums between the land focus error signals ($FES1_L$+$FES2_L$) and ($FES4_L$+$FES3_L$) to occur when the thickness error of the disk is positive, zero and negative, and a sum of the four focus error signals ($FES1_L$+$FES2_L$+$FES3_L$+$FES4_L$); focus error signals 365, 367 and 369 representative of a sum between the groove focus error signals ($FES1_G$+$FES2_G$) and ($FES3_G$+$FES4_G$), and a sum of the four focus error signals ($FES1_G$+$FES2_G$+$FES3_G$+$FES4_G$)).

When the thickness error of the disk 7 is zero, the main beam and sub-beams #1 through #4 are coincident in the focus position of the beam spot in the direction of optical axis. Therefore, as (b) (e) and (h) of FIG. 25 indicate, the main beam and sub-beams #1 through #4 are coincident in the mean zero-crossing point of the land and groove focus error signals.

By contrast, when the thickness error of the disk 7 is positive (thickness greater than designed one), the focus position of light in the peripheral portion is shifted from the focus position of light in the center portion to the positive side (away from the objective lens 6) in the direction of optical axis due to positive spherical aberration. The sub-beams #1 and #4 are lower in light intensity than the main beam in the peripheral portion, so that the former has smaller positive spherical aberration than the latter. The sub-beams #2 and #3 are higher in light intensity than the main beam, so that the former has greater spherical aberration than the latter. As a result, the sub-beams #1 and #4 each have a focus position shifted from the focus position of the main beam to the negative side in the direction of optical axis. On the other hand, the sub-beams #2 and #3 each have a focus position shifted from the focus position of the main beam to the positive side. It follows that, as (a), (d) and (g) of FIG. 25 indicate, the sub-beams #1 and #4 cause the mean zero-crossing point of the land and groove focus error signals to be shifted to the negative side while the sub-beams #2 and #3 cause it to be shifted to the positive side.

Further, when the thickness error of the disk 7 is negative (thickness smaller than designed one), the focus position of light in the peripheral portion is shifted from the focus position of light in the center portion to the negative side (toward the objective lens 6) in the direction of optical axis due to negative spherical aberration. The sub-beams #1 and #4 are lower in light intensity than the main beam in the peripheral portion, so that the former has smaller negative spherical aberration than the latter. The sub-beams #2 and #3 are higher in light intensity than the main beam in the peripheral portion, so that the former has greater negative spherical aberration than the latter. As a result, the sub-beams #1 and #4 each have the focus position in the direction of optical axis shifted from the focus position of the main beam to the positive side while the sub-beams #2 and #3 have it shifted to the negative side. It follows that, as (c), (f) and (i) of FIG. 25 indicate, the sub-beams #1 and #4 cause the mean zero-crossing point of the land and groove focus error signals to be shifted from the main beam to the positive side while the sub-beams #2 and #3 cause it to be shifted to the negative side. The shift of the mean zero-crossing points of the land and groove focus error signals of the sub-beams #1 through #4 with respect to the main beam increases with an increase in the thickness error of the disk 7.

In FIG. 25, (j), (k) and (l), the offsets of the land and groove focus error signals cancel each other, leaving only the shift of the zero-crossing point of the focus error signal ascribable to the thickness error of the disk 7. On the other hand, in FIG. 25, (m), (n) and (o), the shifts of the zero-crossing points of the land and groove focus error signals cancel each other, leaving only the offsets of the land and groove focus error signals. The offsets shown in (a), (b) and (c) and those shown in (m), (n) and (o) are opposite in sign to each other. Therefore, if (FEM+K·(FES1+FES2)), (FEM+K·(FES3+FES4)) and (FEM+K·(FES1+FES2+FES3+FES4)) are used for servo control, there can be implemented focus servo operation with the offsets of the land and groove focus error signals canceling each other.

When the thickness error of the disk 7 is positive, zero or negative, the values of (FES1–FES2), (FES4–FES3) and (FES1+FES4)–(FES2+FES3) at positions where (FEM+K·(FES1+FES2)), (FEM+K·(FES3+FES4)) and (FEM+K·(FES1+FES2+FES3+FES4)) are zero are positive, zero or negative, respectively. It is therefore possible to detect the thickness error of the disk 7 on the basis of (FES1–FES2), (FES4–FES3) and ((FES1+FES4)–(FES2+FES3)) occurred at the time of focus servo, which uses (FEM+K·(FES1+FES2)), (FEM+K·(FES3+FES4)) and (FEM+K·(FES1+FES2+FES3+FES4)). The detection is free from the influence of the offsets of the land and groove focus error signals.

In the illustrative embodiment, the track error signals TES1 through TES4 respectively derived from the beam spots 58 through 61, or sub-beams #1 through #4, are opposite in sign to the track error signal TEM derived from the beam spot or main beam 45.

On the other hand, when the objective lens 6 is shifted in the radial direction of the disk 7, an offset occurs in each track error signal. However, the track error signal TEM and track error signals TES1 through TES4 are identical with each other as to the sign of the offset. Therefore, if (TEM–K·(TES1+TES2+TES3+TES4)) is used for track serve, there can be implemented track servo operation with the offsets of the track error signals ascribable to the shift of the lens 6 canceling each other.

If desired, the beam spots shown in FIG. 22 (eighth embodiment) may be rearranged in the pattern shown in FIG. 24 (tenth embodiment). In such a case, the beam spot corresponding to the zeroth order light output from the diffractive optical element will be positioned on the track 44 (land or groove). Also, the beam spots corresponding to the plus first-order diffracted light and minus first-order diffracted light will be respectively positioned on the track (groove or land) located at the left of the track 44 and track (groove or land) located at the right of the same. This is also successful to achieve the advantages of the tenth embodiment stated above.

Eleventh Embodiment

Figure 26:
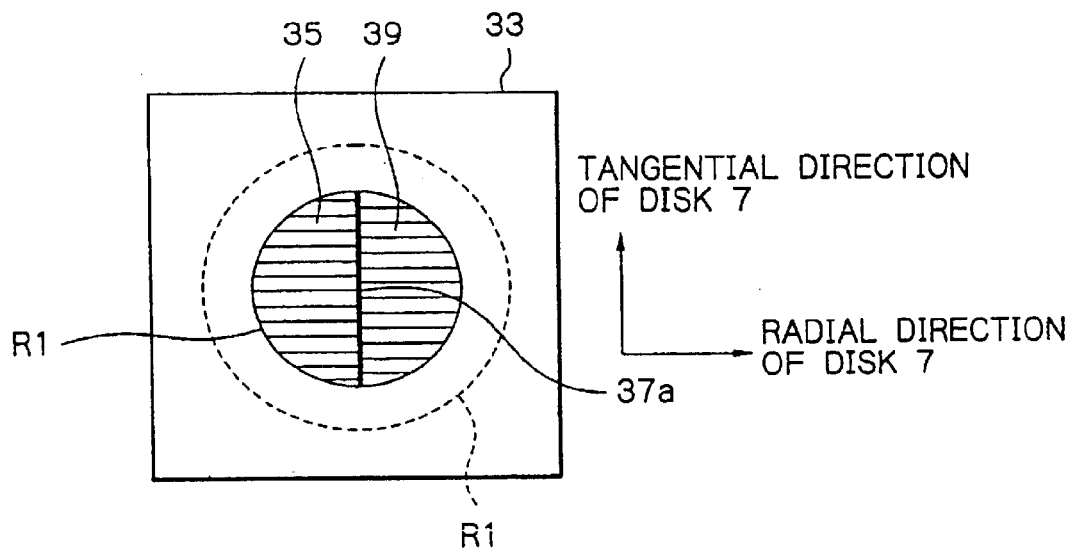
FIG. 26 is a plan view showing a diffractive optical element included in an eleventh embodiment of the present invention.

FIG. 26 shows a diffractive optical element 37 included in an eleventh embodiment of the present invention in place of the diffractive optical element 3, FIG. 2, of the first embodiment. As shown, the diffractive optical element 37 has a diffraction grating only inside of a circle having a diameter R2 smaller than the effective diameter R1 of the objective lens 6, which is indicated by a dotted circle. A line 37a passing through the optical axis of incident light in parallel to the tangential direction of the disk 7 divides the diffraction grating into two regions 38 and 39. The diffraction grating extends in a direction substantially parallel to the radial direction of the disk 7 in both of the regions 38, and 39 and has lines arranged in an equally spaced pattern in both of the regions 38 and 39. The phase of the grating in the region 38 and the phase of the grating in the region 39 are shifted from each other by $\pi$.

Assume that a phase difference between the lines and the spaces of the diffraction grating of the optical element 37 is $\pi/2$. Then, the optical element 37 transmits about 50% of the light incident to each of the regions 38 and 39 as the zeroth order light while diffracting about 20.3% of the light as each of the plus and minus first-order light. At the same time, the optical element 37 transmits substantially the entire light incident to the outside of the regions 38 and 39.

In the configuration described above, a main beam includes both of the light transmitted through the regions 38 and 39 and the light transmitted through the outside of the regions 38 and 39. sub-beams include only the light diffracted within the regions 38 and 39. Therefore, the main beam and sub-beams are different from each other as to the distribution of light incident to the objective lens 6. More specifically, the sub-beams are lower in light intensity in the peripheral portion than the main beam. Plus first-order diffracted light output from the region 38 and plus first-order diffracted light output from the region 39 are different in phase from each other by $\pi$. Likewise, minus first-order diffracted light output from the region 38 and minus first-order diffracted light output from the region 39 are different in phase from each other by $\pi$.

Figure 27:
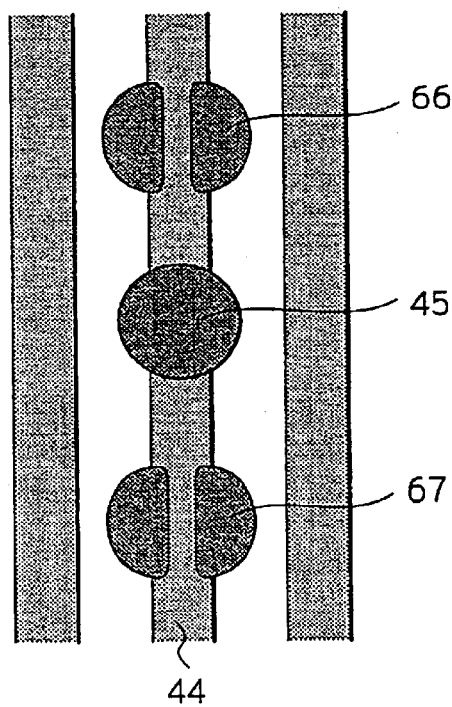
FIG. 27 shows beam spots formed on a disk by the eleventh embodiment.

FIG. 27 shows beam spots 45, 66 and 67 formed on the disk 7 by the illustrative embodiment. Again, the projections and recesses of grooves formed in the disk 7 will be referred to as grooves and lands, respectively, as seen from the light incidence side of the disk 7. As shown, the beam spots 45, 66 and 67 respectively correspond to the zeroth order light, plus first-order diffracted light and minus first-order diffracted light output from the diffractive optical element 37. The three beam spots 45, 66 and 67 are positioned on the same track 44 (land or groove). The beam spots 66 and 67 each have two peaks identical in light intensity at the right portion and left portion in the radial direction of the disk 7.

As for the rest of the configuration and operation, the illustrative embodiment is identical with the first embodiment. The illustrative embodiment can detect the thickness error of the disk 7 in the same manner as the first embodiment.

The configuration described with reference to FIG. 26 causes the phases of the sub-beams to be incident to the objective lens to differ from the right side to the left side with respect to the line 37a by $\pi$. As far as track error signals are concerned, such a configuration is equivalent to a configuration in which the beam spots of two sub-beams formed on the disk 7 are shifted by half a period of the grooves of the disk 7 in opposite directions in the radial direction of the disk 7 with respect to the beam spot of a main beam. Why the former configuration is equivalent to the latter configuration is described in, e.g., Japanese Patent Laid-Open Publication No. 9-81942. The illustrative embodiment can therefore realize track servo operation by causing the offsets of track error signals ascribable to the shift of objective lens 6 in the radial direction of the disk 7 to cancel each other in the same manner as the ninth embodiment.

Moreover, in the illustrative embodiment, the beam spot or main beam 45 and beam spots or sub-beams 66 and 67 are positioned on the same track 44 of the disk 7. Therefore, the positions of the beam spots 45, 66 and 67 do not change without regard to the track pitch of the disk 7. This implements the track servo operation with the offsets of track error signals ascribable to the shift of the objective lens 6 canceling each other with any desired disk.

Twelfth Embodiment

Figure 28:
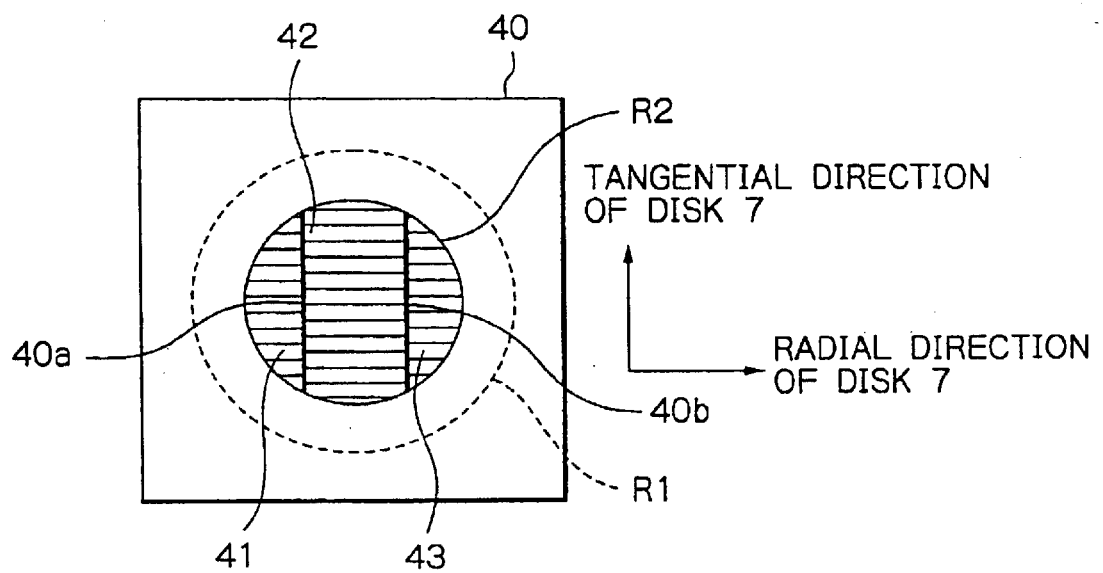
FIG. 28 is a plan view showing a diffractive optical element included in a twelfth embodiment of the present invention.

FIG. 28 shows a diffractive optical element 40 included in a twelfth embodiment of the present invention in place of the diffractive optical element 3, FIG. 2, of the first embodiment. As shown, the diffractive optical element 40 has a diffraction grating only inside of a circle having a diameter R2 smaller than the effective diameter R1 of the objective lens 6, which is indicated by a dotted circle. Lines 40a and 40b symmetrical with respect to the optical axis of incident light and parallel to the tangential direction of the disk 7 divide the diffraction grating into three regions 41, 42 and 43. The diffraction grating extends in a direction substantially parallel to the radial direction of the disk 7 in all of the regions 41 through 43 and has lines arranged in an equally spaced pattern in the regions 41 through 43. The phase of the grating in the regions 41 and 43 and the phase of the grating in the region 42 are shifted from each other by $\pi$.

Assume that a phase difference between the lines and the spaces of the diffraction grating of the optical element 40 is $\pi/2$. Then, the optical element 40 transmits about 50% of the light incident to each of the regions 41 through 43 as the zeroth order light while diffracting about 20.3% of the light as each of the plus and minus first-order diffracted light. At the same time, the optical element 40 transmits substantially the entire light incident to the outside of the regions 41 through 43.

In the configuration described above, a main beam includes both of the light transmitted through the regions 41 through 43 and the light transmitted through the outside of the regions 41 through 43. sub-beams include only the light diffracted within the regions 41 through 43. Therefore, the main beam and sub-beams are different from each other as to the distribution of light incident to the objective lens 6. More specifically, the sub-beams are lower in light intensity in the peripheral portion than the main beam. Plus first-order diffracted light output from the regions 41 and 43 and plus first-order diffracted light output from the region 42 are different in phase from each other by $\pi$. Likewise, minus first-order diffracted light output from the regions 41 and 43 and minus first-order diffracted light output from the region 42 are different in phase from each other by $\pi$.

Figure 29:
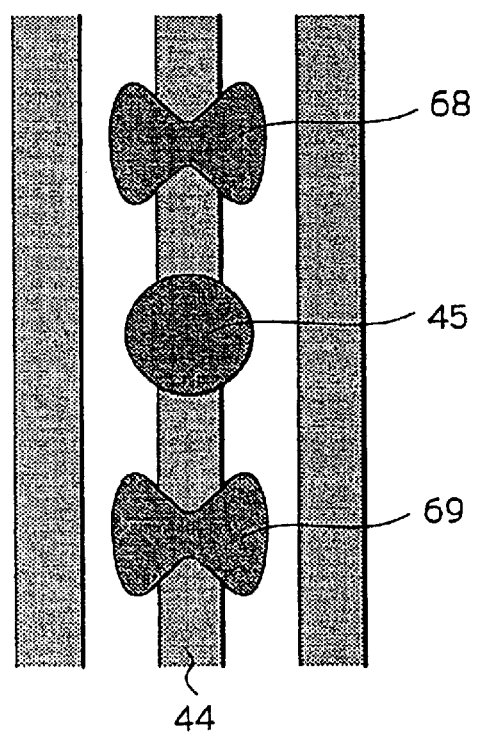
FIG. 29 shows beam spots formed on a disk by the twelfth embodiment.

FIG. 29 shows beam spots 45, 68 and 69 formed on the disk 7 by the illustrative embodiment. Again, the projections and recesses of grooves formed in the disk 7 will be referred to as grooves and lands, respectively, as seen from the light incidence side of the disk 7. As shown, the beam spots 45, 68 and 69 respectively correspond to the zeroth order light, plus first-order diffracted light and minus first-order diffracted light output from the diffractive optical element 40. The three beam spots 45, 68 and 69 are positioned on the same track 44 (land or groove). The beam spots 68 and 69 each have two peaks identical in light intensity at the right portion and left portion in the radial direction of the disk 7.

As for the rest of the configuration and operation, the illustrative embodiment is identical with the first embodiment. The illustrative embodiment can detect the thickness error of the disk 7 in the same manner as the first embodiment.

The configuration described with reference to FIG. 28 causes the phases of the sub-beams to be incident to the objective lens 6 to differ from the inside to the outside of the zone delimited by the lines 40a and 40b by π. As far as track error signals are concerned, such a configuration is also equivalent to a configuration in which the beam spots of two sub-beams formed on the disk 7 are shifted by half a period of the grooves of the disk 7 in opposite directions in the radial direction of the disk 7 with respect to the beam spot of a main beam. Why the former configuration is equivalent to the latter configuration is described in, e.g., Japanese Patent Laid-Open Publication No. 11-296875. The illustrative embodiment can therefore realize track servo operation by causing the offsets of track error signals ascribable to the shift of objective lens 6 in the radial direction of the disk 7 to cancel each other in the same manner as the ninth embodiment.

Moreover, in the illustrative embodiment, the beam spot or main beam 45 and beam spots or sub-beams 68 and 69 are positioned on the same track 44 of the disk 7. Therefore, the positions of the beam spots 45, 68 and 69 do not change without regard to the track pitch of the disk 7. This implements the track servo operation with the offsets of track error signals ascribable to the shift of the objective lens 6 canceling each other with any desired disk, as stated earlier.

The configuration shown in FIG. 26 (eleventh embodiment) or the configuration shown in FIG. 28 (twelfth embodiment) may be substituted for any one of the configurations shown in FIGS. 8, 11, 13, 15 and 18, if desired. This is also successful to implement track servo operation by causing the offsets of track error signals ascribable to the shift of objective lens 6 in the radial direction of the disk 7 to cancel each other.

The configuration shown in FIG. 26 or the configuration shown in FIG. 28 may further be substituted for any one of the configuration of the seventh embodiment or that of the eighth embodiment. This realizes not only the track servo operation described above, but also the detection of a thickness error free form the influence of offsets of land and groove focus error signals.

Thirteenth Embodiment

Figure 30:
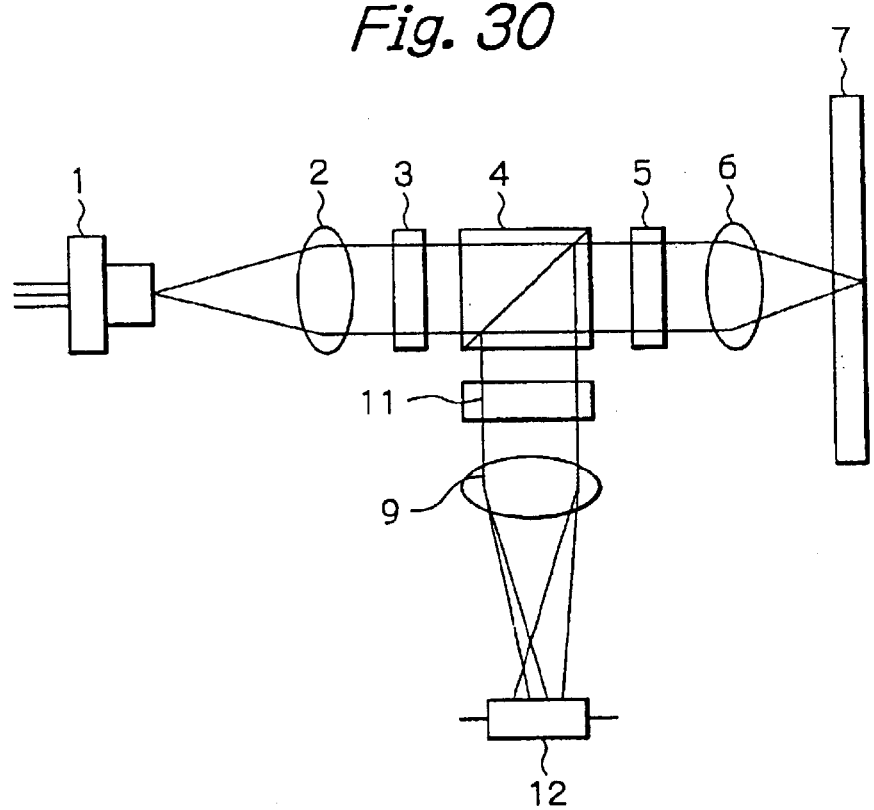
FIG. 30 is a view showing a thirteenth embodiment of the present invention.

Reference will be made to FIG. 30 for describing a thirteenth embodiment of the present invention. As shown, this embodiment is identical with the first embodiment except that it includes a holographic optical element 11 in place of the holographic optical element 8 shown in FIG. 2. Structural elements of the illustrative embodiment identical with those of the first embodiment are designated by identical reference numerals and will not be described specifically in order to avoid redundancy.

Figure 31:
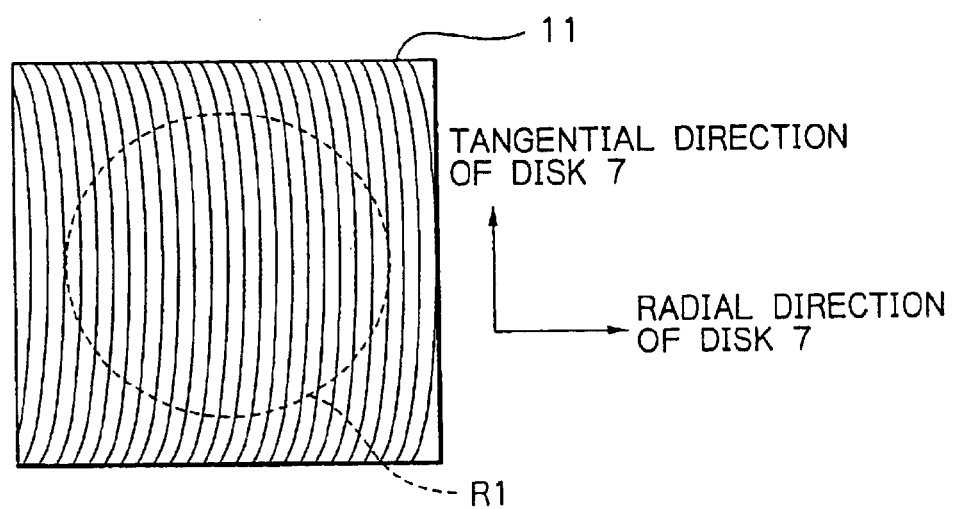
FIG. 31 is a plan view showing a holographic optical element included in the thirteenth embodiment.

FIG. 31 shows the holographic optical element 11 specifically. As shown, the optical element 11 has a diffraction grating in a region containing the effective diameter R1 of the objective lens 6, which is indicated by a dotted circle. The diffraction grating is substantially parallel to the tangential direction of the disk 7 and has an off-axis concentric pattern having a center at the left-hand side in the radial direction of the disk 7.

Assume that the lines and spaces of the diffraction grating have a phase difference of π. Then, the diffraction grating diffracts about 40.5% of incident light as each of plus and minus first-order diffracted light. Assume that the light diffracted to the left and the light diffracted to the right, as viewed in FIG. 31, are the plus and minus first-order diffracted light, respectively. Then, the optical element 11 serves as a convex lens for the plus first-order diffracted light and serves as a concave lens for the minus first-order diffracted light.

Figure 32:
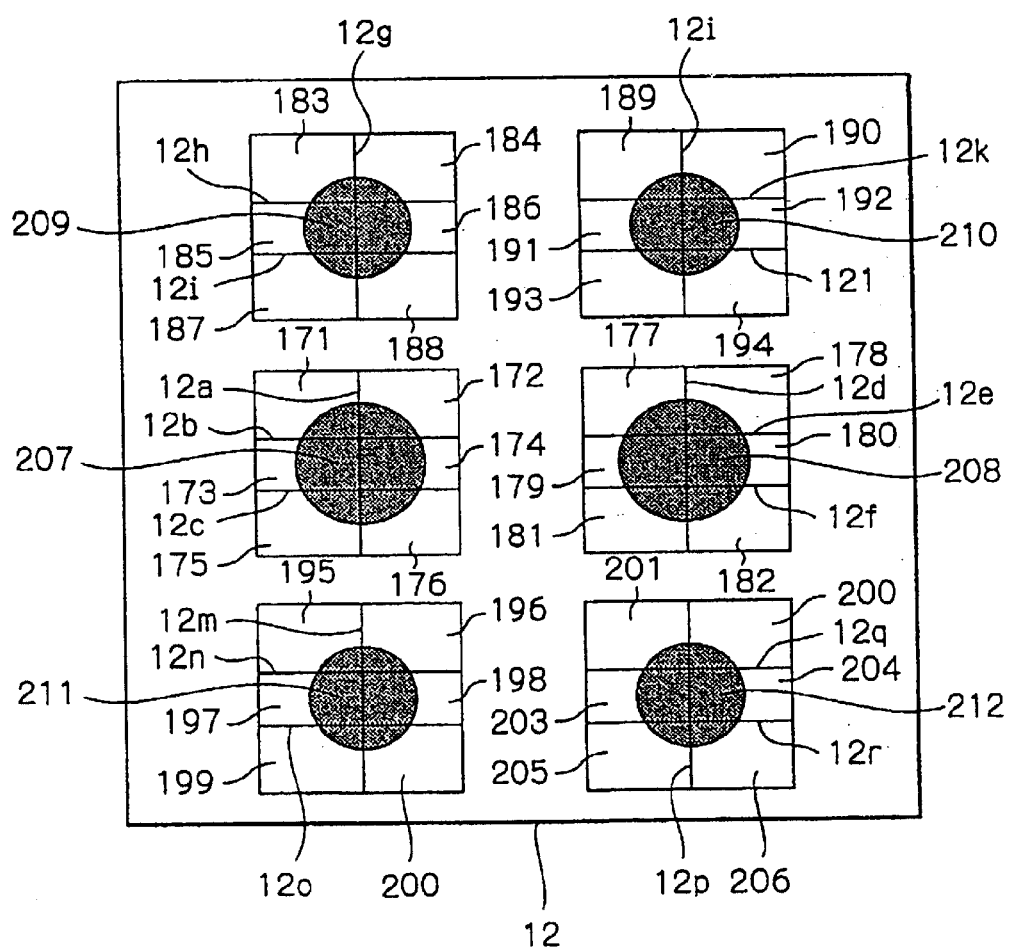
FIG. 32 shows the arrangement of photosensitive portions constituting a photodetector, which is included in the thirteenth embodiment, together with beam spots formed thereon.

FIG. 32 shows the arrangement of photosensitive portions included in the photodetector 12 and the positions of beam spots formed on the photodetector 12 particular to the illustrative embodiment. As shown, a beam spot or main beam 207 corresponds to, among the zeroth order light output from the diffractive optical element 3, the plus first-order diffracted light output from the holographic optical element 11. The beam spot 207 is incident to six photosensitive portions 171 through 176 divided by three lines 12a, 12b and 12c. The line 12a passes through the optical axis in parallel to the tangential direction of the disk 7. The lines 12b and 12c are symmetric with respect to the optical axis and parallel to the radial direction of the disk 7.

A beam spot or main beam 208 corresponds to, among the zeroth order light output from the diffractive optical element 3, the minus first-order diffracted light output from the holographic optical element 11. The beam spot 208 is incident to six photosensitive portions 177 through 182 divided by three lines 12d, 12e and 12f. The line 12d passes through the optical axis in parallel to the tangential direction of the disk 7. The lines 12e and 12f are symmetric with respect to the optical axis and parallel to the radial direction of the disk 7.

A beam spot or sub-beam 209 corresponds to, among the plus first-order diffracted light output from the diffractive optical element 3, the plus first-order diffracted light output from the holographic optical element 11. The beam spot 209 is incident to six photosensitive portions 183 through 188 divided by three lines 12g, 12h and 12i. The line 12g passes through the optical axis in parallel to the tangential direction of the disk 7. The lines 12h and 12i are symmetric with respect to the optical axis and parallel to the radial direction of the disk 7.

A beam spot or sub-beam 210 corresponds to, among the plus first-order diffracted light output from the diffractive optical element 3, the minus first-order diffracted light output from the holographic optical element 11. The beam spot 210 is incident to six photosensitive portions 189 through 194 divided by three lines 12j, 12k and 12l. The line 12j passes through the optical axis in parallel to the tangential direction of the disk 7. The lines 12k and 12l are symmetric with respect to the optical axis and parallel to the radial direction of the disk 7. A beam spot or sub-beam 211 corresponds to, among the minus first-order diffracted light output from the diffractive optical element 3, the plus first-order diffracted light output from the holographic optical element 11. The beam spot 211 is incident to six photosensitive portions 195 through 200 divided by three lines 12m, 12n and 12o. The line 12m passes through the optical axis in parallel to the tangential direction of the disk 7. The lines 12n and 12o are symmetric with respect to the optical axis and parallel to the radial direction of the disk 7.

A beam spot or sub-beam 212 corresponds to, among the minus first-order diffracted light output from the diffractive optical element 3, the minus first-order diffracted light output from the holographic optical element 11. The beam spot 212 is incident to six photosensitive portions 201 through 206 divided by three lines 12p, 12q and 12r. The line 12p passes through the optical axis in parallel to the tangential direction of the disk 7. The lines 12q and 12r are symmetric with respect to the optical axis and parallel to the radial direction of the disk 7.

The beam spots 207 through 212 are defocused on the photodetector 12 due to the lens power of the holographic optical element 11. Specifically, the beam spots 207, 209 and 211 are positioned at the rear of the focus, as seen from the light incidence side. The beam spots 208, 210 and 212 are positioned at the front of the focus, as seen from the light incidence side. The beam spots or sub-beams 209 through 212 are lower in light intensity in the peripheral portion than the beam spots or main beams 207 and 208.

Assume that the photosensitive portions 171 through 206 produce outputs V171 through V206, respectively. Then, a focus error signal FEM derived from the beam spot or main beam 45 is expressed by the spot size method as:

(V171+V172+V175+V176+V179+V180)−(V173+V174+V177+V178+V181+V182)

A focus error signal FES1 derived from the beam spot or sub-beam 46 is expressed by the spot size method as:

(V183+V184+V187+V188+V191+V192)−(V185+V186+V189+V190+V193+V194)

A focus error signal FES2 derived from the beam spot or sub-beam 47 is expressed by the spot size method as:

(V195+V196+V199+V200+V203+V204)−(V197+V198+V201+V202+V205+V206)

The focus error signal FEM is used for focus servo.

On the other hand, a track error signal TEM derived from the beam spot or main beam 45 is expressed by the push-pull method as:

(V172+V174+V176+V177+V179+V181)−(V171+V173+V175+V178+V180+V182)

A track error signal TES1 derived from the beam spot or sub-beam 46 is expressed by the push-pull method as:

(V184+V186+V188+V189+V191+V193)−(V183+V185+V187+V190+V192+V194)

A track error signal TES2 derived from the beam spot or sub-beam 47 is expressed by the push-pull method as:

(V196+V198+V200+V201+V203+V205)−(V195+V197+V199+V202+V204+V206)

The track error signal TEM is used for track servo.

An RF signal derived from the beam spot or main beam 45 is produced by:

V171+V172+V173+V174+V175+V176+V177+V178+V179+V180+V181+V182

The illustrative embodiment can detect the thickness error of the disk 7 in the same manner as the first embodiment.

Fourteenth Embodiment

A fourteenth embodiment of the present invention will be described hereinafter. This embodiment uses the diffractive optical element 30, FIG. 15, in place of the diffractive optical element 3 applied to the thirteenth embodiment and uses a photodetector 213 shown in FIG. 33 in place of the photodetector 12 of FIG. 32. The arrangement of beam spots shown in FIG. 20 and the holographic optical element 11 shown in FIG. 31 apply to the illustrative embodiment as well.

Figure 33:
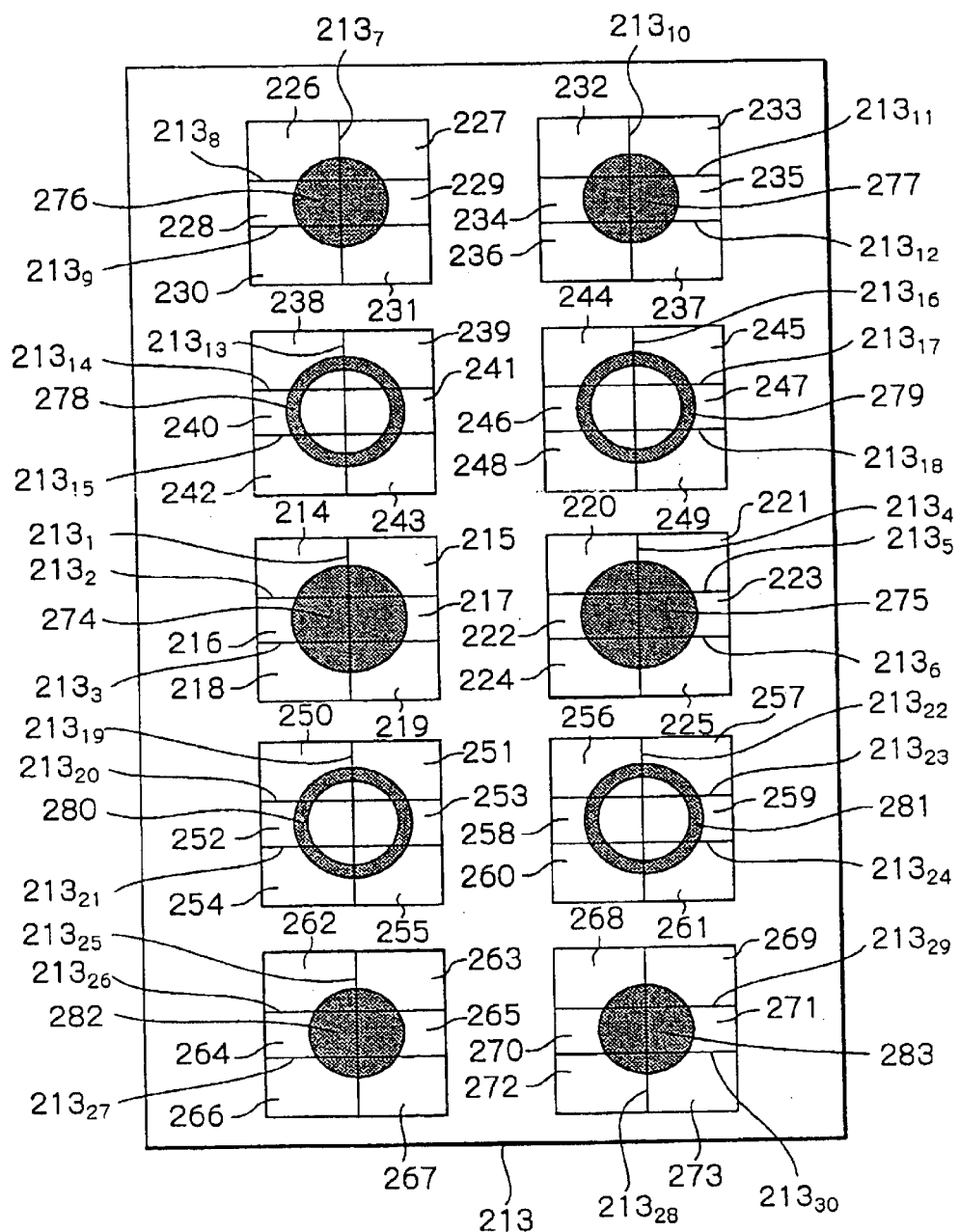
FIG. 33 shows the arrangement of photosensitive portions constituting a photodetector, which is included in a fourteenth embodiment of the present invention, together with beam spots formed thereon.

FIG. 33 shows the pattern of photosensitive portions included in the photodetector 213 and the arrangement of beam spots on the photodetector 213. As shown, a beam spot or main beam 274 corresponds to, among the zeroth order light output from the diffractive optical element 30, the plus first-order diffracted light output from the holographic optical element 11. The beam spot 274 is incident to six photosensitive portions 214 through 219 divided by three lines $213_1$, $213_2$ and $213_3$. The line $213_1$ passes through the optical axis in parallel to the tangential direction of the disk 7. The lines $213_2$ and $213_3$ are symmetric with respect to the optical axis and parallel to the radial direction of the disk 7.

A beam spot or main beam 275 corresponds to, among the zeroth order diffracted light output from the diffractive optical element 30, the minus first-order diffracted light output from the holographic optical element 11. The beam spot 275 is incident to six photosensitive portions 220 through 225 divided by three lines $213_4$, $213_5$ and $213_6$. The line $213_4$ passes through the optical axis in parallel to the tangential direction of the disk 7. The lines $213_5$ and $213_6$ are symmetric with respect to the optical axis and parallel to the radial direction of the disk 7. A beam spot 276, or sub-beam #1, corresponds to, among the plus first-order diffracted light output from the diffractive optical element 30, the plus first-order diffracted light output from the holographic optical element 11. The beam spot 276 is incident to six photosensitive portions 226 through 231 divided by three lines $213_7$, $213_8$ and $213_9$. The line $213_7$ passes through the optical axis in parallel to the tangential direction of the disk 7. The lines $213_8$ and $213_9$ are symmetric with respect to the optical axis and parallel to the radial direction of the disk 7.

A beam spot 277, or sub-beam #1, corresponds to, among the plus first-order diffracted light output from the diffractive optical element 30, the minus first-order diffracted light output from the holographic optical element 11. The beam spot 277 is incident to six photosensitive portions 232 through 237 divided by three lines $213_{10}$, $213_{11}$ and $213_{12}$. The line $213_{10}$ passes through the optical axis in parallel to the tangential direction of the disk 7. The lines $213_{11}$ and $213_{12}$ are symmetric with respect to the optical axis and parallel to the radial direction of the disk 7.

A beam spot 278, or sub-beam #2, corresponds to, among the plus first-order diffracted light output from the diffractive optical element 30, the plus first-order diffracted light output from the holographic optical element 11. The beam spot 278 is incident to six photosensitive portions 238 through 243 divided by three lines $213_{13}$, $213_{14}$ and $213_{15}$. The line $213_{13}$ passes through the optical axis in parallel to the tangential direction of the disk 7. The lines $213_{14}$ and $213_{15}$ are symmetric with respect to the optical axis and parallel to the radial direction of the disk 7.

A beam spot 279, or sub-beam #2, corresponds to, among the plus first-order diffracted light output from the diffractive optical element 30, the minus first-order diffracted light output from the holographic optical element 11. The beam spot 279 is incident to six photosensitive portions 244 through 249 divided by three lines $213_{16}$, $213_{17}$ and $213_{18}$. The line $213_{16}$ passes through the optical axis in parallel to the tangential direction of the disk 7. The lines $213_{17}$ and $213_{18}$ are symmetric with respect to the optical axis and parallel to the radial direction of the disk 7.

A beam spot 280, or sub-beam #3, corresponds to, among the minus first-order diffracted light output from the diffractive optical element 30, the plus first-order diffracted light output from the holographic optical element 11. The beam spot 280 is incident to six photosensitive portions 250 through 255 divided by three lines $213_{19}$, $213_{20}$ and $213_{21}$. The line $213_{19}$ passes through the optical axis in parallel to the tangential direction of the disk 7. The lines $213_{20}$ and $213_{21}$ are symmetric with respect to the optical axis and parallel to the radial direction of the disk 7.

A beam spot 281, or sub-beam #3, corresponds to, among the minus first-order diffracted light output from the diffractive optical element 30, the minus first-order diffracted light output from the holographic optical element 11. The beam spot 281 is incident to six photosensitive portions 256 through 261 divided by three lines $213_{22}$, $213_{23}$ and $213_{24}$. The line $213_{22}$ passes through the optical axis in parallel to the tangential direction of the disk 7. The lines $213_{23}$ and $213_{24}$ are symmetric with respect to the optical axis and parallel to the radial direction of the disk 7.

A beam spot 282, or sub-beam #4, corresponds to, among the minus first-order diffracted light output from the diffractive optical element 30, the plus first-order diffracted light output from the holographic optical element 11. The beam spot 282 is incident to six photosensitive portions 262 through 267 divided by three lines $213_{25}$, $213_{26}$ and $213_{27}$. The line $213_{25}$ passes through the optical axis in parallel to the tangential direction of the disk 7. The lines $213_{26}$ and $213_{27}$ are symmetric with respect to the optical axis and parallel to the radial direction of the disk 7.

A beam spot 283, or sub-beam #4, corresponds to, among the minus first-order diffracted light output from the diffractive optical element 30, the minus first-order diffracted light output from the holographic optical element 11. The beam spot 283 is incident to six photosensitive portions 268 through 273 divided by three lines $213_{28}$, $213_{29}$ and $213_{30}$. The line $213_{28}$ passes through the optical axis in parallel to the tangential direction of the disk 7. The lines $213_{29}$ and $213_{30}$ are symmetric with respect to the optical axis and parallel to the radial direction of the disk 7.

The beam spots 274 through 283 are defocused on the photodetector 213 due to the lens power of the holographic optical element 11. Specifically, the beam spots 274, 276, 278, 280 and 282 are positioned at the rear of the focus, as seen from the light incidence side. The beam spots 275, 277, 279, 281 and 283 are positioned at the front of the focus, as seen from the light incidence side. The beam spots 276, 277, 282 and 283, or sub-beams #1 and #4, are lower in light intensity in the peripheral portion than the beam spots or main beams 274 and 275. The beam spots 278 through 281, or sub-beams #2 and #3, are higher in light intensity in the peripheral portion than the beam spots or main beams 274 and 275.

Assume that the photosensitive portions 214 through 273 produce outputs V214 through V273, respectively. Then, a focus error signal FEM derived from the beam spot or main beam 45 is expressed by the spot size method as:

$(V214+V215+V218+V219+V222+V223)-(V216+V217+V220+V221+V224+V225)$

A focus error signal FES1 derived from the beam spot 58, or sub-beam #1, is expressed by the spot size method as:

$(V226+V227+V230+V231+V234+V235)-(V228+V229+V232+V233+V236+V237)$

A focus error signal FES2 derived from the beam spot 59, or sub-beam #2, is expressed by the spot size method as:

$(V238+V239+V242+V243+V246+V247)-(V240+V241+V244+V245+V248+V249)$

A focus error signal FES3 derived from the beam spot 60, or sub-beam #3, is expressed by the spot size method as:

$(V250+V251+V254+V255+V258+V259)-(V252+V253+V256+V257+V260+V261)$

A focus error signal FES4 derived from the beam spot 61, or sub-beam #4, is expressed by the spot size method as:

$(V262+V263+V266+V267+V270+V271)-(V264+V265+V268+V269+V272+V273)$

The focus error signal FEM is used for focus servo.

On the other hand, a track error signal TEM derived from the beam spot or main beam 45 is expressed by the push-pull method as:

$(V215+V217+V219+V220+V222+V224)-(V214+V216+V218+V221+V223+V225)$

A track error signal TES1 derived from the beam spot 58, or sub-beam #1, is expressed by the push-pull method as:

$(V227+V229+V231+V232+V234+V236)-(V226+V228+V230+V233+V235+V237)$

A track error signal TES2 derived from the beam spot 47, or sub-beam #2, is expressed by the push-pull method as:

$(V239+V241+V243+V244+V246+V248)-(V238+V240+V242+V245+V247+V249)$

A track error signal TES3 derived from the beam spot 60, or sub-beam #3, is expressed by the push-pull method as:

$(V251+V253+V255+V256+V258+V260)-(V250+V252+V254+V257+V259+V261)$

A track error signal TES4 derived from the beam spot 61, or sub-beam #4, is expressed by the push-pull method as:

$(V263+V265+V267+V268+V270+V272)-(V262+V264+V266+V269+V271+V273)$

The track error signal TEM is used for track servo.

An RF signal derived from the beam spot or main beam 45 is produced by:

$V214+V215+V216+V217+V218+V219+V220+V221+V222+V223+V224+V225$

The illustrative embodiment also generates the focus error signals described with reference to FIG. 17 and can detect the thickness error of the disk 7 in the same manner as the seventh embodiment.

Fifteenth Embodiment

Figure 34:
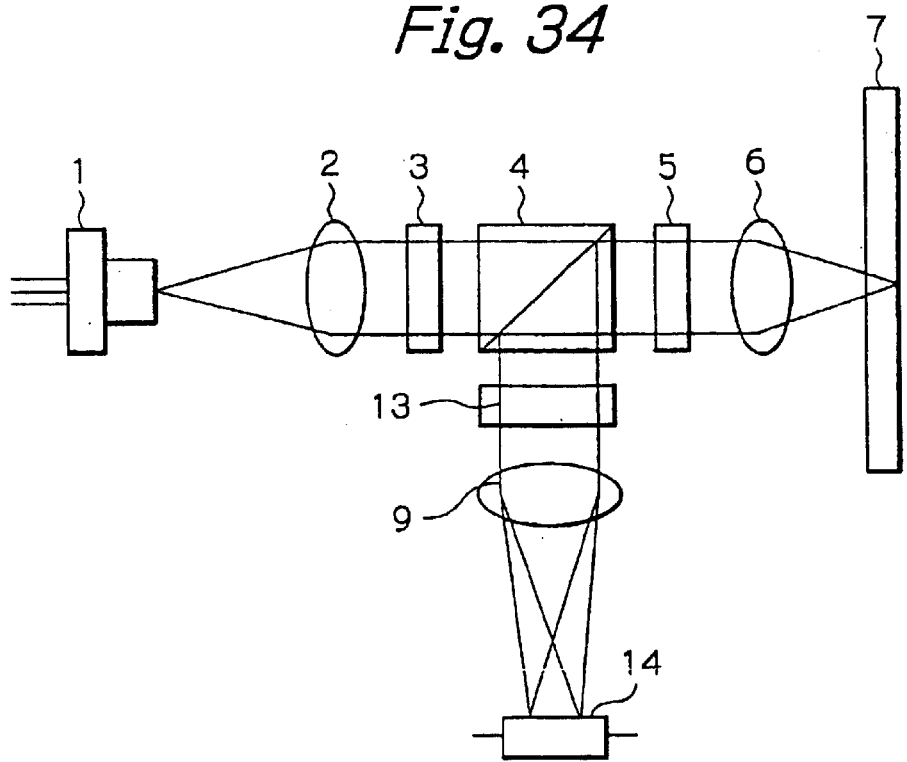
FIG. 34 is a view showing a fifteenth embodiment of the present invention.

A fifteenth embodiment of the present invention will be described with reference to FIG. 34. As shown, this embodiment is identical with the first embodiment except that it includes a cylindrical lens 13 in place of the holographic optical element 8 and includes a photodetector 14 in place of the photodetector 10. The photodetector 14 is positioned at the intermediate between the line foci of the cylindrical lens 13 and the lens 9. Structural elements of the illustrative embodiment identical with those of the first embodiment are designated by identical reference numerals and will not be described specifically in order to avoid redundancy.

Figure 35:
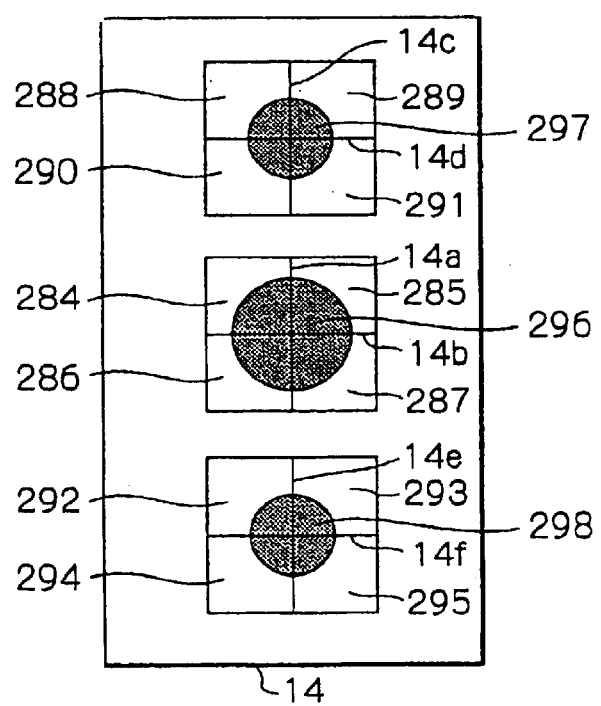
FIG. 35 shows the arrangement of photosensitive portions constituting a photodetector, which is included in the fifteenth embodiment, together with beam spots formed thereon.

FIG. 35 shows the pattern of photosensitive portions included in the photodetector 14 and the arrangement of beam spots on the photodetector 14. As shown, a beam spot or main beam 296 corresponds to the zeroth order light output from the diffractive optical element 3. The beam spot 296 is incident to four photosensitive portions 284 through 287 divided by a line 14a passing through the optical axis in parallel to the radial direction of the disk 7 and a line 14b passing through the optical axis in parallel to the tangential direction of the disk 7.

A beam spot or sub-beam 296 corresponds to the plus first-order diffracted light output from the diffractive optical element 3. The beam spot 297 is incident to four photosensitive portions 288 through 291 divided by a line 14c passing through the optical axis in parallel to the radial direction of the disk 7 and a line 14d passing through the optical axis in parallel to the tangential direction of the disk 7. A beam spot or sub-beam 298 corresponds to the minus first-order diffracted light output from the diffractive optical element 3. The beam spot 298 is incident to four photosensitive portions 292 through 295 divided by a line 14e passing through the optical axis in parallel to the radial direction of the disk 7 and a line 14f passing through the optical axis in parallel to the tangential direction of the disk 7.

Although the beam spots 45 through 47 are positioned in an array in the tangential direction on the disk 7, the beam spots 296 through 298 are positioned in an array in the radial direction on the photodetector 14 due to the cylindrical lens 13 and lens 9. The beam spots or sub-beams 297 and 298 are lower in light intensity in the peripheral portion than the beam spot or main beam 296.

Assume that the photosensitive portions 284 through 295 produce outputs V284 through 295, respectively. Then, a focus error signal FEM derived from the beam spot or main beam 45 is expressed by the astigmatism method as:

$$(V284+V287)-(V285+V286).$$

A focus error signal FES1 derived from the beam spot or sub-beam 46 is expressed by the astigmatism method as:

$$(V288+V291)-(V289+V290)$$

A focus error signal FES2 derived from the beam spot or sub-beam 47 is expressed by the astigmatism method as:

$$(V292+V295)-(V293+V294)$$

The focus error signal FEM is used for focus servo.

On the other hand, a track error signal TEM derived from the beam spot or main beam 45 is produced by the push-pull method as:

$$(V286+V287)-(V284+V285)$$

A track error signal TES1 derived from the beam spot or sub-beam 46 is produced by the push-pull method as:

$$(V290+V291)-(V288+V289)$$

A track error signal TES2 derived from the beam spot or sub-beam 47 is produced by the push-pull method as:

$$(V294+V295)-(V292+V293)$$

The track error signal TEM is used to track servo.

An RF signal derived from the beam spot or main beam 45 is expressed as:

$$V284+V285+V286+V287$$

The illustrative embodiment also generates the focus error signals shown in FIG. 7 and can detect the thickness error of the disk 7 in the same manner as the first embodiment.

Sixteenth Embodiment

A sixteenth embodiment of the present invention will be described hereinafter. This embodiment uses the diffractive optical element 30 in place of the diffractive optical element shown in FIG. 3 and includes a photodetector 299 shown in FIG. 36 in place of the photodetector 14 shown in FIG. 35. Further, the illustrative embodiment uses the diffractive optical element 30, FIG. 15, and the arrangement of beam spots shown in FIG. 20.

Figure 36:
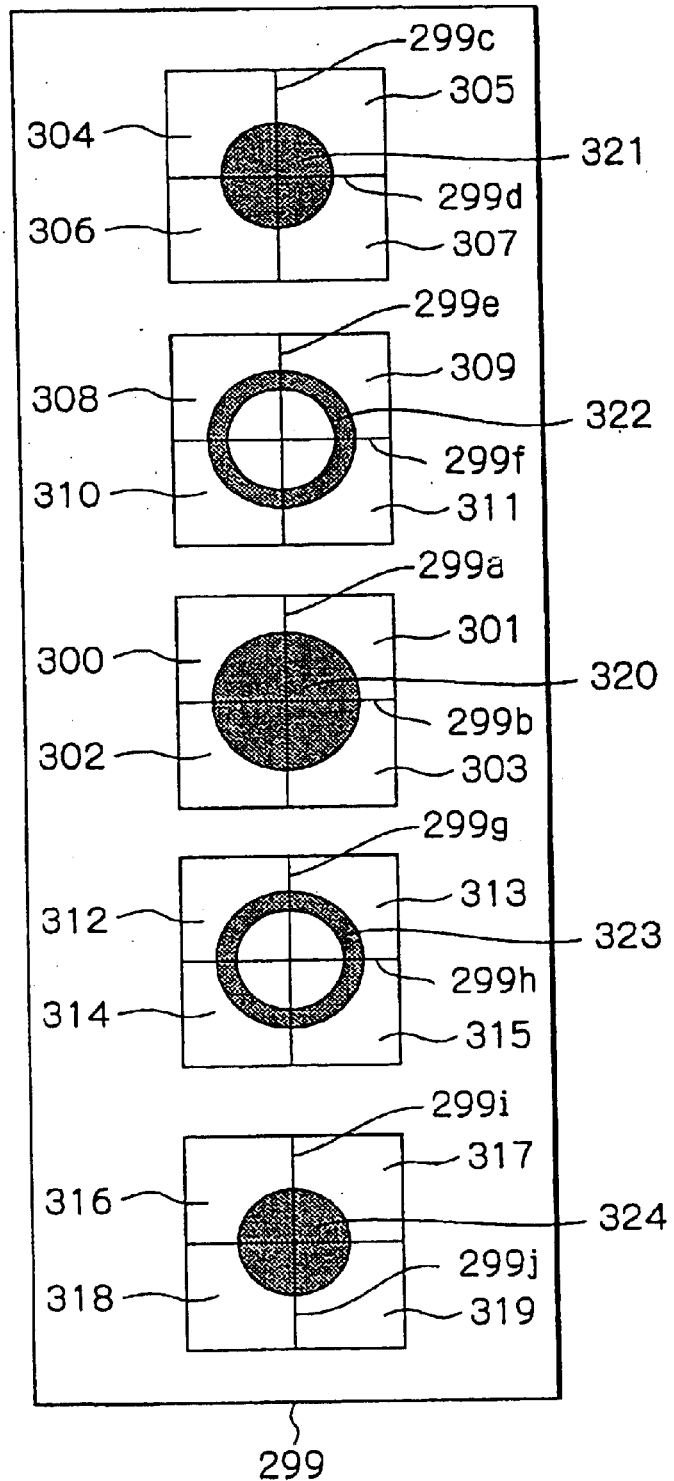
FIG. 36 shows the arrangement of photosensitive portions constituting a photodetector, which is included in a sixteenth embodiment of the present invention, together with beam spots formed thereon.

As shown in FIG. 36, a beam spot or main beam 320 corresponds to the zeroth order light output from the diffractive optical element 30. The beam spot 320 is incident to four photosensitive portions 300 through 303 divided by a line 299a passing through the optical axis in parallel to the radial direction of the disk 7 and a line 299b passing through the optical axis in parallel to the tangential direction of the disk 7.

A beam spot 321, or sub-beam #1, corresponds to the plus first-order diffracted light output from the diffractive optical element 30. The beam spot 321 is incident to four photosensitive portions 304 through 307 divided by a line 299c passing through the optical axis in parallel to the radial direction of the disk 7 and a line 299d passing through the optical axis in parallel to the tangential direction of the disk 7.

A beam spot 322, or sub-beam #2, corresponds to the plus first-order diffracted light output from the diffractive optical element 30. The beam spot 322 is incident to four photosensitive portions 308 through 311 divided by a line 299e passing through the optical axis in parallel to the radial direction of the disk 7 and a line 299f passing through the optical axis in parallel to the tangential direction of the disk 7.

A beam spot 323, or sub-beam #3, corresponds to the minus first-order diffracted light output from the diffractive optical element 30. The beam spot 323 is incident to four photosensitive portions 312 through 315 divided by a line 299g passing through the optical axis in parallel to the radial direction of the disk 7 and a line 299h passing through the optical axis in parallel to the tangential direction of the disk 7.

A beam spot 324, or sub-beam #4, corresponds to the minus first-order diffracted light output from the diffractive optical element 30. The beam spot 324 is incident to four photosensitive portions 316 through 319 divided by a line 299i passing through the optical axis in parallel to the radial direction of the disk 7 and a line 299j passing through the optical axis in parallel to the tangential direction of the disk 7.

Although the beam spots 45 and 58 through 61 are positioned in an array in the tangential direction on the disk 7, the beam spots 320 through 324 are positioned in an array in the radial direction on the photodetector 299 due to the cylindrical lens 13 and lens 9. The beam spots 321 and 324, or sub-beams #1 and #4, are lower in light intensity in the peripheral portion than the beam spot or main beam 320. The beam spots 322 and 323, or sub-beams #2 and #3, are higher in light intensity in the peripheral portion than the beam spot or main beam 320.

Assume that the photosensitive portions 300 through 319 produce outputs V300 through V319, respectively. Then, a focus error signal FEM derived from the beam spot or main beam 45 is expressed by the astigmatism method as:

$$(V300+V303)-(V301+V302)$$

A focus error signal FES1 derived from the beam spot 58, or sub-beam #1, is expressed by the astigmatism method as:

$$(V304+V307)-(V305+V306)$$

A focus error signal FES2 derived from the beam spot 59, or sub-beam #2, is expressed by the astigmatism method as:

$$(V308+V311)-(V309+V310)$$

A focus error signal FES3 derived from the beam spot 60, or sub-beam #3, is expressed by the astigmatism method as:

$$(V312+V315)-(V313+V314)$$

A focus error signal FES4 derived from the beam spot 61, or sub-beam #4, is expressed by the astigmatism method as:

$$(V316+V319)-(V317+V318)$$

The focus error signal FEM is used for focus servo.

On the other hand, a track error signal TEM derived from the beam spot or main beam 45 is produced by the push-pull method as:

$$(V302+V303)-(V300+V301)$$

A track error signal TES1 derived from the beam spot 58, or sub-beam #1, is produced by the push-pull method as:

$$(V306+V307)-(V304+V305)$$

A track error signal TES2 derived from the beam spot 59, or sub-beam #2, is produced by the push-pull method as:

$$(V310+V311)-(V308+V309)$$

A track error signal TES3 derived from the beam spot 60, or sub-beam #3, is produced by the push-pull method as:

$$(V314+V315)-(V312+V313)$$

A track error signal TES4 derived from the beam spot 61, or sub-beam #4, is produced by the push-pull method as:

$$(V318+V319)-(V316+V317)$$

The track error signal TEM is used to track servo.

An RF signal derived from the beam spot or main beam 45 is expressed as:

$$V300+V301+V302+V303$$

The illustrative embodiment also generates the focus error signals shown in FIG. 17 (fifth embodiment) and can detect the thickness error of the disk 7 in the same manner as the seventh embodiment.

The thirteenth and fifteenth embodiments shown and described differ from the first embodiment in that they respectively use the spot size method and astigmatism method in place of the Foucault method in detecting focus error signals. Likewise, the illustrative embodiment may be modified to substitute the spot size method or the astigmatism method for the Foucault method used in any one of the second to sixth, ninth, eleventh and twelfth embodiments.

The fourteenth and sixteenth embodiments differ from the seventh embodiment in that they respectively use the spot size method and astigmatism method in place of the Foucault method in detecting focus error signals. Likewise, the illustrative embodiment may be modified to substitute the spot size method or the astigmatism method for the Foucault method used in the eighth or the tenth embodiment.

In the first to sixteenth embodiments, the diffractive optical element splits light emitted from the semiconductor laser into the zeroth order light, plus first-order diffracted light and minus first-order diffracted light and uses the zeroth order light and the plus and minus first-order diffracted light as a main beam and sub-beams, respectively. Alternatively, only one of the plus and minus first-order diffracted light may be used as a sub-beam.

All the embodiments shown and described split light issuing from a single semiconductor laser into a plurality of light with a diffractive optical element to thereby implement a main beam and sub-beams. Alternatively, a plurality of semiconductor lasers may be used to emit light for implementing a main beam and sub-beams. In such a case, an aperture control element or similar element for varying the intensity distribution of incident light will be positioned on an optical path assigned to either one of the main beam and sub-beams. The above element allows the intensity distribution to differ from the main beam to the sub-beams on an objective lens.

Further, the phases of sub-beams incident to an objective lens may be shifted from each other by π at the right and left of a line extending through the optical axis in parallel to the tangential direction of a disk or at the inside and outside of two lines symmetric with respect to the optical axis in parallel to the tangential direction of a disk. This configuration, like the eleventh and twelfth embodiments, implements track servo operation with the offsets of track error signals ascribable to the shift of the objective lens in the radial direction of the disk canceling each other. The above shift is achievable by use of a phase control element or similar element positioned on the path assigned to sub-beam. The phase control element may be implemented as a parallel planar plate having particular thickness at each of the right and left sides with respect to a line symmetric with respect to the optical axis in parallel to the tangential direction of the disk or at each of the inside and outside of two lines passing through the optical axis in parallel to the tangential direction of the disk.

Seventeenth Embodiment

Figure 37:
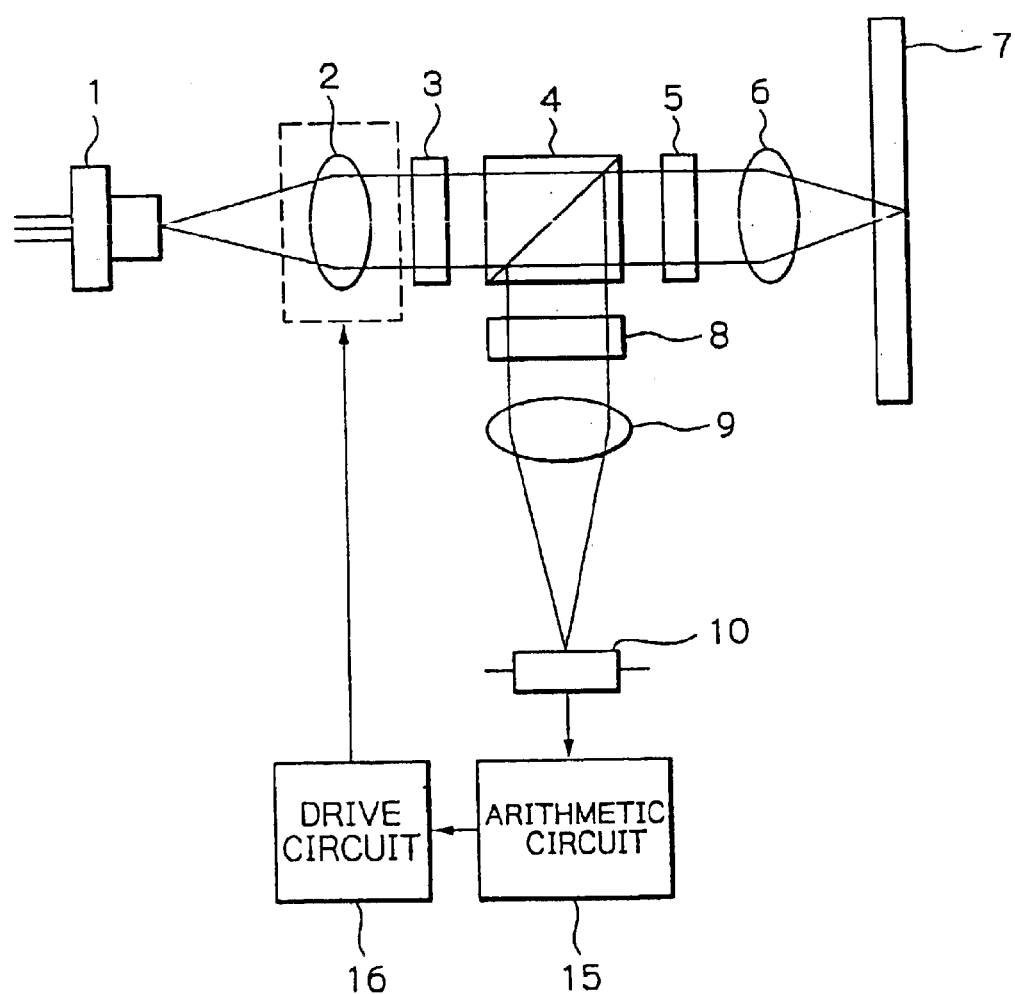
FIG. 37 is a view showing a seventeenth embodiment of the present invention implemented as an optical data recording/reproducing apparatus.

FIG. 37 shows an optical information recording/reproducing apparatus representative of a seventeenth embodiment of the present invention. As shown, the recording/reproducing apparatus includes an arithmetic circuit 15 and a drive circuit 16 in addition to the configuration shown in FIG. 2. The arithmetic circuit 15 outputs a thickness error signal by calculation based on the outputs of the photosensitive portions of the photodetector 10. The drive circuit 16 causes an actuator, not shown, to move the collimator lens 2 in the direction of optical axis such that the thickness error signal becomes zero. The collimator lens 2, in turn, varies the magnification of the objective lens 6 and therefore spherical aberration. More specifically, the movement of the collimator lens 2 causes the objective lens 6 to generate spherical aberration that cancels spherical aberration ascribable to the thickness error of the disk 7. This successfully compensates for the thickness error and thereby obviates the influence of the error on the recording/reproducing characteristic of the apparatus.

Eighteenth Embodiment

Figure 38:
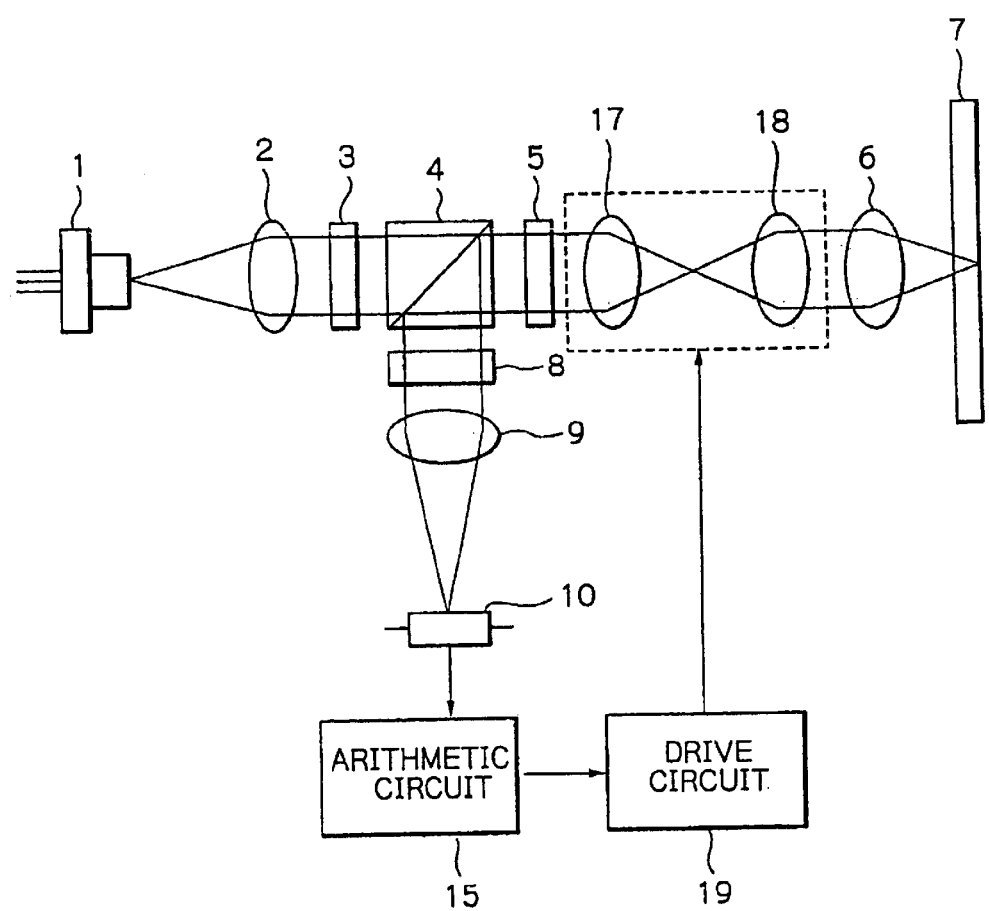
FIG. 38 is a view showing an eighteenth embodiment of the present invention also implemented as an optical data recording/reproducing apparatus.

FIG. 38 shows an optical information recording/reproducing apparatus representative of an eighteenth embodiment of the present invention. As shown, the recording/reproducing apparatus includes the arithmetic circuit 15, relay lenses 17 and 18, and a drive circuit 19 in addition to the configuration shown in FIG. 2. The arithmetic circuit 15 operates in the same manner as in the seventeenth embodiment. The drive circuit 19 causes an actuator, not shown, to move either one of the relay lenses 17 and 18 in the direction of optical axis such that the thickness error signal becomes zero. The movement of the relay lens 17 or 18 varies the magnification of the objective lens 6 and therefore spherical aberration. More specifically, the movement of the relay lens 17 or 18 causes the objective lens 6 to generate spherical aberration that cancels spherical aberration ascribable to the thickness error of the disk 7. This is also successful to compensate for the thickness error and thereby obviates the influence of the error on the recording/reproducing characteristic of the apparatus.

Nineteenth Embodiment

Figure 39:
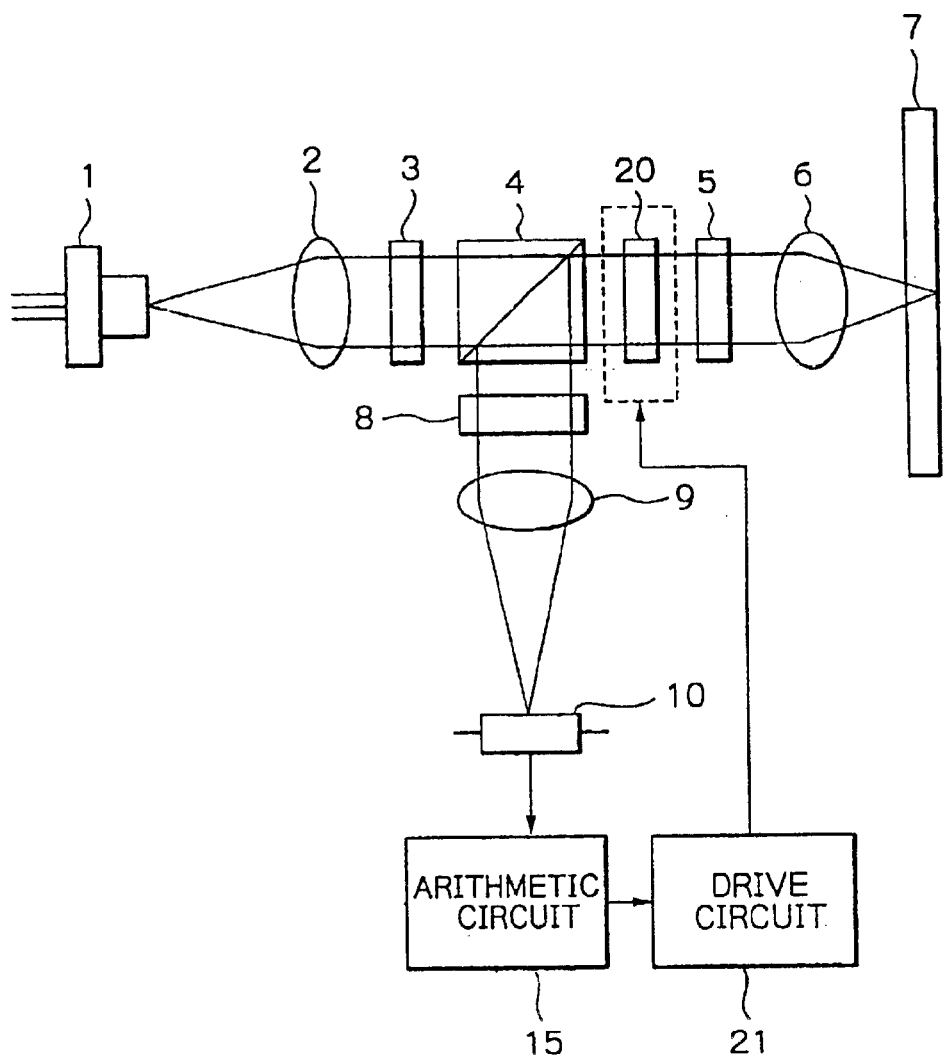
FIG. 39 is a view showing a nineteenth embodiment of the present invention also implemented as an optical data recording/reproducing apparatus.

FIG. 39 shows an optical information recording/reproducing apparatus representative of a nineteenth embodiment of the present invention. As shown, the recording/reproducing apparatus includes the arithmetic circuit 15, an LC (Liquid Crystal) optical element 20, and a drive circuit 21 in addition to the configuration shown in FIG. 2. The arithmetic circuit 15 operates in the same manner as in the seventeenth and eighteenth embodiments. The drive circuit 21 applies a voltage to the LC optical element 20, which is divided into a plurality of concentric regions. By varying the voltage region by region, it is possible to vary spherical aberration region by region. In light of this, the voltage applied to the LC optical element 20 is so adjusted as to cause the LC optical element 20 to generate spherical aberration that cancels spherical aberration ascribable to the thickness error of the disk 7. This is also successful to compensate for the thickness error and thereby obviates the influence of the error on the recording/reproducing characteristic of the apparatus.

It is to be noted that the embodiments shown in FIGS. 37 through 39 each are applicable to any one of the second to sixteenth embodiments as well.

In summary, it will be seen that the present invention provides an optical head and an optical data recording/reproducing apparatus capable of accurately detecting even the thickness error of an optical recording medium in which an RF signal is not recorded beforehand. This is because the detection of the thickness error is based on a difference between the zero-crossing points of focus error signals derived from a main and a sub-beam. Moreover, the present invention provides an RF signal with a desirable S/N ratio because it has the same number of current-to-voltage converting circuits as a conventional optical head and therefore prevents noise ascribable to circuitry from increasing.

Various modifications will become possible for those skilled in the art after receiving the teachings of the present disclosure without departing from the scope thereof.

What is claimed is:

1. An optical head comprising:
   a light source;
   an objective lens for condensing light output from said light source on an optical recording medium; and
   a photodetector to which light reflected from the optical recording medium is incident;
   wherein the light output from said light source is split into a main beam and a sub-beam different from each other in a light intensity distribution when input to said objective lens;
   a focus error signal representative of a shift of a focus on the optical recording medium is detected from each of reflected light derived from the main beam and reflected light derived from the sub-beam,
   an error in a thickness of the optical recording medium is detected on the basis of a difference between a zero-crossing point of the reflected light derived from the main beam and a zero-crossing point of the reflected light derived from the sub-beam.

2. The optical head as claimed in claim 1, further comprising a diffractive optical element positioned between said light source and said objective lens for splitting the light output from said light source into a plurality of beams, wherein zeroth order light and one or both of plus and minus first-order diffracted light output from said diffractive optical element are used as the main beam and the sub-beam, respectively.

3. The optical head as claimed in claim 2, wherein said diffractive optical element has diffraction grating only in a region inside of a circle having a diameter smaller than an effective diameter of said objective lens,
   the main beam includes both of the light transmitted through said region and light transmitted through a region outside of said region, and
   the sub-beam includes only the light diffracted in said region.

4. The optical head as claimed in claim 3, wherein the focus error signal derived from the sub-beam when focus servo is effected by using the focus error signal derived from the main beam is used to detect the error.

5. The optical head as claimed in claim 3, wherein a difference between the focus error signal, which is derived from the sub-beam when focus servo is effected by using the focus error signal derived from the main beam, and said focus error signal derived from said sub-beam is used to detect the error.

6. The optical head as claimed in claim 3, wherein a beam spot of the sub-beam is shifted from a beam spot of the main beam by one-half of a period of grooves of the optical recording medium in a radial direction of said optical recording medium.

7. The optical head as claimed in claim 6, wherein a difference between a track error signal derived from the main beam and a track error signal derived from the sub-beam is used for track servo.

8. The optical head as claimed in claim 3, wherein the sub-beam incident to said objective lens has a phase differing from a right side to a left side substantially by $\pi$ with respect to a line passing through an optical axis in parallel to a tangential direction of the optical recording medium, and
   a beam spot of the main beam and a beam spot of the sub-beam are positioned on a same track of the optical recording medium.

9. The optical head as claimed in claim 8, wherein said diffractive optical element is divided into a right region and a left region by the line, and
   a phase of the diffraction grating at said right region and a phase of said diffraction grating at said left region are different from each other substantially by $\pi$.

10. The optical head as claimed in claim 8, wherein a difference between a track error signal derived from the main beam and a track error signal derived from the sub-beam is used for track servo.

11. The optical head as claimed in claim 3, wherein the sub-beam incident to said objective lens has a phase differing from a zone between two lines, which are symmetrical with respect to an optical axis and parallel to a tangential direction of the optical recording medium, to regions outside of said zone by $\pi$, and
   a beam spot of the main beam and a beam spot of the sub-beam are positioned on a same track of the optical recording medium.

12. The optical head as claimed in claim 11, wherein said diffractive optical element is divided into a zone between two lines, which are symmetrical with respect to the optical axis and parallel to the tangential direction of the optical recording medium, and regions outside of said zone, and
   a phase of the diffraction grating in said zone and a phase of said diffraction grating in said regions are different from each other substantially by $\pi$.

13. The optical head as claimed in claim 11, wherein a difference between a track error signal derived from the main beam and a track error signal derived from the sub-beam is used for track servo.

14. The optical head as claimed in claim 2, wherein said diffractive optical element has diffraction grating only in a region outside of a circle having a diameter smaller than an effective diameter of said objective lens,
   the main beam includes both of the light transmitted through said region and light transmitted through a region inside of said region, and
   the sub-beam includes only the light diffracted in said region.

15. The optical head as claimed in claim 14, wherein the focus error signal derived from the sub-beam when focus servo is effected by using the focus error signal derived from the main beam is used to detect the error.

16. The optical head as claimed in claim 14, wherein a difference between the focus error signal, which is derived from the sub-beam when focus servo is effected by using the focus error signal derived from the main beam, and said focus error signal derived from said sub-beam is used to detect the error.

17. The optical head as claimed in claim 14, wherein a beam spot of the sub-beam is shifted from a beam spot of the main beam by one-half of a period of grooves of the optical recording medium in a radial direction of said optical recording medium.

18. The optical head as claimed in claim 17, wherein a difference between a track error signal derived from the main beam and a track error signal derived from the sub-beam is used for track servo.

19. The optical head as claimed in claim 14 wherein the sub-beam incident to said objective lens has a phase differing from a right side to a left side substantially by $\pi$ with respect to a line passing through an optical axis in parallel to a tangential direction of the optical recording medium, and
   a beam spot of the main beam and a beam spot of the sub-beam are positioned on a same track of the optical recording medium.

20. The optical head as claimed in claim 19, wherein said diffractive optical element is divided into a right region and a left region by the line, and
   a phase of the diffraction grating at said right region and a phase of said diffraction grating at said left region are different from each other substantially by $\pi$.

21. The optical head as claimed in claim 19, wherein a difference between a track error signal derived from the main beam and a track error signal derived from the sub-beam is used for track servo.

22. The optical head as claimed in claim 14, wherein the sub-beam incident to said objective lens has a phase differing from a zone between two lines, which are symmetrical with respect to an optical axis and parallel to a tangential direction of the optical recording medium, to regions outside of said zone by $\pi$, and
   a beam spot of the main beam and a beam spot of the sub-beam are positioned on a same track of the optical recording medium.

23. The optical head as claimed in claim 22, wherein said diffractive optical element is divided into a zone between two lines, which are symmetrical with respect to the optical axis and parallel to the tangential direction of the optical recording medium, and regions outside of said zone, and
   a phase of the diffraction grating in said zone and a phase of said diffraction grating in said regions are different from each other substantially by $\pi$.

24. The optical head as claimed in claim 22, wherein a difference between a track error signal derived from the main beam and a track error signal derived from the sub-beam is used for track servo.

25. The optical head as claimed in claim 2, wherein said diffractive optical element has diffraction grating only in a region inside of a zone having a width smaller than an effective diameter of said objective lens,
   the main beam includes both of the light transmitted through said region and light transmitted through a region outside of said region, and
   the sub-beam includes only the light diffracted in said region.

26. The optical head as claimed in claim 25, wherein the focus error signal derived from the sub-beam when focus servo is effected by using the focus error signal derived from the main beam is used to detect the error.

27. The optical head as claimed in claim 25, wherein a difference between the focus error signal, which is derived from the sub-beam when focus servo is effected by using the focus error signal derived from the main beam, and said focus error signal derived from said sub-beam is used to detect the error.

28. The optical head as claimed in claim 25, wherein a beam spot of the sub-beam is shifted from a beam spot of the main beam by one-half of a period of grooves of the optical recording medium in a radial direction of said optical recording medium.

29. The optical head as claimed in claim 28, wherein a difference between a track error signal derived from the main beam and a track error signal derived from the sub-beam is used for track servo.

30. The optical head as claimed in claim 25, wherein the sub-beam incident to said objective lens has a phase differing from a right side to a left side substantially by $\pi$ with respect to a line passing through an optical axis in parallel to a tangential direction of the optical recording medium, and
   a beam spot of the main beam and a beam spot of the sub-beam are positioned on a same track of the optical recording medium.

31. The optical head as claimed in claim 30, wherein said diffractive optical element is divided into a right region and a left region by the line, and
   a phase of the diffraction grating at said right region and a phase of said diffraction grating at aid left region are different from each other substantially by $\pi$.

32. The optical head as claimed in claim 30, wherein a difference between a track error signal derived from the main beam and a track error signal derived from the sub-beam is used for track servo.

33. The optical head as claimed in claim 25, wherein the sub-beam incident to said objective lens has a phase differing from a zone between two lines, which are symmetrical with respect to an optical axis and parallel to a tangential direction of the optical recording medium, to regions outside of said zone by $\pi$, and a beam spot of the main beam and a beam spot of the sub-beam are positioned on a same track of the optical recording medium.

34. The optical head as claimed in claim 33, wherein said diffractive optical element is divided into a zone between two lines, which are symmetrical with respect to the optical axis and parallel to the tangential direction of the optical recording medium, and regions outside of said zone, and a phase of the diffraction grating in said zone and a phase of said diffraction grating in said regions are different from each other substantially by $\pi$.

35. The optical head as claimed in claim 33, wherein a difference between a track error signal derived from the main beam and a track error signal derived from the sub-beam is used for track servo.

36. The optical head as claimed in claim 2, wherein said diffractive optical element has diffraction grating only in regions outside of a zone having a width smaller than an effective diameter of said objective lens, the main beam includes both of the light transmitted through said regions and light transmitted through said zone, and the sub-beam includes only the light diffracted in said zone.

37. The optical head as claimed in claim 36, wherein the focus error signal derived from the sub-beam when focus servo is effected by using the focus error signal derived from the main beam is used to detect the error.

38. The optical head as claimed in claim 36, wherein a difference between the focus error signal, which is derived from the sub-beam when focus servo is effected by using the focus error signal derived from the main beam, and said focus error signal derived from said sub-beam is used to detect the error.

39. The optical head as claimed in claim 36, wherein a beam spot of the sub-beam is shifted from a beam spot of the main beam by one-half of a period of grooves of the optical recording medium in a radial direction of said optical recording medium.

40. The optical head as claimed in claim 39, wherein a difference between a track error signal derived from the main beam and a track error signal derived from the sub-beam is used for track servo.

41. The optical head as claimed in claim 36, wherein the sub-beam incident to said objective lens has a phase differing from a right side to a left side substantially by $\pi$ with respect to a line passing through an optical axis in parallel to a tangential direction of the optical recording medium, and a beam spot of the main beam and a beam spot of the sub-beam are positioned on a same track of the optical recording medium.

42. The optical head as claimed in claim 41, wherein said diffractive optical element is divided into a right region and a left region by the line, and a phase of the diffraction grating at said right region and a phase of said diffraction grating at said left region are different from each other substantially by $\pi$.

43. The optical head as claimed in claim 41, wherein a difference between a track error signal derived from the main beam and a track error signal derived from the sub-beam is used for track servo.

44. The optical head as claimed in claim 36, wherein the sub-beam incident to said objective lens has a phase differing from a zone between two lines, which are symmetrical with respect to an optical axis and parallel to a tangential direction of the optical recording medium, to regions outside of said zone by $\pi$, and a beam spot of the main beam and a beam spot of the sub-beam are positioned on a same track of the optical recording medium.

45. The optical head as claimed in claim 44, wherein said diffractive optical element is divided into a zone between two lines, which are symmetrical with respect to the optical axis and parallel to the tangential direction of the optical recording medium, and regions outside of said zone, and a phase of the diffraction grating in said zone and a phase of said diffraction grating in said regions are different from each other substantially by $\pi$.

46. The optical head as claimed in claim 44, wherein a difference between a track error signal derived from the main beam and a track error signal derived from the sub-beam is used for track servo.

47. The optical head as claimed in claim 2, wherein said diffractive optical element has a diffraction grating in a first region inside of a circle having a diameter smaller than an effective diameter of said objective lens and a second region outside of said circle, the sub-beam comprises a first and a second sub-beam, the main beam includes both of the light transmitted through the first region and the light transmitted through the second region, the first sub-beam mainly includes only the light diffracted in the first region, and the second sub-beam mainly includes the light diffracted in the second region.

48. The optical head as claimed in claim 47, wherein either one of focus error signals respectively derived from the first sub-beam and the second sub-beam when focus servo is effected by using a focus error signal derived from the main beam or a difference between said focus error signals is used to detect the error.

49. The optical head as claimed in claim 47, wherein a difference between either one of focus error signals respectively derived from the first sub-beam and the second sub-beam when focus servo is effected by using a focus error signal derived from the main beam or a difference between said focus error signals and said focus error signal is used to detect the error.

50. The optical head as claimed in claim 47, wherein a beam spot of the sub-beam is shifted from a beam spot of the main beam by one-half of a period of grooves of the optical recording medium in a radial direction of said optical recording medium.

51. The optical head as claimed in claim 50, wherein a difference between a track error signal derived from the main beam and either one of track error signals respectively derived from the first sub-beam and the second sub-beam is used for track servo.

52. The optical head as claimed in claim 50, wherein a difference between a sum of a track error signal derived from the main beam and a sum of track error signals derived from the first sub-beam and the second sub-beam is used for track servo.

53. The optical head as claimed in claim 47, wherein the sub-beam incident to said objective lens has a phase differing from a right side to a left side substantially by π with respect to a line passing through an optical axis in parallel to a tangential direction of the optical recording medium, and a beam spot of the main beam and a beam spot of the sub-beam are positioned on a same track of the optical recording medium.

54. The optical head as claimed in claim 53, wherein said diffractive optical element is divided into a right region and a left region by the line, and a phase of the diffraction grating at said right region and a phase of said diffraction grating at said left region are different from each other substantially by π.

55. The optical head as claimed in claim 53, wherein a difference between a track error signal derived from the main beam and either one of track error signals respectively derived from the first sub-beam and the second sub-beam is used for track servo.

56. The optical head as claimed in claim 53, wherein a difference between a track error signal derived from the main beam and a sum of track error signals derived from the first sub-beam and the second sub-beam is used for track servo.

57. The optical head as claimed in claim 47, wherein the sub-beam incident to said objective lens has a phase differing from a zone between two lines, which are symmetrical with respect to an optical axis and parallel to a tangential direction of the optical recording medium, to regions outside of said zone by π, and a beam spot of the main beam and a beam spot of the sub-beam are positioned on a same track of the optical recording medium.

58. The optical head as claimed in claim 57, wherein said diffractive optical element is divided into a zone between two lines, which are symmetrical with respect to the optical axis and parallel to the tangential direction of the optical recording medium, and regions outside of said zone, and a phase of the diffraction grating in said zone and a phase of said diffraction grating in said regions are different from each other substantially by π.

59. The optical head as claimed in claim 57, wherein a difference between a track error signal derived from the main beam and either one of track error signals respectively derived form the first sub-beam and the second sub-beam is used for track servo.

60. The optical head as claimed in claim 57, wherein a difference between a track error signal derived from the main beam and a sum of track error signals derived from the first sub-beam and the second sub-beam is used for track servo.

61. The optical head as claimed in claim 2, wherein said diffractive optical element has a diffraction grating in a first region inside of a zone having a width smaller than an effective diameter of said objective lens and a second region outside of said zone, the sub-beam comprises a first and a second sub-beam, the main beam includes both of the light transmitted through said first region and the light transmitted through said second region, the first sub-beam mainly includes only the light diffracted in said first region, and the second sub-beam mainly includes the light diffracted in said second region.

62. The optical head as claimed in claim 61, wherein either one of focus error signals respectively derived from the first sub-beam and the second sub-beam when focus servo is effected by using a focus error signal derived from the main beam or a difference between said focus error signals is used to detect the error.

63. The optical head as claimed in claim 61, wherein a difference between either one of focus error signals respectively derived from the first sub-beam and the second sub-beam when focus servo is effected by using a focus error signal derived from the main beam or a difference between said focus error signals and said focus error signal is used to detect the error.

64. The optical head as claimed in claim 61, wherein a beam spot of the sub-beam is shifted from a beam spot of the main beam by one-half of a period of grooves of the optical recording medium in a radial direction of said optical recording medium.

65. The optical head as claimed in claim 64, wherein a difference between a track error signal derived from the main beam and either one of track error signals respectively derived from the first sub-beam and the second sub-beam is used for track servo.

66. The optical head as claimed in claim 64, wherein a sum of a track error signal derived from the main beam and a sum of track error signals derived from the first sub-beam and the second sub-beam is used for track servo.

67. The optical head as claimed in claim 61, wherein the sub-beam incident to said objective lens has a phase differing from a right side to a left side substantially by π with respect to a line passing through an optical axis in parallel to a tangential direction of the optical recording medium, and a beam spot of the main beam and a beam spot of the sub-beam are positioned on a same track of the optical recording medium.

68. The optical head as claimed in claim 67, wherein said diffractive optical element is divided into a right region and a left region by the line, and a phase of the diffraction grating at said right region and a phase of said diffraction grating at said left region are different from each other substantially by π.

69. The optical head as claimed in claim 67, wherein a difference between a track error signal derived from the main beam and either one of track error signals respectively derived from the first sub-beam and the second sub-beam is used for track servo.

70. The optical head as claimed in claim 67, wherein a difference between a track error signal derived from the main beam and a sum of track error signals derived from the first sub-beam and the second sub-beam is used for track servo.

71. The optical head as claimed in claim 61, wherein the sub-beam incident to said objective lens has a phase differing from a zone between two lines, which are symmetrical with respect to an optical axis and parallel to a tangential direction of the optical recording medium, to regions outside of said zone by π, and a beam spot of the main beam and a beam spot of the sub-beam are positioned on a same track of the optical recording medium.

72. The optical head as claimed in claim 71, wherein said diffractive optical element is divided into a zone between two lines, which are symmetrical with respect to the optical axis and parallel to the tangential direction of the optical recording medium, and regions outside of said zone, and a phase of the diffraction grating in said zone and a phase of said diffraction grating in said regions are different from each other substantially by π.

73. The optical head as claimed in claim 71, wherein a difference between a track error signal derived from the main beam and either one of track error signals respectively derived from the first sub-beam and the second sub-beam is used for track servo.

74. The optical head as claimed in claim 71, wherein a difference between a track error signal derived from the main beam and a sum of track error signals derived from the first sub-beam and the second sub-beam is used for track servo.

75. The optical head as claimed in claim 1, wherein said light source comprises a plurality of light sources each emitting particular light to be used as either one of the main beam and the sub-beam.

76. The optical head as claimed in claim 75, wherein an element for varying a light intensity distribution is positioned on an optical path of either one of the main beam and the sub-beam.

77. The optical head as claimed in claim 76, wherein the focus error signal derived from the sub-beam when focus servo is effected by using the focus error signal derived from the main beam is used to detect the error.

78. The optical head as claimed in claim 76, wherein a difference between the focus error signal, which is derived from the sub-beam when focus servo is effected by using the focus error signal derived from the main beam, and said focus error signal derived from said sub-beam is used to detect the error.

79. The optical head as claimed in claim 76, wherein a beam spot of the sub-beam is shifted from a beam spot of the main beam by one-half of a period of grooves of the optical recording medium in a radial direction of said optical recording medium.

80. The optical head as claimed in claim 79, wherein a difference between a track error signal derived from the main beam and a track error signal derived from the sub-beam is used for track servo.

81. The optical head as claimed in claim 76, wherein the sub-beam incident to said objective lens has a phase differing from a right side to a left side substantially by $\pi$ with respect to a line passing through an optical axis in parallel to a tangential direction of the optical recording medium, and a beam spot of the main beam and a beam spot of the sub-beam are positioned on a same track of the optical recording medium.

82. The optical head as claimed in claim 81, wherein a phase control element is positioned on an optical path of the sub-beam for causing a phase of the sub-beam to differ from a right side to a left side substantially by $\pi$ with respect to a line passing through an optical axis and parallel to the tangential direction of the optical recording medium.

83. The optical head as claimed in claim 82, wherein said phase control element comprises a parallel planar plate whose thickness differs from the right side to the left side with respect to the line.

84. The optical head as claimed in claim 76, wherein a difference between a track error signal derived from the main beam and a track error signal derived from the sub-beam is used for track servo.

85. The optical head as claimed in claim 76, wherein the sub-beam incident to said objective lens has a phase differing from a zone between two lines, which are symmetrical with respect to an optical axis and parallel to a tangential direction of the optical recording medium, to regions outside of said zone substantially by $\pi$, and a beam spot of the main beam and a beam spot of the sub-beam are positioned on a same track of the optical recording medium.

86. The optical head as claimed in claim 85, wherein a phase control element is positioned on an optical path of the sub-beam for causing a phase of said sub-beam incident to said objective lens to differ from the zone between the two lines to regions outside of said zone substantially by $\pi$.

87. The optical head as claimed in claim 86, wherein said phase control element comprises a parallel planar plate whose thickness differs from said zone to said regions.

88. The optical head as claimed in claim 85, wherein a difference between a track error signal derived from the main beam and a track error signal derived from the sub-beam is used for track servo.

89. In an optical data recording/reproducing apparatus comprising a light source, an objective lens for condensing light output from said light source on an optical recording medium, and a photodetector to which light reflected from said optical recording medium is incident, said light output from said light source is split into a main beam and a sub-beam different from each other in a light intensity distribution when input to said objective lens, a focus error signal representative of a shift of a focus on the optical recording medium is detected from each of reflected light derived from the main beam and reflected light derived from the sub-beam, and an error in a thickness of the optical recording medium is detected and compensated for on the basis of a difference between a zero-crossing point of the reflected light derived from the main beam and a zero-crossing point of the reflected light derived from the sub-beam.

90. The apparatus as claimed in claim 89, wherein a collimator lens is positioned between said light source and said objective lens and movable in a direction of optical axis for thereby compensating for the error.

91. The apparatus as claimed in claim 89, wherein two relay lenses are positioned between said light source and said objective lens, and one of said two relay lenses is movable in a direction of optical axis for thereby compensating for the error.

92. The apparatus as claimed in claim 89, wherein a liquid crystal optical element is positioned between said light source and said objective lens and applied with a voltage for thereby compensating for the error.

* * * * *